United States Patent
Li et al.

(10) Patent No.: US 8,982,738 B2
(45) Date of Patent: Mar. 17, 2015

(54) SYSTEM, APPARATUS FOR CONTENT DELIVERY FOR INTERNET TRAFFIC AND METHODS THEREOF

(75) Inventors: Sanqi Li, Plano, TX (US); Tao Qian, Shanghai (CN); Houxiao Han, Beijing (CN); Hongbo Tian, Beijing (CN); Kui Lin, Redwood City, CA (US)

(73) Assignee: Futurewei Technologies, Inc., Plano, TX (US)

( * ) Notice: Subject to any disclaimer, the term of this patent is extended or adjusted under 35 U.S.C. 154(b) by 186 days.

(21) Appl. No.: 13/105,439

(22) Filed: May 11, 2011

(65) Prior Publication Data

US 2011/0280153 A1 Nov. 17, 2011

Related U.S. Application Data

(60) Provisional application No. 61/334,548, filed on May 13, 2010.

(51) Int. Cl.
*H04L 12/16* (2006.01)
*H04L 29/08* (2006.01)
*H04L 12/14* (2006.01)
(Continued)

(52) U.S. Cl.
CPC ............ *H04L 67/143* (2013.01); *H04L 12/14* (2013.01); *H04L 12/1439* (2013.01); *H04L 12/1489* (2013.01); *H04L 41/5067* (2013.01); *H04L 63/30* (2013.01); *H04M 15/83* (2013.01); *H04M 15/84* (2013.01); *H04M 15/844* (2013.01); *H04M 15/85* (2013.01); *H04M 15/852* (2013.01); *H04M 15/88* (2013.01); *H04M 15/888* (2013.01); *G06F 17/30902* (2013.01); *H04L 67/2847* (2013.01);
(Continued)

(58) Field of Classification Search
None
See application file for complete search history.

(56) References Cited

U.S. PATENT DOCUMENTS 5,778,187 A 7/1998 Monteiro et al.
6,052,730 A 4/2000 Felciano et al.
(Continued)

FOREIGN PATENT DOCUMENTS

CN 1481635 A 3/2004
CN 1864431 A 11/2006
(Continued)

OTHER PUBLICATIONS

"IST-2000-25394 Project Moby Dick D0401 AAAC Design," Information Society Technologies, Jan. 21, 2002, 112 pages.
(Continued)

*Primary Examiner* — Ayaz Sheikh
*Assistant Examiner* — Sori Aga
(74) *Attorney, Agent, or Firm* — Slater & Matsil, L.L.P.

(57) ABSTRACT

In one embodiment, a method of serving media includes receiving a request to serve media content to an user equipment, and receiving caching information regarding the media content. The caching information includes information regarding whether the media content requested by the user equipment is cacheable. A first media server is assigned from a hierarchical set of media servers to serve the user equipment if the media content to be served is cacheable. The hierarchical set of media servers includes a plurality of first type of media servers deployed in a plurality of layer2 (L2) access networks. The user equipment is coupled to the content delivery network through a layer2 access network of the plurality of L2 access networks.

25 Claims, 34 Drawing Sheets

(51) Int. Cl.
*H04L 12/24* (2006.01)
*H04L 29/06* (2006.01)
*H04M 15/00* (2006.01)
*G06F 17/30* (2006.01)
*H04L 29/14* (2006.01)
*G06F 15/16* (2006.01)
*H04L 12/26* (2006.01)

(52) U.S. Cl.
CPC ........... *H04L 67/2885* (2013.01); *H04L 69/40* (2013.01); *H04L 41/5029* (2013.01); *H04L 43/10* (2013.01)
USPC .......................................... 370/270; 709/231

(56) References Cited

U.S. PATENT DOCUMENTS

| | | | |
|---|---|---|---|
| 6,925,651 | B2 | 8/2005 | Foster et al. |
| 6,928,463 | B1 | 8/2005 | Tene et al. |
| 7,017,188 | B1 | 3/2006 | Schmeidler et al. |
| 7,149,293 | B1 | 12/2006 | Coppage et al. |
| 7,376,716 | B2* | 5/2008 | Dilley et al. ................. 709/219 |
| 7,707,641 | B2 | 4/2010 | Schmeidler et al. |
| 7,756,130 | B1* | 7/2010 | Lee et al. ..................... 370/389 |
| 7,930,421 | B1 | 4/2011 | Bertz et al. |
| 2002/0078462 | A1 | 6/2002 | Foster et al. |
| 2002/0078463 | A1 | 6/2002 | Foster |
| 2002/0083118 | A1 | 6/2002 | Sim |
| 2003/0050062 | A1 | 3/2003 | Chen et al. |
| 2003/0050991 | A1 | 3/2003 | Towell et al. |
| 2003/0078986 | A1 | 4/2003 | Ayres et al. |
| 2003/0093798 | A1 | 5/2003 | Rogerson |
| 2003/0115281 | A1 | 6/2003 | McHenry et al. |
| 2003/0145038 | A1 | 7/2003 | Bin Tariq et al. |
| 2003/0216141 | A1 | 11/2003 | Antoniou et al. |
| 2004/0185875 | A1 | 9/2004 | Diacakis et al. |
| 2004/0193513 | A1 | 9/2004 | Pruss et al. |
| 2005/0034153 | A1 | 2/2005 | Abramson et al. |
| 2005/0044260 | A1 | 2/2005 | Abramson et al. |
| 2005/0083884 | A1 | 4/2005 | Lee et al. |
| 2005/0283791 | A1 | 12/2005 | McCarthy et al. |
| 2006/0029104 | A1 | 2/2006 | Jungck |
| 2006/0193311 | A1 | 8/2006 | Kim et al. |
| 2006/0272023 | A1 | 11/2006 | Schmeidler et al. |
| 2007/0055764 | A1 | 3/2007 | Dilley et al. |
| 2007/0118618 | A1 | 5/2007 | Kisel et al. |
| 2007/0136762 | A1 | 6/2007 | Zhang |
| 2007/0150950 | A1 | 6/2007 | Aaron et al. |
| 2007/0159971 | A1 | 7/2007 | Zhang et al. |
| 2007/0198739 | A1 | 8/2007 | Jennings et al. |
| 2007/0226775 | A1 | 9/2007 | Andreasen et al. |
| 2007/0243821 | A1 | 10/2007 | Hundscheidt et al. |
| 2008/0025278 | A1 | 1/2008 | Hoecker et al. |
| 2008/0049648 | A1 | 2/2008 | Liu et al. |
| 2008/0144602 | A1 | 6/2008 | Casey |
| 2008/0189360 | A1* | 8/2008 | Kiley et al. .................. 709/203 |
| 2008/0307108 | A1 | 12/2008 | Yan et al. |
| 2009/0068981 | A1 | 3/2009 | Hurtta et al. |
| 2009/0157888 | A1* | 6/2009 | Demmer et al. ............. 709/229 |
| 2009/0198827 | A1 | 8/2009 | Hughes |
| 2009/0285225 | A1 | 11/2009 | Dahod |
| 2009/0300498 | A1 | 12/2009 | Falchuk |
| 2010/0034089 | A1 | 2/2010 | Kovvali et al. |
| 2010/0039993 | A1 | 2/2010 | Ramankutty et al. |
| 2010/0057883 | A1 | 3/2010 | Cao et al. |
| 2010/0080163 | A1 | 4/2010 | Krishnamoorthi et al. |
| 2010/0153862 | A1* | 6/2010 | Schreiber ..................... 715/760 |
| 2010/0199321 | A1 | 8/2010 | Fan |
| 2011/0021197 | A1 | 1/2011 | Ngai |
| 2011/0131290 | A1 | 6/2011 | Kim et al. |
| 2011/0161461 | A1* | 6/2011 | Niven-Jenkins et al. ..... 709/217 |
| 2011/0225281 | A1* | 9/2011 | Riley et al. .................. 709/223 |
| 2011/0280143 | A1 | 11/2011 | Li et al. |
| 2011/0280216 | A1 | 11/2011 | Li et al. |
| 2011/0283011 | A1 | 11/2011 | Li et al. |
| 2013/0013726 | A1 | 1/2013 | Westberg et al. |

FOREIGN PATENT DOCUMENTS

| | | |
|---|---|---|
| CN | 101022532 A | 8/2007 |
| CN | 101141626 A | 3/2008 |
| CN | 101484888 A | 7/2009 |
| CN | 101512971 A | 8/2009 |
| EP | 1 439 725 A1 | 7/2004 |
| WO | 0122725 A1 | 3/2001 |
| WO | 0235799 A2 | 5/2002 |
| WO | 2009052734 A1 | 4/2009 |

OTHER PUBLICATIONS

Souza, V., et al., "A QoS Enabled Public Ethernet Access Network," Broadband & Transport, Ericsson Research, Jun. 21, 2007, 8 pages.
International Search Report and Written Opinion of the International Searching Authority for International Application No. PCT/US11/36304 mailed Aug. 25, 2011, 11 pages.
Written Opinion of the International Searching Authority for International Application No. PCT/US 11/36314 mailed Aug. 25, 2011, 5 pages.
Written Opinion of the International Searching Authority for International Application No. PCT/US 11/36325 mailed Nov. 25, 2011, 5 pages.
Written Opinion of the International Searching Authority for International Application No. PCT/US 11/36420 mailed Oct. 25, 2011, 6 pages.
Chinese Search report for CN Application No. 201180027460, May 12, 2011, 3 pages.
Chineses Search Report for CN Application No. 201180002716.X, May 12, 2011, 2 pages.
First Office Action of Chinese Application No. 201180002716.X and Partial Translation, Mailing Date of Feb. 26, 2013, 24 pages.
First Office Action of Chinese Application No. 201180002746.0 and Partial Translation, Mailing Date of Mar. 4, 2013, 21 pages.
"3rd Generation Partnership Project; Technical Specification Group Services and System Aspects; 3G Security; Lawful interception architecture and functions (Release 10)," 3GPP TS 33.107, V10.2.0, Dec. 2010, 130 pages.
Extended European Search Report for Application No. 11781343.6, Applicant: Huawei Technologies Co., Ltd., mailed May 31, 2013, 6 pages.
Extended European Search Report for Application No. 11781295.8, Applicant: Huawei Technologies Co., Ltd., mailed Jun. 3, 2013, 5 pages.
Lu, et al., "Implementation of Lawful Interception Within IMS," About ZTE, Publications, ZTE Communications 2008, No. 4, articles, http://wwwen.zte.com.cn/endata/magazine/ztecommunications/2008year/no4, Jul. 24, 2013, 5 pages.
U.S. Office Action received on U.S. Appl. No. 13/105,625, mailed Jul. 12, 2013, 21 pages.
U.S. Office Action received on U.S. Appl. No. 13/105,666, mailed Jul. 19, 2013, 19 pages.
U.S. Office Action received on U.S. Appl. No. 13/105,705, mailed Jul. 23, 2013, 32 pages.
Extended European Search Report for Application No. 11781300.6, mailed Jun. 21, 2013, 5 pages.
U.S. Office Action received for U.S. Appl. No. 13/105,705 mailed Feb. 10, 2014, 33 pages.
First Office Action of Chinese Application No. 201180002719.3 and Partial Translation, Jul. 31, 2013, 16 pages.
Chinese Search report for CN Application No. 201180002719.3, Jul. 31, 2013, 2 pages.
International Extended European Search Report and Written Opinion of the International Searching Authority received in Patent Cooperation Treaty Application No. PCT/US2011/036325, mailed Nov. 18, 2013, 13 pages.
U.S. Office Action received on U.S. Appl. No. 13/105,625, mailed Mar. 7, 2013, 31 pages.
U.S. Office Action received for U.S. Appl. No. 13/105,666 mailed Mar. 24, 2014, 35 pages.

* cited by examiner

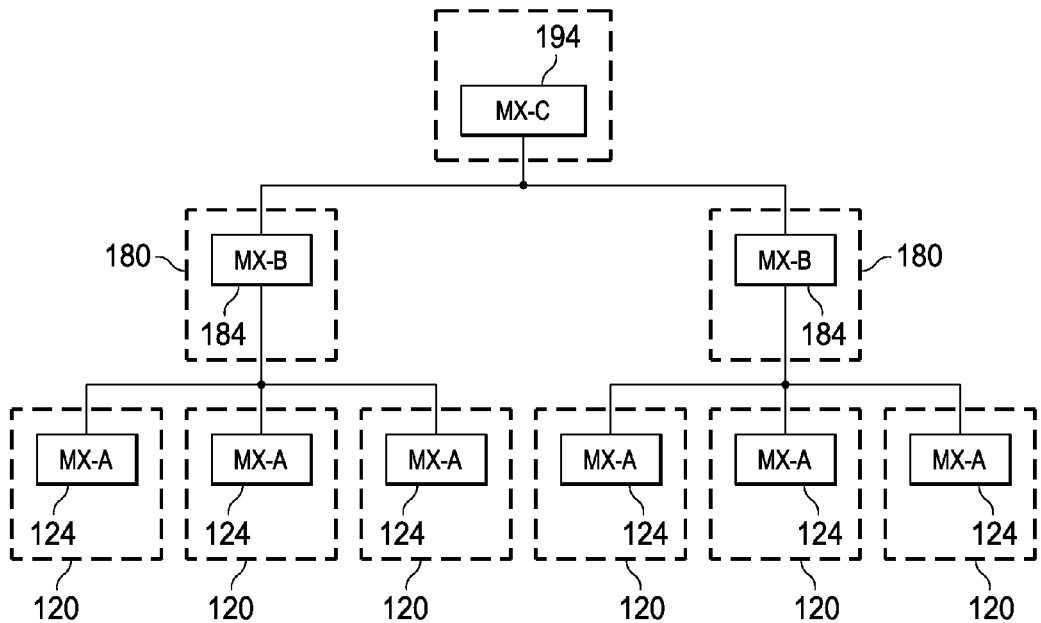

STANDARD PARAMETERS:

IP (CURRENT UE)
INTERNATIONAL MOBILE SUBSCRIBER IDENTITY (IMSI)
MOBILE SUBSCRIBER INTEGRATED SERVICES DIGITAL NETWORK (MSISDN)
INTERNATIONAL MOBILE EQUIPMENT IDENTITY (IMEI)
REAL TIME CHARGING FLAG
LAWFUL INTERCEPTION (LI) FLAG
RAI (ROUTING AREA ID)
QoS/21PCC PARAMETERS:
- CHARGING BASED ON USER PROFILE
- CHARGING BASED ON SERVICE TYPE
- CHARGING BASED ON LOCATION
- CHARGING BASED ON CONGESTION
- CHARGING BASED ON TIME RANGE
- CHARGING BASED ON USER'S ACCUMULATE USAGE
- CHARGING BASED ON TERMINAL TYPE

NON-STANDARD PARAMETERS:

OPTIONAL RAN SIDE MEDIA SERVER IP ADDRESS

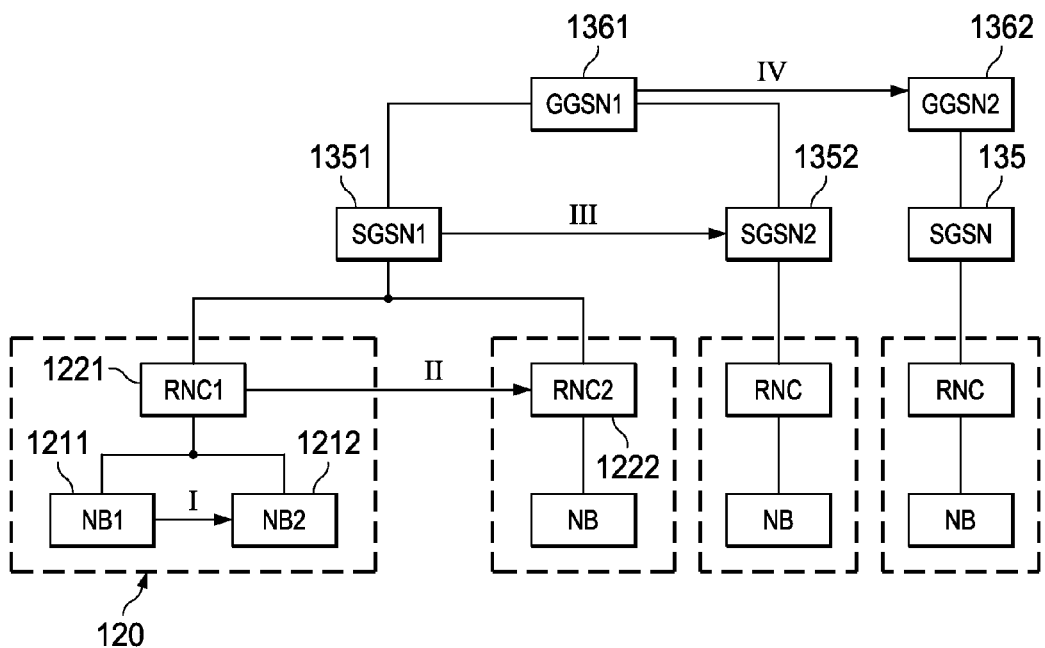

| | SCENARIO | DESCRIPTION | MBB IMPACT | CDN IMPACT |
|---|---|---|---|---|
| I | INTRA RNC | UE MOVES FROM NB1 TO NB2 | MX-A WORKS AS BEFORE RELOCATION | NO IMPACT |
| II | INTRA SGSN | UE MOVES FROM RNC1 TO RNC2 | MAY IMPACT BOTH RNCs | MAY IMPACT MX/MC |
| III | INTRA GGSN | UE MOVES FROM SGSN1 TO SGSN2 | MAY IMPACT BOTH RNCs | MAY IMPACT MX/MC |
| IV | INTER GGSN | UE MOVES FROM GGSN1 TO GGSN2 | SESSION BREAKS AND NO IMPACT TO MBB | NO IMPACT TO MX/MC |
| V | MBB TO FBB | UE MOVES FROM MBB TO FBB | SESSION BREAKS AND NO IMPACT TO MBB | NO IMPACT TO MX/MC |

US 8,982,738 B2

SYSTEM, APPARATUS FOR CONTENT DELIVERY FOR INTERNET TRAFFIC AND METHODS THEREOF

This application claims the benefit of U.S. Provisional Application No. 61/334,548, filed on May 13, 2010, which application is hereby incorporated herein by reference.

TECHNICAL FIELD

The present invention relates generally to content delivery, and more particularly to system, apparatus for content delivery for internet traffic and methods thereof.

BACKGROUND

In recent years, media consumption using mobile devices has dramatically increased. Consequently, telecommunication networks are bursting at the seams because of this explosive growth in traffic. This phenomenon is even more evident in the Mobile Broad Band (MBB) networks where the cost of infrastructure is much more (e.g., about 20-30 times) than that of the Fixed Broad Band (FBB) networks. The recent proliferation of mobile devices, such as smart-phones, tablets, net-books, laptops, has kicked off a new era of wireless access to full web on the go. Consequently, the growth of multimedia traffic is expected to be much faster than the growth of traffic in FBB networks in its first 5 years of growth (e.g., from year 2000 to year 2005).

However, MBB and FBB network operators do not benefit from this increased traffic. Most of this fast growing traffic does not contribute to the revenue for the MBB and FBB network operators because this traffic is classified to be direct to consumer traffic, which is often referred to as Over-The-Top (OTT) traffic. Therefore, mitigating the impact of the rapidly growing OTT traffic becomes an urgent priority for the MBB and the FBB network operators.

OTT traffic differs from other traffic such as Business-To-Business (B2B) or Business-To-Consumer (B2C) traffic in that the OTT content and traffic characteristics are unknown to the operators. These unknown characteristics include media origin, media type, delivery protocol/schemes used, protected vs. clear content, dynamic vs. static content, etc. Therefore, handling and mitigating the impact of OTT traffic is difficult because of the technical complexity, network costs, and uncertain nature of the OTT handling.

SUMMARY OF THE INVENTION

These and other problems are generally solved or circumvented, and technical advantages are generally achieved, by illustrative embodiments of the present invention.

In one embodiment of the present invention, a method of serving media comprises receiving a request to serve media content to an user equipment and receiving caching information regarding the media content. The caching information comprises information regarding whether the media content requested by the user equipment is cacheable. The method further comprises assigning a first media server from a hierarchical set of media servers to serve the user equipment if the media content to be served is cacheable. The hierarchical set of media servers comprise a plurality of first type of media servers deployed in a plurality of layer2 (L2) access networks. The user equipment is coupled to a content delivery network through a layer2 access network of the plurality of L2 access networks.

In an alternative embodiment of the present invention, a method of serving media comprises receiving a request to serve a cacheable media content to an user equipment at a first media server deployed in a layer2 access network. The user equipment is coupled to a content delivery network through the layer2 access network. The method further comprises determining if the cacheable media content is stored in a cache of the first media server. The first media server does not determine if the cacheable media content is cacheable content. The cacheable media content is served from the cache to the user equipment if the media content is stored in the cache of the first media server.

In an alternative embodiment of the present invention, a method of serving media comprises receiving a request to serve media content to a user equipment. The user equipment is coupled to a content delivery network through a layer2 access network of a plurality of layer2 access networks. The method further comprises determining whether the media content to be served is cacheable, and redirecting the request to serve the media content to a first media server if the media content to be served is cacheable. The first media server is a media server from a hierarchical set of media servers. The hierarchical set of media servers comprise a plurality of first type of media servers deployed in the plurality of layer2 access networks.

In yet another embodiment of the present invention, a method of media streaming comprises receiving a request to serve a cacheable media content to an user equipment, and determining a destination internet protocol (IP) address of the request. The method further comprises forwarding the received request to a first media server in a layer2 access network if the destination IP address matches a stored list of destination IP addresses. The received request is repackaged into a TCP/IP message and forwarded to the first media server.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which:

FIG. 5, which includes

FIG. 6, which includes

FIG. 8, which includes

FIG. 9 illustrates a hierarchy of media servers deployed in accordance with embodiments of the invention;

FIG. 10 illustrates a table of packet data protocol (PDP) context data stored in a media controller in accordance with an embodiment of the invention;

FIG. 12 illustrates possible reassignment of resources when a UE relocates/roams within/across multiple networks in accordance with various embodiments of the invention;

FIG. 13 illustrates a table corresponding to reassignment of resources when a UE relocates/roams within/across multiple networks and highlights the possible impact in accordance with embodiments of the invention;

FIG. 14 illustrates the general network architecture for handling of relocation and roaming in a MBB network in accordance with embodiments of the invention, wherein FIG. 14A illustrates an embodiment of roaming under scenario II in FIG. 12, and wherein

FIG. 18, which includes FIGS. 18A and 18B, describes an alternative embodiment for a method of lawful interception wherein the media server in the layer2 network decides and delivers communications with a targeted UE, wherein

FIG. 19, which includes FIGS. 19A and 19B, describes a third embodiment for a method of lawful interception wherein the media server in the layer2 network decides and delivers communications with a targeted UE but through the media controller, wherein

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
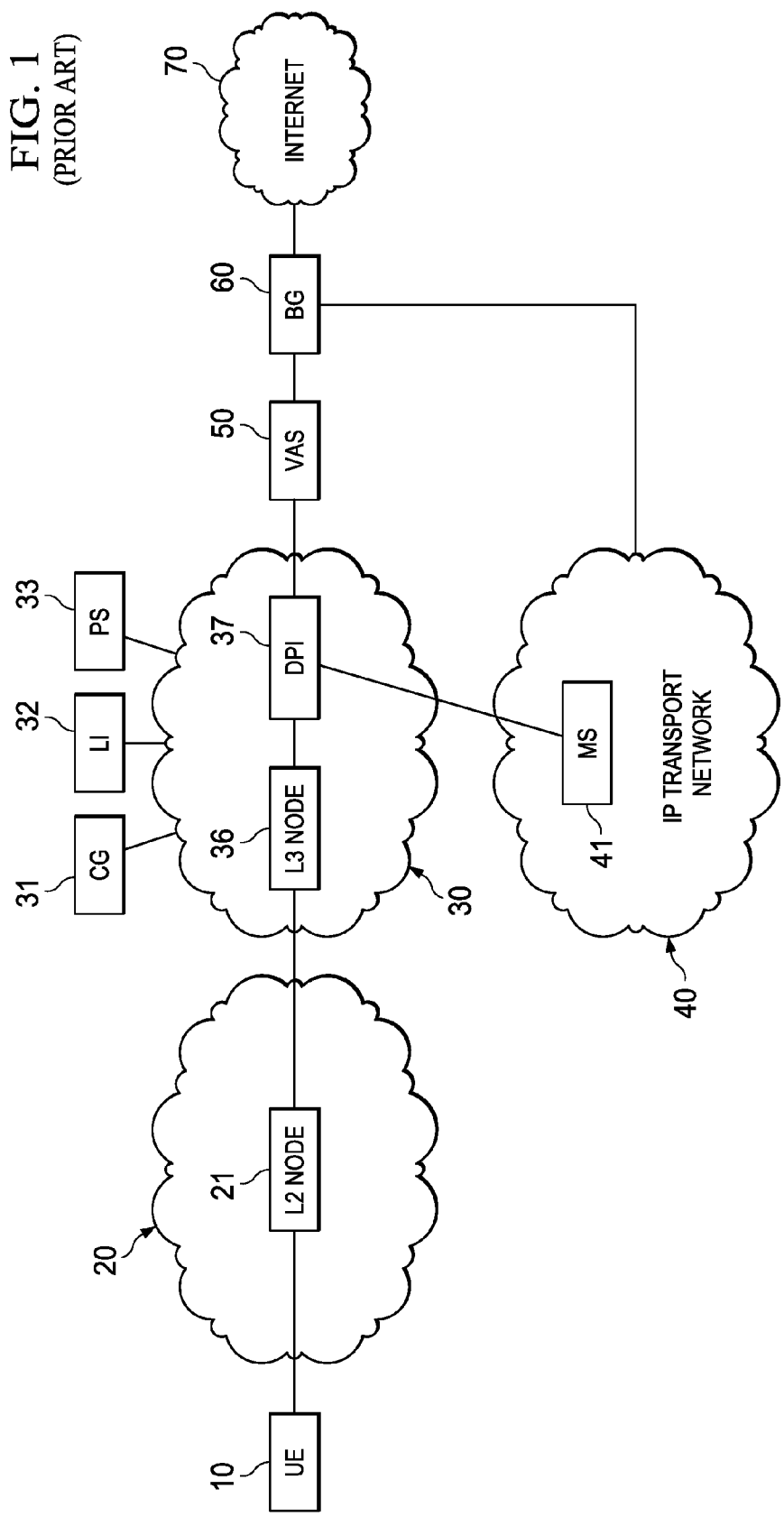
FIG. 1 illustrates a prior art access network offload solution using a Gi Offload method for handling OTT traffic.

The making and using of various embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Definition and acronyms of basic functional entities, interfaces between them, used in the following description is described below.

ACRONYMS

AAA—Authentication, Authorization, and Accounting
ADMF—Administration Function for lawful interception
B2B—Business to Business (a model where the operator provides services to another business)
B2C—Business to Consumer (a model where the operator provides services to its end users)
BC—billing and charging policy server
BG—Border Gateway (peering point to the internet)
CC—CDN Control (control function that decides which MS to handle a given request)
CDN—Content Delivery Network (open CDN that supports OTT, B2B, and B2C)
CG—Charging Gateway (responsible for charging aspect of services)
DF—Delivery Function (a LI infrastructure term)
DPI—Deep Packet Inspection (a function that inspects packets)
DPI-C—Content Request Level DPI (involving deep HTTP header, URL analysis)
DSL—Digital Subscriber Line
FBB—Fixed Broad Band (XDSL, cable networks, etc.)
GGSN—Gateway GPRS Support Node
GPRS—General Packet Radio Services
GSN—GPRS Support Node (either an SGSN or GGSN)
IWF—Inter-Working Function (a special function for connecting L2 node and media server)
L2 Node—Layer 2 Node (such as RNC and Node-B in MBB, DSLAM in FBB networks etc.)
L3 Node—Layer 3 Node (such as GGSN in MBB or BRAS in FBB etc.)
LEMF—Law Enforcement Monitoring Function
LI—Lawful Interception (provides interface for LI such as MBB's LIG)
LIG—Lawful Interception Gateway
LIMS—LI Management System
MBB—Mobile Broad Band (2.xG, 3G, 4G, or WiMax networks)
MC—Media Control (same as CDN Control Function)
MD—Media Data (Data Analytics, Logs and Reports)
MS—Media Server (provides media streaming, caching, and adaptation functions)
MX—Media Switch (same function as MS)
NB—Node-B (a 3GPP RAN function, i.e., Radio Base Station also called BS, eNB)
OCS—Online Charging System
OTT—Over The Top (type of content and traffic that are unknown to the network operator)
PCC—Policy Charging and Control
PCRF—Policy, Charging Rules Function
PS—Policy Server (such as PCRF in MBB)
QoE—Quality of Experience (Quality of End User Experiences)
QoS—Quality of Service
RNC—Radio Network Controller (a RAN control function in the 3GPP standard)
SGSN—Serving GPRS Support Node
SUR—Subscriber Usage Report
UE—User Entity (end user device/client)
XDSL—All variants of DSL technologies such as ADSL and HDSL.

Different prior art methods of handling OTT traffic will be described with respect to FIGS. 1-3. However, the inventors have identified that these prior art methods have different advantages and disadvantages which are discussed in further detail below.

The application described below uses the abbreviation GGSN and SGSN only as an illustration. The terms could also be servers performing these operations in the network. For example, the server performing the operations of GGSN in a 3GPP LTE/4G network is referred as system architecture evolution gateway (SAE-GW) and the server performing the operations of SGSN in a 3GPP LTE/4G network is referred as Mobility Management Entity (MME). Therefore, the class of servers performing the operations of the GGSN, the SAE-GW, and similar equivalent servers may be referred as gateway server node and the class of servers performing the operations of the SGSN, the MME, and similar equivalent servers may be referred as serving/management node. GGSN and SGSN are used in the descriptions only as an illustration and any corresponding server may be used in various embodiments described herein.

FIG. 1 illustrates a prior art access network offload and caching solution using a Gi Offload method for handling OTT traffic.

FIG. 1 illustrates a user equipment (UE 10) coupled to the internet 70 through a layer2 (L2) network 20, such as a radio access network, a layer2 (L2) node 21. The L2 node 21 may be a base station, NB, eNB, a radio network controller etc. The L2 network 20 is coupled to the internet 70 through a layer3 (L3) network 30. The L3 network 30 provides services such as a charging gateway (CG) 31, a lawful interception (LI) 32, and a policy server (PS) 33.

The Gi Offload method is widely used in Mobile Broad Band (MBB) networks. In the Gi Offload method, a caching media server MS 41 is introduced through the IP traffic network 40. The functionality of the MS 41 may be implemented as a standalone cache function or as a media server as part of a CDN network. The deep packet inspection DPI 37 function may be standalone or as a part of the L3 Node 36 (such as a gateway GPRS support node (GGSN)). However, the Gi Offload method does not help alleviate traffic pressure below the DPI function because content is cached very high up in the network path. To solve this problem, a second method has been introduced as illustrated in FIG. 2.

Figure 2:
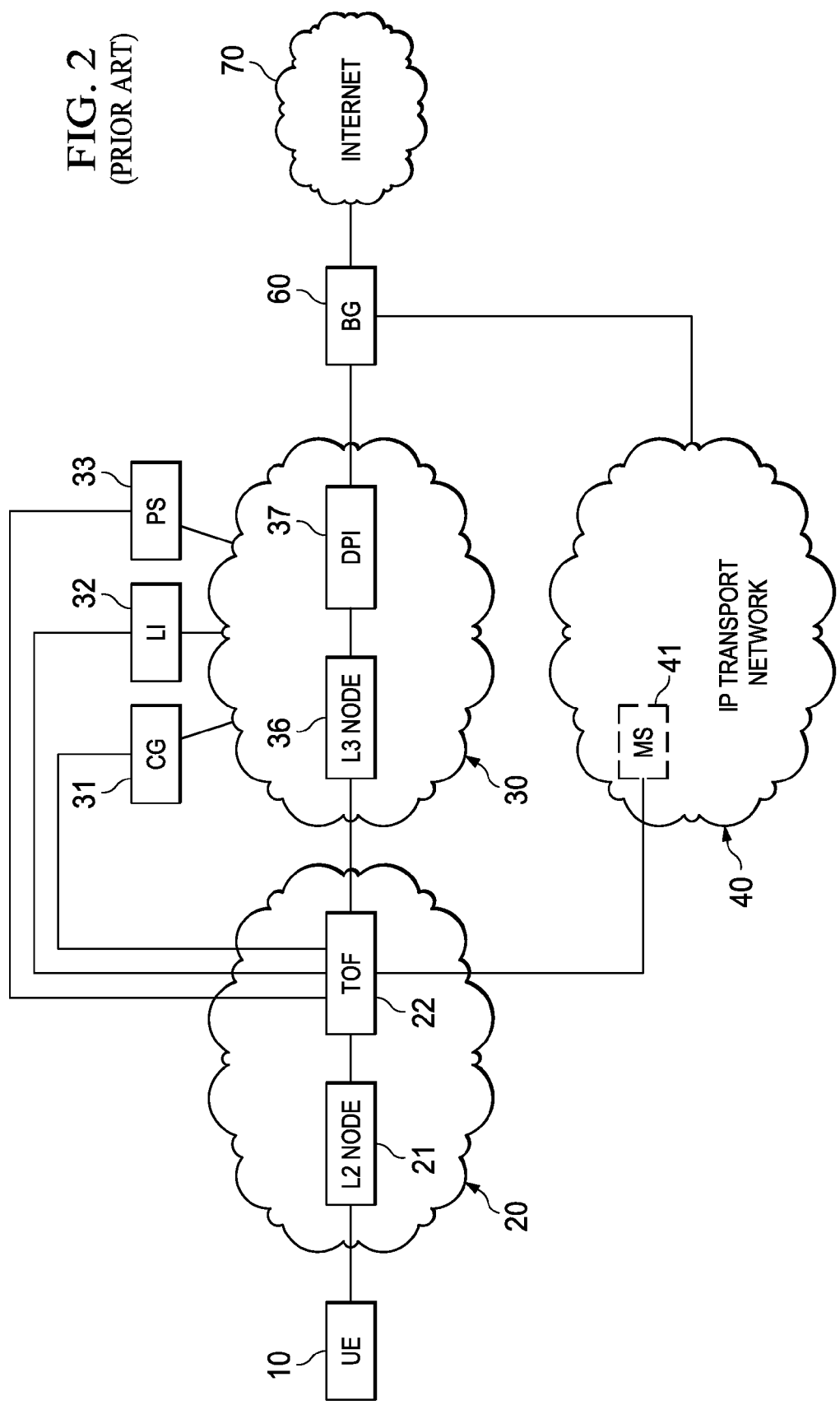
FIG. 2 describes a prior art method ("Traffic Offload Function (TOF) based Gi offload"), which is also referred to as Mobile Edge Access Gateway (MEAG) in accordance with TR 23.829 standard as Alternative 4.

FIG. 2 describes a prior art method ("Traffic Offload Function (TOF) based Gi offload"), which is also referred to as Mobile Edge Access Gateway (MEAG).

In the MEAG method, the offload position is moved from the L3 Node 36 (such as Gi at GGSN) to the L2 Node (e.g., RNC). Gi is the IP based interface between the GGSN and a public data network (PDN). As illustrated in FIG. 2, the TOF 22 is introduced into the L2 network 20. Therefore, this method is able to provide bandwidth savings above the TOF 22 (i.e. saving realized in all of the L3 Nodes 36 above the TOF 22). However, in order to support all of the other supporting services associated with the MBB access network such as Lawful Interception (LI), real time charging services, and policy based QoS services (PCRF), TOF 22 has to support direct interfaces with the CG 31, LI 32, and PS 33 functions as illustrated in FIG. 2.

An optional MS function, the MS 41 (dotted line box) may be included as a standalone caching server or a media server as part of a CDN network. The offload function and caching functions are inherently decoupled, but can be combined to offer additional benefits.

However, this method has many drawbacks. First, all traffic is analyzed at the TOF 22 using Deep Packet Inspection (DPI) type of approach. This significantly degrades performance of the L2 network 20. Second, in order to support the MBB related services such as CG 31, LI 32, and PS 33, direct interfaces from TOF 22 to these functions must be maintained, complicating the interactions for CG 31, LI 32, and PS 33. Third, to achieve the first and the second above, the TOF 22 is likely to become a complex function having many of the common functions of the MBB's SGSN and GGSN functions.

In spite of these drawbacks, this method has been adopted into TR23.829 standard as Alternative 4. This next method attempts to improve on some of these drawbacks in this second method.

Figure 3:
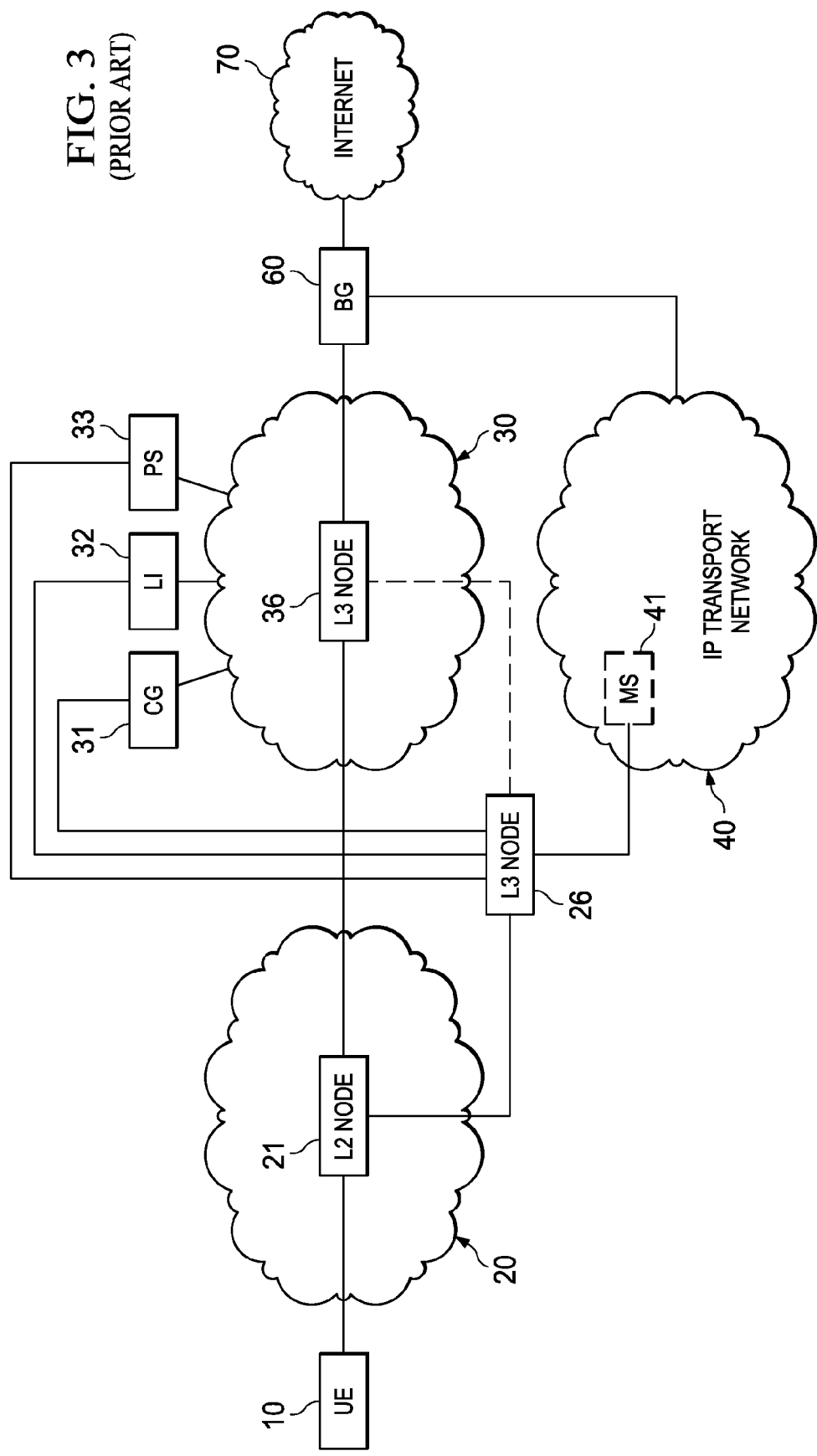
FIG. 3 describes a prior art method ("Local Gateway GPRS Support Node (GGSN) method") used in MBB networks in accordance with current 3GPP standards.

FIG. 3 describes a prior art method ("Local Gateway GPRS Support Node (GGSN) method") used in MBB networks. Under this method, the L2 Node is a Radio Network Controller (RNC), and the L3 Node is a Local GGSN.

This method (again in the MBB domain) attempts to use a standard GSN handling called direct tunnels, which allows a L2 node 21, such as a RNC, in the L2 network 20 to establish a direct tunnel to a local L3 node 26 such as a local GGSN. Therefore, a local GGSN is positioned beside the RNC (L2 node 21), thereby allowing the RNC to offload certain types of traffic (such as web traffic) to the internet via the Local GGSN (local L3 node 26). Existing SGSN and GGSN function are in the non-offload path under this method.

Two slightly different configurations have been proposed for this method: static offload and dynamic offload. First, in the static offload configuration, once setup, the offload traffic will statically go through the local L3 node 26 (Local GGSN) and non-offload traffic will continue through L3 Node 36 (GGSN). As shown in FIG. 3, at the time of the packet data protocol (PDP) setup, a SGSN (another L2/L3 Node) may determine the static configuration. This requires modification to the SGSN for offload policy handling and identification of Local GGSN.

Alternatively, the dynamic offload configuration is shown with the dotted line between the local L3 node 26 and the L3 node 36. In this case, all data traffic go through local L3 node 26 (Local GGSN), which makes offload decision, including applying different offload policy on different flows within a single PDP. SGSN will always choose a L3 node 36 (macro GGSN), and the local L3 node 26 (Local GGSN) serves as the proxy for the macro GGSN.

This method has similar benefit as the second method in terms of saving the core L3 Nodes (SGSN, GGSN in the MBB context). However, since GGSN is a standard MBB function and its interface with CG 31, LI 32, and PS 33, etc. are already defined and standardized, introducing local GGSN at the L2 node 21 (such as a RNC) appears to solve many of the problems. Unfortunately, there are additional drawbacks of this method as outlined below.

First, a L3 Node 36, such as a GGSN, is a complex function and its implementation is relatively expensive and difficult to manage. Therefore, having multiple GGSN nodes is not cost effective. Second, with multiple GGSNs in the network, the interaction between CG 31, LI 32, and PS 33 etc. becomes more complicated. For example, the real time charging function will need to receive inputs from both GGSN (local L3 node 26 and L3 node 36) in order to determine if an active session has reached a rating limit. Third, this scheme may present a challenge in a single access point name (APN) setup where all services use a single APN. In particular, the static offload configuration described above, once the packet data protocol (PDP) is setup, the statically determined offload from L2 node 21 (RNC) to the local L3 node 26 (Local GGSN) cannot be changed.

In various embodiments of the present invention, various innovative methods of deploying layer3 based content delivery network (CDN) Media Servers (MS) into any layer2 access networks (such as RAN networks or XDSL access networks, or even cable networks) will be described. Such deployments of the CDN media servers may be used to cache and process media content closer to the user devices, while maintaining a unified, common, and open CDN network capable of handling OTT, B2B, and B2C services for both MBB and FBB networks.

The cost savings potential for the existing network infrastructure is greater if the CDN media server is located closer to the end user device when caching the OTT content delivered through an access network (MBB or FBB) to the end user. This is because the infrastructure cost of Radio Access Network (RAN) nodes is progressively more than those of the Packet Switching (PS) network. Consequently, it is advantageous to move the media server further down the access path towards end user devices.

However, last mile access network may be a layer2 network or may be a non-IP closed networks such as RAN (in 3G wireless networks) or XDSL. Deployment of a media server in to these networks has at least two challenges. First, the media server, which is typically a layer 3 node, requires special interfaces to interact with the layer2 network. Second, regular offload (TOF) schemes require a DPI process so as to determine if an OTT flow is cacheable and to offload or cache locally. This DPI process may be very CPU intensive and may degrade the capacity of the access nodes.

Embodiments of this invention overcome these and other problems by deploying a layer3 media server into a layer2 access network with functionality decoupling. In particular, some functionality, such as OTT traffic detection, caching decision and the OTT traffic request routing decision, is retained within the layer3 CDN networks. Embodiments of the invention also include unique handling for features in the MBB network domain such as Lawful Interception (LI), Online Charging System (OCS) related handlings, QoS handling and support, as well as many other capability supports for both MBB and FBB networks.

Figure 4:
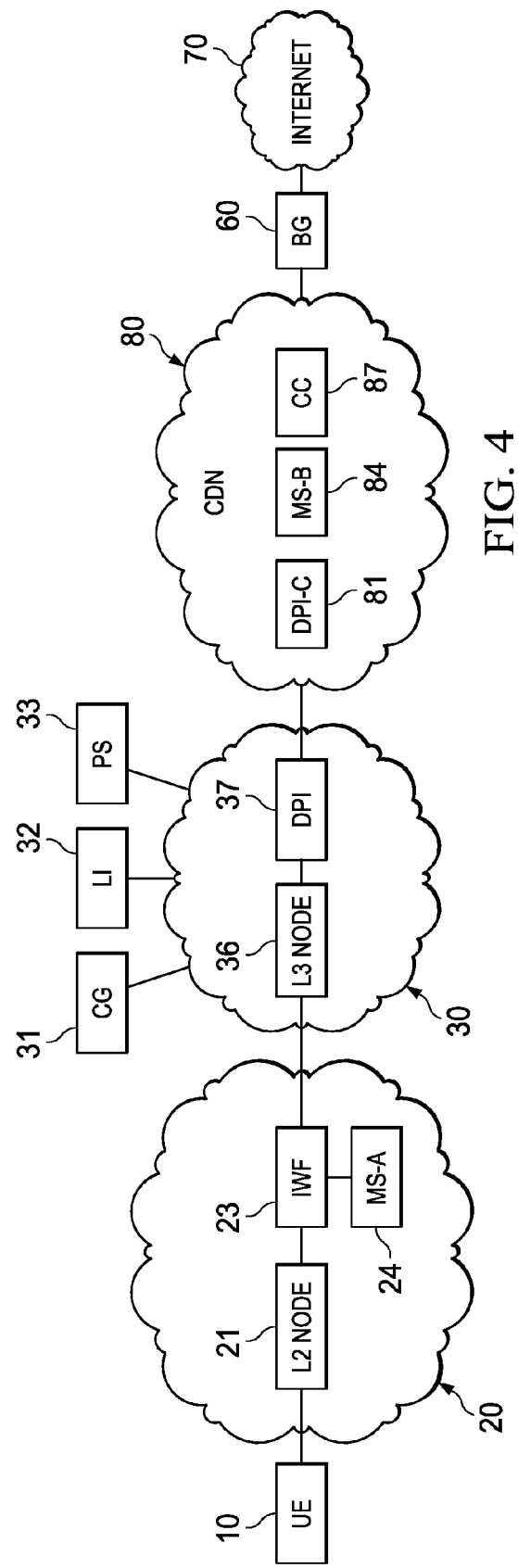
FIG. 4 illustrates a unified content delivery network solution for MBB and/or FBB networks in accordance with an embodiment of the invention.

Embodiments of the invention will be first described using the system architectural framework of FIG. 4. Detailed structural embodiments of various units will be described using FIGS. 5-6, 8-9. Embodiments of the invention as applicable to mobile broadband network, XDSL network, cable broadband network will be described using FIGS. 7, 22, and 23 respectively. Embodiments for flow operations for MBB network will be described using FIG. 11. Embodiments of the invention relating to handling of roaming/relocation will be described using FIG. 12-15. Embodiments of the invention for lawful interception will be described using FIG. 17-19. Embodiments of the invention for handling of charging, reports, and analytics as well as quality of experience provisions will be described with respect to FIG. 20. Embodiments of the invention for handling of failure of media servers will be described with respect to FIG. 21.

FIG. 4 illustrates a unified content delivery network solution for MBB and/or FBB networks in accordance with an embodiment of the invention.

In FIG. 4, the UE 10 represents an end user device such as a mobile or device with a wireless card. Referring to FIG. 4, a L2 network 20 having multiple L2 nodes 21 and a L3 network 30 having multiple L3 nodes 36 form an access network towards the internet 70. Various embodiments include an inter-working function IWF 23 and a L3 based media server MS-A 24 within the L2 network 20 beside the L2 node 21. The IWF 23 serves as the interface and routing function between the layer2 nodes in the L2 network 20 and the MS-A 24.

Media servers located in L2 networks are labeled as MS-A, while media servers located in L3 networks are labeled as MS-B so as to distinguish the different type of media servers.

Within the L3 network 30, a deep packet inspection (DPI) 37 function examines UE requests for signature match to determine if a request needs to be diverted to the content delivery network (CDN) 80 for further processing. Therefore, the DPI 37 diverts certain UE requests to the CDN 80 for further processing.

DPI 37 may be configured to inspect the packet passing through it, for example, searching for protocol non-compliance, viruses, spam, intrusions or predefined criteria to decide what actions to take on the packet, including collecting statistical information. DPI 37 may add the ability to look through Layers 2-7 of the OSI model, which may includes headers and data protocol structures as well as the actual payload of the message. DPI 37 may identify and classify traffic based on a signature database that includes information extracted from the data part of a packet, allowing finer control than classification based only on header information. In one more embodiments, the DPI 37 may identify if the traffic comprises an OTT class. A classified packet may be redirected, marked/tagged, blocked, rate limited, and/or reported to a reporting agent in the network.

The CDN 80 is typically a set of servers strategically deployed over an all IP network and may or may not be hierarchical. The CDN 80 may have a plurality of different units, which may be geographically distributed. Examples of units within the CDN 80 include servers placed at various points in CDN 80. For example, a UE 10 may access a copy of the data that is in the nearest server, as opposed to accessing from a central server. Alternatively, multiple users located at similar locations may access same files from different servers preventing overloading of a single repository server. Content types stored in CDN 80 may include web objects, downloadable objects (media files, software, documents), applications, real time media streams, and other components of internet delivery (DNS, routes, and database queries).

In various embodiments, an off-path content level deep packet inspection unit (DPI-C) 81 in the content delivery network (CDN) 80 understands the OTT requests and decides the appropriate media server to serve the UE making the media request. By using an external DPI-C 81, the impact to the existing network components is minimized. This is because DPI 37 is typically already integrated into the L3 nodes 36. Therefore, the additional functionality is separated from the already existing DPI 37.

In various embodiments, the MS-A 24 is introduced into the L2 network 20, which is much closer to the UE 10, while decoupling functionality of the CDN 80 with the L2 network 20 and the L3 network 30 as much as possible. In various embodiments, the intensive operations, such as DPI-C 81 functionality, are maintained at the CDN 80, which is better equipped for performing complex tasks than the L2 nodes 21. This avoids the need for adding expensive resources to the L2 nodes for performing intensive operations. Advantageously, by combining the above, the access networks (MBB or FBB) and CDN 80 can maintain their relative independence in functionality while cooperating to maximize the effectiveness of handling OTT traffic, and the B2B and B2C services if they are also present in a common unified approach.

The inserted functions in the L2 networks 20 and the L3 networks 30 may take on several different configuration forms as illustrated in FIGS. 5 and 6.

FIG. 5, which includes FIGS. 5A-5D, illustrates the configuration of the L2 network in accordance with embodiments of the invention.

Figure 5A:
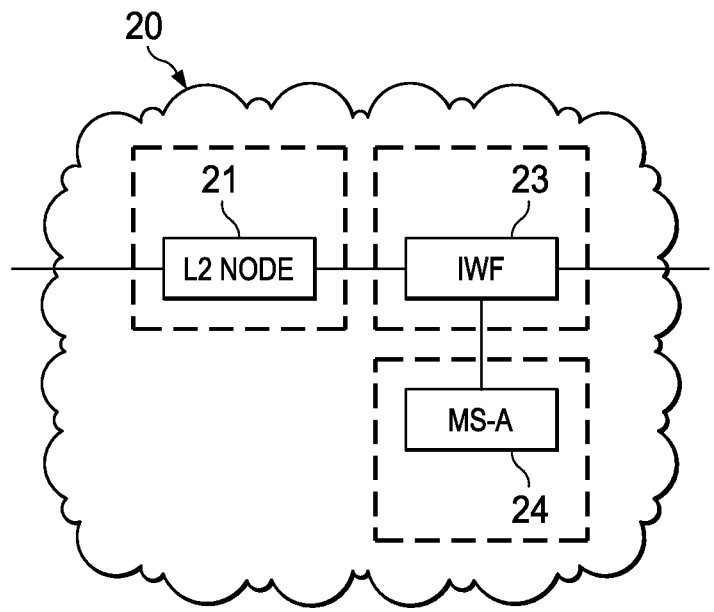
FIGS. 5A-5D, illustrates the configuration of the L2 network in accordance with embodiments of the invention.
Figure 5B:
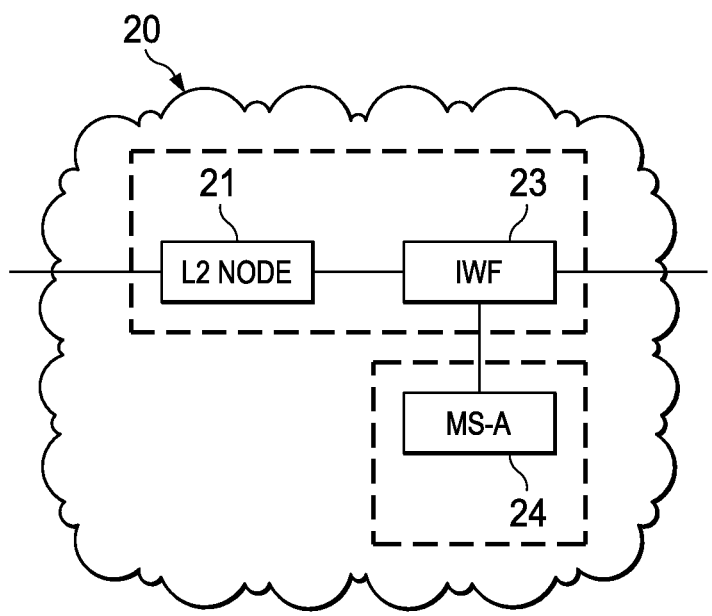
Figure 5C:
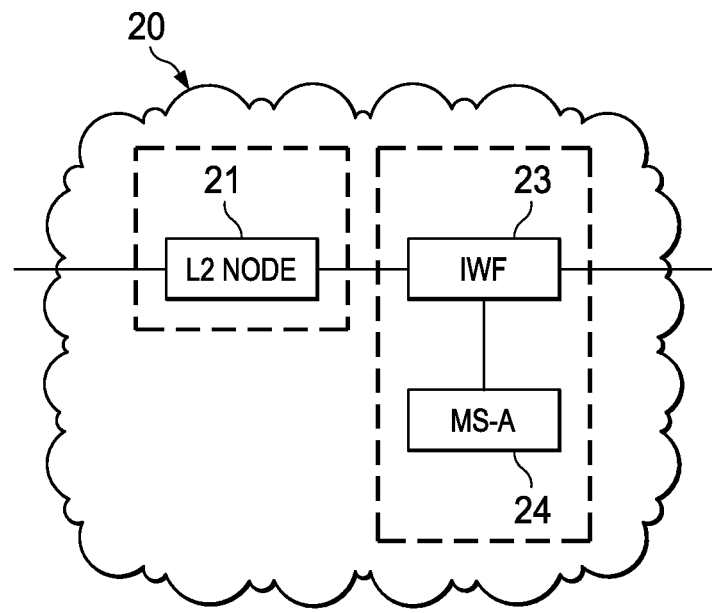
Figure 5D:
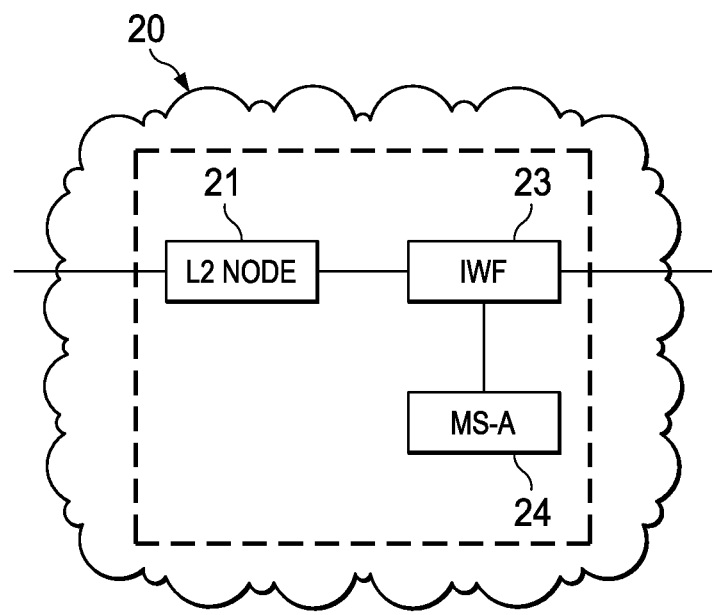

FIG. 5A illustrates an embodiment in which the L2 Node 21, the IWF 23, the MS-A 24 are formed as separate units (e.g., physically separate machines). In FIG. 5B, the L2 Node 21 and the IWF 23 are a single integrated unit (same box/machine) while MS-A 24 is formed independently. In FIG. 5C, the IWF 23 and the MS-A 24 are formed as an integral unit while L2 Node 21 is a separate unit. In FIG. 5D, all the components are integrated into a single physical unit.

In FIG. 5, configurations illustrated in FIGS. 5A and 5C offer the benefit of transparent introduction of MS-A 24 into the L2 network 20 without any impact to the L2 Nodes 21. This requires the IWF 23 to offer complete transparency for L2 nodes 21 when MS-A 24 is introduced into L2 network 20. One of the benefits of this is that L2 node 21 may be offered from a different provider than the provider offering IWF 23 and MS-A 24.

In contrast, the configuration in FIG. 5B allows significant simplification of the IWF 23 because many of the messaging and data flow information for a L2 communication is already present in the L2 node 21.

FIG. 6, which includes FIGS. 6A-6D, illustrates the configuration of the L3 network and content delivery network in accordance with embodiments of the invention.

Figure 6A:
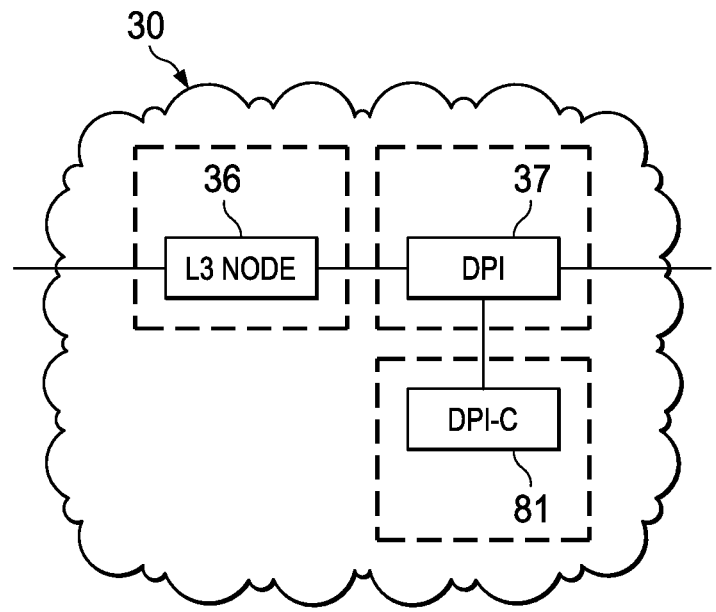
FIGS. 6A-6D, illustrates the configuration of the L3 network and content delivery network in accordance with embodiments of the invention.
Figure 6B:
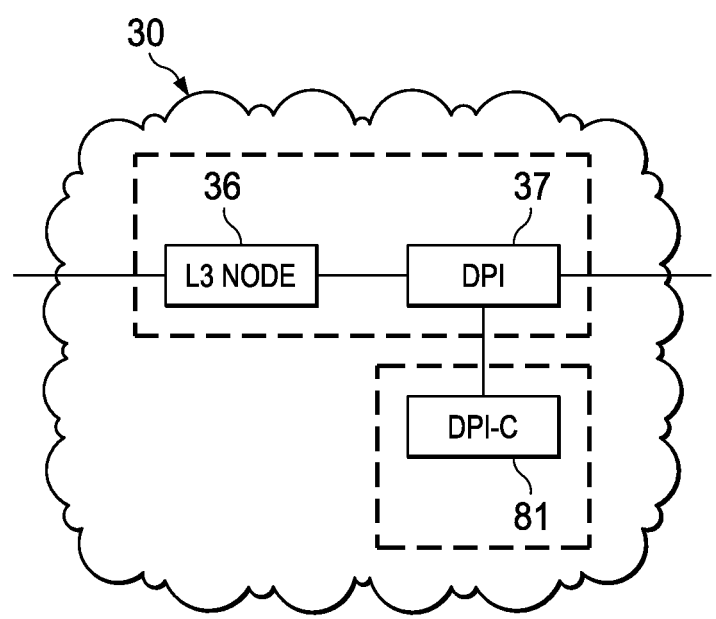
Figure 6C:
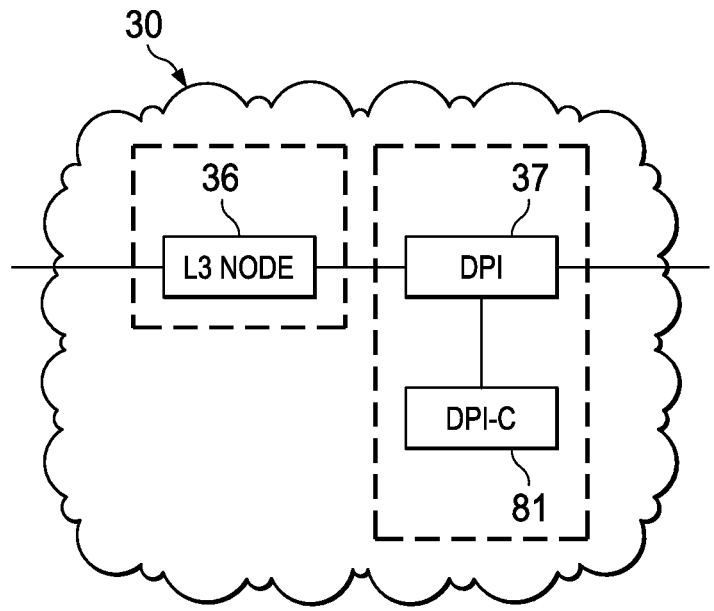
Figure 6D:
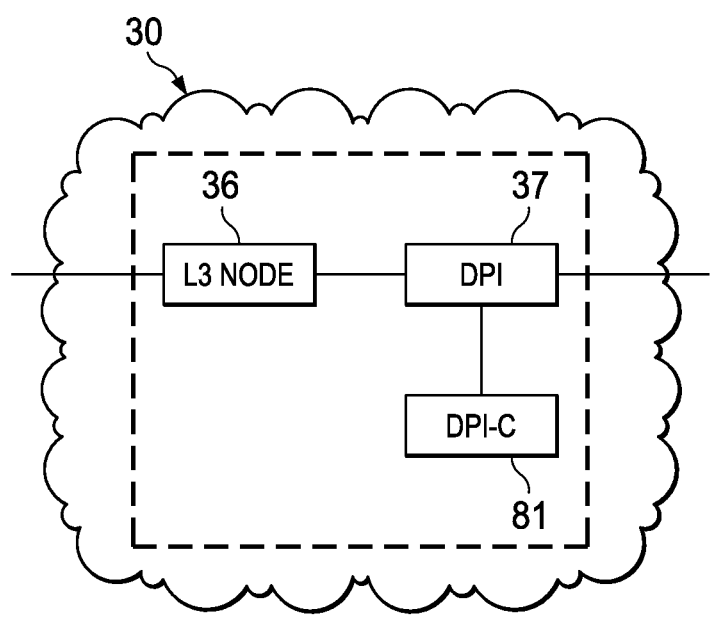

FIG. 6A illustrates an embodiment in which the L3 Node 36, the DPI 37, the DPI-C 81 are formed as separate units (e.g., physically separate machines). In FIG. 6B, the L3 Node 36, the DPI 37 are a single integrated unit (same box/machine) while DPI-C 81 is formed independently. In FIG. 6C, the DPI 37 and the DPI-C 81 are formed as an integral unit while L3 Node 36 is a separate unit. In FIG. 6D, all the components are integrated into a single physical unit.

Referring to FIG. 6, the configurations of FIGS. 6A and 6B offer the benefit of minimal delay for the non-OTT traffic, and the decoupling between the access network 30 (L3 node 36 and DPI 37) and the CDN network 80 (DPI-C 81). Decoupling the content level DPI and the basic DPI for OTT traffic recognition is advantageous because content level DPI for handling OTT requires on-going tuning of the DPI signature and provisioning for the DPI algorithms to handle changes in the OTT content and traffic profiles.

Therefore, configurations illustrated in FIGS. 6C and 6D are unable to offer these benefits. Since many L3 nodes 36 currently deployed also include the ability to perform DPI 37, configuration of FIG. 6B has the added advantage of reusing the function of the DPI 37 embedded in the L3 nodes 36. However, the configurations illustrated in FIGS. 6C and 6D may be deployed in new architecture scenarios where backward compatibility and pre-existing equipment issues do not exist.

The associated functions at the top of the L3 network 30 (CG 31, LI 32, and PS 33) serve as the charging, lawful interception and policy server function to complete the access network services. There are several other innovative features surrounding the interaction with these functions which will be discussed later in the document. For clarity, functions not closely related to the description and understanding of this invention has been omitted.

Figure 7:
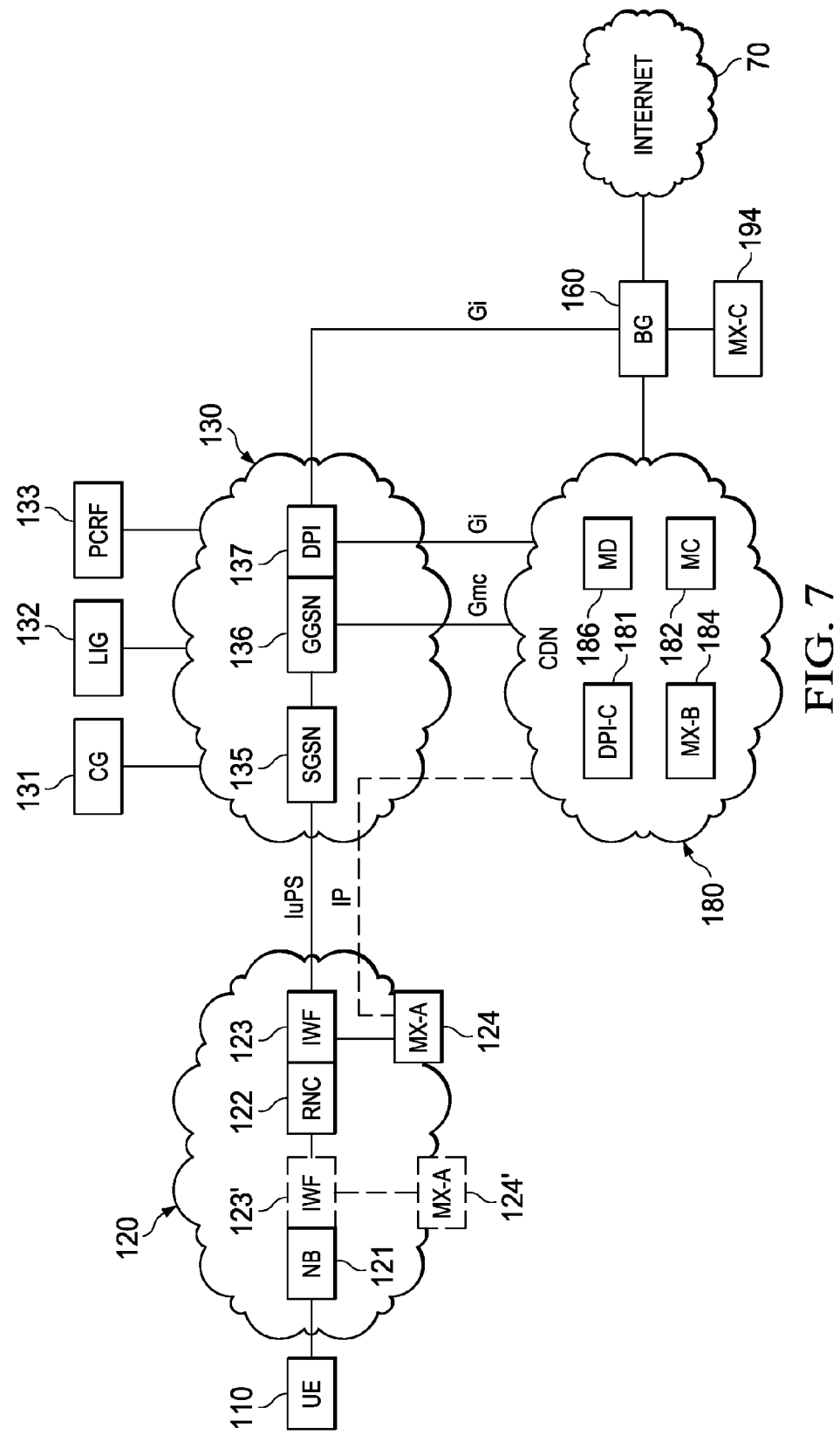
FIG. 7 illustrates a unified content delivery solution as applied to a MBB network in accordance with an embodiment of the invention.

FIG. 7 illustrates a unified content delivery network as applied to a MBB network in accordance with an embodiment of the invention. Embodiments of the invention applied to MBB networks particularly have many advantages although embodiments of the invention as described with respect to FIG. 4, which illustrates a generic method and apparatus, are applicable to both Mobile Broad Band (MBB) and Fixed Broad Band (FBB) networks.

FIG. 7 illustrates MBB functional components mapped onto the generic description of FIG. 4. Referring to FIG. 7, in this embodiment, Node-B (NB) 121 and/or RNC 122 may be the L2 nodes 21 of FIG. 4, while GGSN 136 may be the L3 node 36 in FIG. 4. As in FIG. 4, a caching media server MX-A 124 is deployed within a radio access network 120. The dotted line in FIG. 7 is an alternative MX-A 124' (along with an alternative IWF 123') deployment location (at NB) for the caching media server although deploying the MX-A 124 in the RNC 122 remains to be the deployment location of MX-A for practical purposes. The CDN Control (CC) 82 function in FIG. 4 may be a media controller (MC) 182 function in FIG. 7. The MC 182 selects and assigns the best positioned media server MX (MX-As and MX-Bs) to serve a given request from UE 110.

The connection between IWF 123 and MX-A 124 is an L2/L3 connection so that traffic to and from MX-A 124 can be routed properly into and out of the L2 network via the IWF 123. Practically, all of the MX-As' 124 IP addresses may be provisioned to be the same for the RNCs 122 and IWFs 123 (as in the case of wireless application protocol gateways WAP GW's), but MX-As 124 have separate uniquely routable IP address towards the CDN/internet side of the network. As described further below, in other embodiments, alternative IP address allocation using an IP address pool for MX-As may also be used as described later.

The dotted line between MX-A 124 and CDN 180 represents an all IP transport network which is likely available in most MBB deployments. In an alternative embodiment, a tunnel/path through RNC 122/IWF 123-SGSN 135-GGSN 136-DPI 137 may be used to communicate with components in the CDN 180. This alternative requires IWF 123 to provide needed routing translation between MX-A 124 and CDN 180 from within confines of the tunneling protocols (e.g., GPRS tunneling protocol for carrying user data GTP-U). Therefore, this is more efficient if the IWF 123 is integrated with the RNC 122 so that the packaging of GTP message and context are in place when routing messages from MX-A 124.

In various embodiments, the communication between GGSN 135 and MC 180 may take on at least two forms.

In a first embodiment, as illustrated in FIG. 7, the GGSN 136 and MC 182 may have a direct private interface Gmc (a simple RESTful API, i.e., an application programming interface conforming to the representational state transfer constraints) for GGSN 136 to provide relevant PDP context information to MC 182 for request handling. There are two additional modes of operations of this private interface. In various embodiments, a direct interface between the GGSN 136 and the MC 182 is provided, which may use other type of protocol for request handling as known to one skilled in the art.

First, GGSN 136 may push any new creation, update, and deletion of active PDP contexts to the MC 182. Each GGSN 136 may only need to push the information to the MC 182 it is connected with assuming each GGSN directly connects with at most one MC 182.

Second, the MC 182 may always query GGSN 136 for the PDP context info using the current IP address of the UE 110 as the query key. The MC 182 only queries the GGSN(s) 136, with whom the MC 182 is directly connected. If multiple GGSNs are connected to a single MC, then the query may be sent to all of the multiple GGSNs unless the DPI 137 includes information of the GGSN 136 in the forwarded requests and MC 182 is designed to parse for it.

In a second embodiment, as illustrated in FIG. 7, the UE HTTP message parameter augmentation may be relied upon to pass on PDP information from GGSN 136 to the MC 182 through the DPI 137, the DPI-C 181. In this case, the GGSN 136 includes those relevant PDP context parameters (see Table 1) in the augmented HTTP header. This option may impact performance of the GGSN 136 because the augmentation of HTTP messages at GGSN 136 requires additional processing.

FIG. 8, which includes FIGS. 8A-8D, illustrates different configurations for configuring components in a content delivery network in accordance with embodiments of the invention.

Figure 8A:
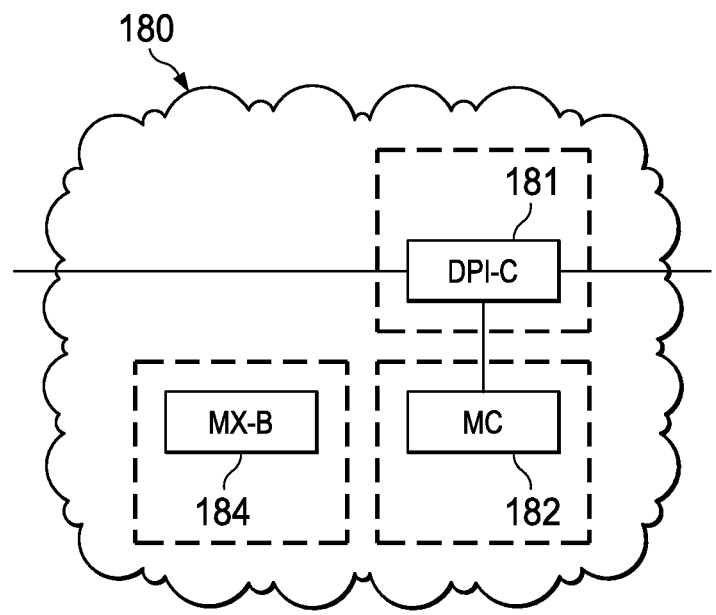
FIGS. 8A-8D, illustrates different configurations for configuring components in a content delivery network in accordance with embodiments of the invention.
Figure 8B:
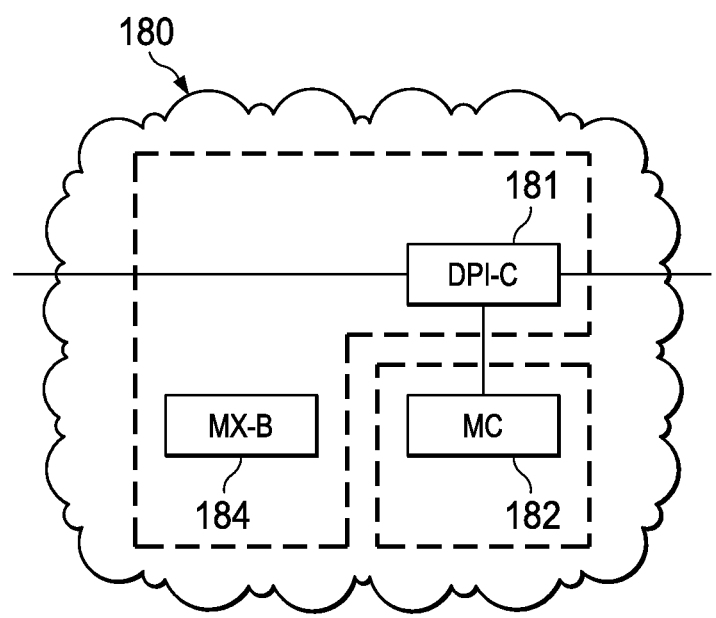
Figure 8C:
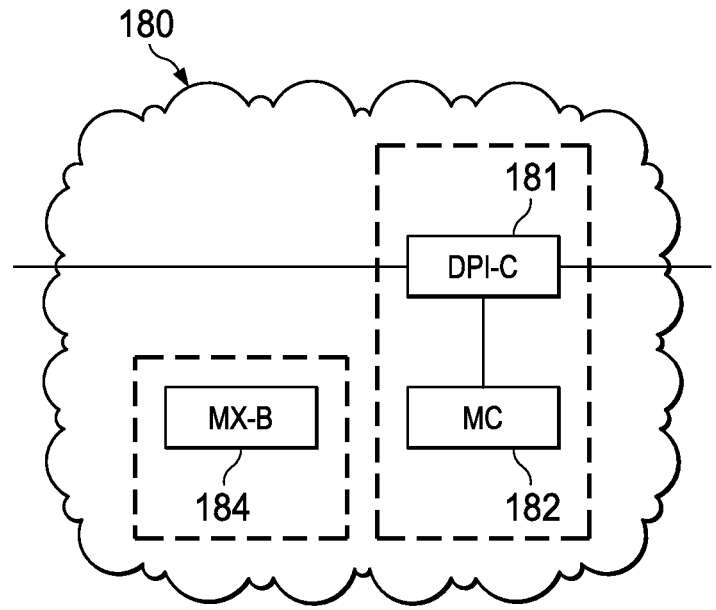
Figure 8D:
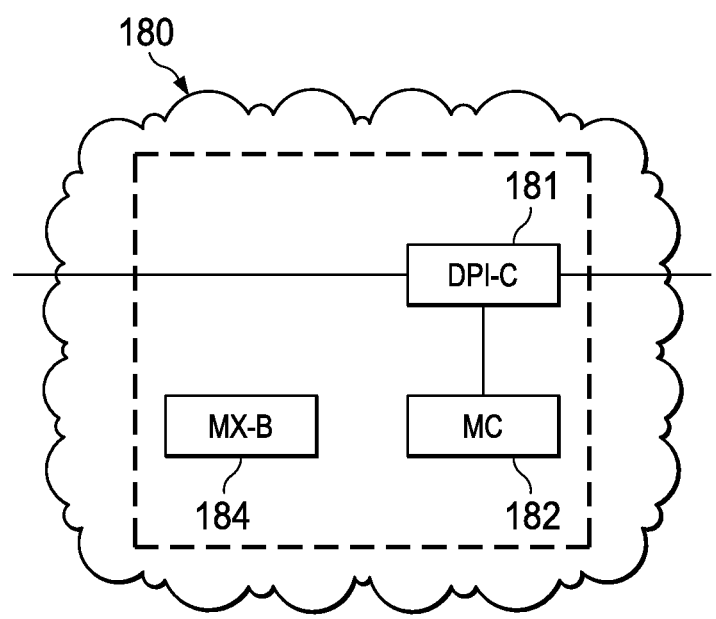

In various embodiments, the DPI-C 181, the MC 182, and the MX-B 184 may be implemented in separate units (e.g., physically different computers) or integrated. FIG. 8A illustrates an embodiment in which the DPI-C 181, the MC 182, and the MX-B 184 are implemented as separate units in the CDN 180 while FIG. 8D illustrates an embodiment in which they are integrated into a single unit. In FIG. 8B, the DPI-C 181 and the MX-B 184 are implemented together in a single unit, while in FIG. 8C the DPI-C 181 and the MC 182 are integrated together.

FIG. 9 illustrates a hierarchy of media servers deployed in accordance with embodiments of the invention. Embodiments of the invention include a hierarchical set of media servers including a first media server MX-A 124 in the radio access network 120, a second media server MX-B 184 in the CDN 180, and a third media server MX-C 194 in the higher levels, e.g., at a packet delivery network (PDN) peering point, or a border gateway. The media controller (MC 182 in FIG. 7) in the CDN 180 selects the appropriate media server MX when a UE requests to be served. Therefore, embodiments of the invention create a hierarchical caching network under CDN control from MBB RAN networks to PDN's peering points.

The hierarchy of media servers provides the CDN 180 the ability to handle the unique characteristics of MBB networks. For example, hot, warm and colder content (hot being most requested) may be cached at different levels of the cache hierarchy. In one or more embodiments, MX-A, MA-B, and MC may be assigned to keep local, regional, and overall content hotness respectively to optimize cache efficiency at various levels and balance request handling over the CDN network.

FIG. 10 illustrates a table of packet data protocol (PDP) context data stored in a media controller in accordance with an embodiment of the invention.

Referring to the table in FIG. 10, the MC 182 may keep a subset of PDP context data in a table, for example, indexed by the UE IP address in order to sync up with PDP status from GGSN 136 for those users handled by MC 182. In the first embodiment and the first mode of operation discussed above, the GGSN 136 may only push updates to MC 182 when there is any change in the PDP context. The MC 182 may maintain its PDP context table using current UE's IP address.

The embodiments of FIGS. 4-9, 12, 14, 15, 17-24 may also be described or illustrated in terms of methods comprising functional steps and/or non-functional acts. The following (and aforementioned) description and related flow diagrams illustrate steps and/or acts used in practicing example embodiments of the present invention. Usually, functional steps describe the invention in terms of results that are accomplished, whereas non-functional acts describe more specific actions for achieving a particular result or step. Although the functional steps and/or non-functional acts may be described or claimed in a particular order, the present invention is not necessarily limited to any particular ordering or combination of steps and/or acts. Further, the use (or non use) of "steps for" and/or "acts of" in the recitation of the claims—and in the following description of the flow diagrams(s) for FIG. 11, 18B, 19B is used to indicate the desired specific use (or non-use) of such terms.

Figure 11:
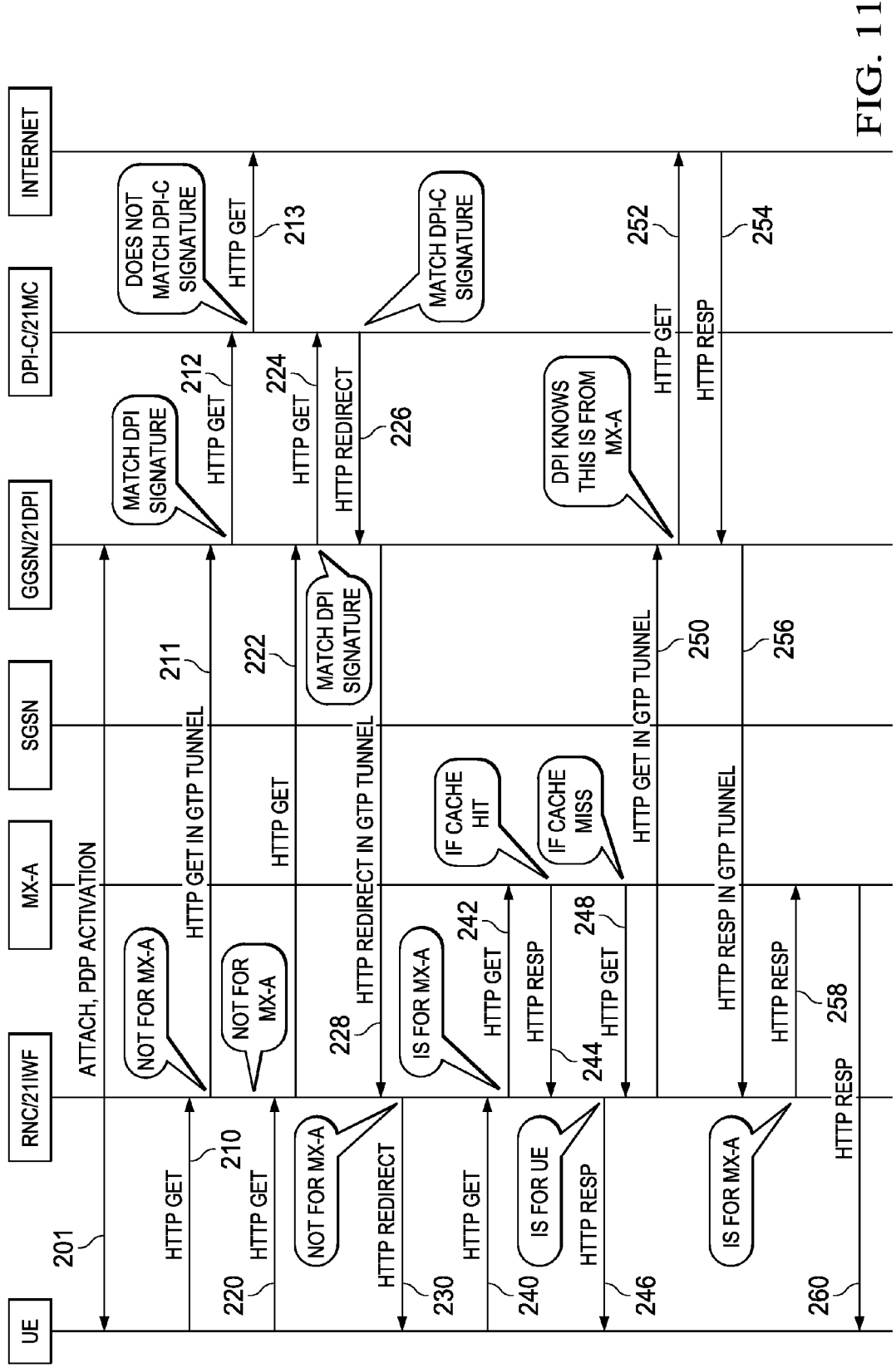
FIG. 11 illustrates control and media message flow operations for normal handling in accordance with an embodiment of the invention.

FIG. 11 illustrates flow operations for normal handling in accordance with an embodiment of the invention.

When a UE, such as UE 10 in FIG. 4 or UE 110 in FIG. 7, requests to view a video from a video portal, such as youtube, hulu, amazon video etc, an HTTP message will be sent to the video portal. This requires that a DNS query and a corresponding TCP connection be established first between UE and video streaming server.

In various embodiments, a PDP context between the UE and the GGSN is established and/or activated (step 201). A PDP context stores the PDP context data for the requesting UE including. In one or more embodiments, the PDP context includes the RAN side MX IP address, e.g., IP address of the MX-A from the side of the RAN 120 in FIG. 7. The PDP context may also include the standard parameters as described in FIG. 10.

Next, the UE transmits a HTTP GET REQUEST to the GGSN/DPI through the RNC/IWF (messages 210 and 211). The GGSN/DPI node processes the received HTTP GET request. The DPI may look for certain signature of the HTTP request such as destination IP address and port#, and compare them with a pre-stored list of the OTT signatures to determine if this request is to fetch a OTT content. For some OTT sites, the signature analysis may involve more than a 5-tuple analysis and real DPI of HTTP header parameters analysis may be required, which requires a different type of signature.

In the flow diagram, it is assumed that this request matches the signature stored at the DPI (DPI determines that the request is OTT content). The DPI forwards this HTTP GET request to DPI-C (deep content URL DPI) via an IP connection between the DPI and the DPI-C function (message 212). DPI will not change anything on this HTTP GET request message. In some embodiments, this forwarding may be implemented via Generic Routing Encapsulation (GRE) tunnel or Web Cache Communication Protocol (WCCP).

Next, DPI-C decides whether the content is cacheable content. The DPI-C function receives the forwarded HTTP GET request from the DPI. DPI-C performs a deep URL and HTTP header analysis to try to match the stored signatures at DPI-C function with the forwarded message. The required DPI-C signatures and algorithms may vary depending on the specific video portal sites to be handled (for videos such as Youtube, BBC, Hulu, etc.) and/or software download sites (for large files such as windows updates, etc.). In one or more embodiments, the DPI-C focuses on HTTP message type, UserAgent while other parameters may be included in various embodiments.

In the illustration of FIG. 11, it is assumed for this flow the initial video portal media request (as with most other video sites) does not match the signature described above (i.e. DPI-C determines the content is not cacheable). For example, this request may lead to an HTML page on which a media player will be initialized and the media player will initiate a separate request to GET the video file. The DPI-C forwards this request unchanged towards the BG (or on-path routers) in the MBB Packet Data Network (PDN) and the HTTP request continues on its journey towards the Youtube server (message 213).

After several additional HTTP message exchanges, the DPI receives another HTTP Get Request from the UE, determines it is OTT content, and forwards it to DPI-C (messages 220, 222, 224). This time, the GET request comes from a media player (e.g., a shockwave player). The GET request may contain a signature that matches the stored signatures at DPI-C. Therefore, the DPI-C decides that the content is cacheable content.

Next, the DPI-C informs the MC regarding its evaluation that the content is cacheable. In various embodiments, as illustrated in FIG. 8, the DPI-C may run on either MX-B, or MC, or as a stand-alone DPI-C box, depending on the traffic dimensioning profile of the operator. For this discussion, we assume that the DPI-C, MX-B and MC are interconnected and routable at IP level so that the internal connections and forwarding among DPI-C, MX-B and MC are not detailed here. If the DPI-C runs on MX-B and for those requests that need to be served by the CDN, the request messages are forwarded from the MX-B/DPI-C to the MC because the MC selects the media server (MX) to serve any given request.

The CDN has to be involved in serving this request after the DPI-C determines that the request is cacheable content and the MC has received the HTTP request from the DPI-C. In one or more embodiments, the MC, which is located in the CDN, performs the following set of MBB network specific tasks for selecting the appropriate caching media server (MX) for serving this HTTP request.

As discussed above, the MC stores a subset of the PDP information it gets via Gmc (a RESTful control info API to GGSN, see FIG. 7). In various embodiments, the MC may use different alternate methods to determine which MX-A is in the PDP path serving the current UE.

In one embodiment, location information such as router area identity or service area identity (RAI/SAI) may be used to select the media server. For example, a RNC is selected based on the RAI/SAI, for example, using a table that has a mapping between RNC and RAI/SAI. The location of the media server is decided from the RNC. The MC may store a MC table comprising all RNC-RAI/SAI mapping.

In an alternative embodiment, UE IP range and mapping to RNC may be used if there is such a deterministic relationship. In a further alternative embodiment, RAN Side MX-A IP Address, which is an optional parameter to be added in the PDP context at GGSN is forwarded to MC during initial PDP setup or any subsequent changes of parameters. In a further alternative embodiment, RNC IP address or ID is obtained via communication between GGSN and SGSN, and MC keeps a mapping table between RNC IP/ID and its local MX-A IP.

The MC selects a media server from a hierarchical set of media servers as described in FIG. 9. The method for this selection will be further described below. As part of the CDN MX cloud, the MX's keep status and heart beat with the MC's (in the MC cloud) so that the loading condition and availability of the MXs is instantly known at the MC.

In one embodiments, the MC may decide to redirect the current request to one of the many MX-As (RAN side MX-A's, as UE relocates/roams across RNC's. In an alternative embodiment, the MC selects one of several MX-B at the GGSN level, or one of MX-C's at the one of the packet data network (PDN) peering points or BGs level (as illustrated in FIGS. 7 and 9).

In various embodiments, the policy and/or heuristics for determining the best serving MX can be done in several ways.

In one embodiment, the MC may have a policy of always rounding to the current serving MX-A for a given UE (i.e. IWF/MX-A on the UE's PDP path), unless the MX-A is overloaded. As the UE travels across RNC's RAIs/SAIs, the serving MX-A may change depending on scenarios of the relocation. This is further discussed below under roaming/relocation. Under this policy, the MC always picks the current serving MX-A. This is further discussed under handling of policies.

In an alternative embodiment, the operator's may have many CDN request serving policies (as part of the B2B and B2C services under traditional CDN implementation). Likewise, they can introduce OTT specific request routing policies via the same scheme. These schemes may take the form of either a set of policies provisioned (statically or dynamically) to the MC's via CDN's Network Operation's Center (NOC) or via configuration tables downloaded to the MX's, or both. When there is a cache miss at a serving MX-A, the local configuration table may be configured to go up the cache hierarchy to try to obtain the requested content or to consult the MC for advice as one of the entry in the configuration table.

In various embodiments, after selecting the MX for serving the UE, the HTTP GET request is redirected to the serving MX-A for this UE (messages 226, 228, 230, 240, 242). In one or more embodiments, the redirection to MX-A is performed as described below.

The MC or DPI-C constructs and sends a redirect message to the UE. The MC or DPI-C constructs an HTTP 302 (or HTTP 303 redirect) message with destination IP as UE, and source IP as video portal server IP address (i.e., destination of current HTTP get request that is being processed). The URL will be augmented with the original service URL which is useful for MX-A to retrieve content in cache miss scenarios. Since the MC/DPI-C and the GGSN/DPI has existing TCP connection, the MC can simply forward this fake HTTP 302 message to GGSN/DPI (as message 226) which will naturally route the request to the destination UE under that UE's existing TCP connection with the media portal server (message 228 and 230). This assumes that the TCP sequence # matches with the media portal side by analyzing it at the DPI function.

If the above redirection is not possible or not easily done, in an alternative embodiment, the TCP connection between the UE and media portal server is broken (forcibly disconnected) and a TCP proxy is set up at DPI-C with two separate of TCP connections. A first connection is set up between UE and DPI-C via GGSN/DPI and a second connection is set up between DPI-C and the media portal server via BG.

Using above method, the UE receives a HTTP 302 (or 303) redirection message from the DPI-C/MC. The UE will attempt to contact the new URI/IP address which points to the serving MX (MX-A) connected to the RNC and IWF. The UE transmits a HTTP GET to the RNC/IWF (message 240).

The RNC/IWF receives the UE HTTP GET and forwards it to the media server MX-A. In various embodiments, this may be performed using one of the following embodiments.

In one or more embodiments, if an IWF is embedded inside the RNC, then the IWF function will attempt to open GTP-U messages' user data to look for the destination IP address of the UE communication. The message is assumed to be destined for the serving MX-A connected to the RNC/IWF if the destination IP address maps to a pre-stored IP table at the RNC/IWF. This pre-stored IP table needs to be provisioned into all of the RNC/IWF's as the MX-As are deployed into the RAN network and the RNC/IWF has to repackage the GTP-U message into an HTTP/TCP/IP message to forwarding to the MX-A.

Alternatively, in another embodiment, IWF may be a separate box outside of the RNC on the IuPS interface path. The IWF transparently passes through all of the RANAP or GTP-C messages between RNC and SGSN. In contrast, IWF will intercept the GTP-U messages and open the user data to screen for destination IP addresses. If there is a match with the IP address pre-stored in the IP table, then IWF function shall repackage the message and forward it to MX-A connected to it.

MX-A receives the HTTP GET, which is the UE's HTTP request (as redirected by the MC) (message 242). Now that MX-A has received the UE's HTTP request (as redirected by the MC), MX-A perform the following HTTP request processing in various embodiments.

MX-A generates an index to represent content being served. MX-A parses the HTTP request for the URL and other pertinent information to derive an index key for the content. The URL construction for video portals does not follow any standard and changes frequently. In various embodiments, any common identification scheme may be used as long as it produces a unique ID for each given content file. For example, URLs may be different but the content identification portion may still be the same. Therefore, in various embodiments, the content identification portion may be extracted and used as an index key for the cached content file (hashing may be required). Further adjustments may be required for adaptive HTTP delivery because MX-A sees a large number of small video segment files.

A unique file name is generated at MX-A. The MX-A derives a unique content/file ID from the URL of the HTTP get request. This unique URL portion will be used to create a unique hash key, which may be used to locate the content/file in MX-A cache system. This may not be 100% reliable and may change over time because the content of the media is OTT. Therefore, two requests for the same content/file may be mapped to different file ID, which may create multiple copies of the same content/file. Two requests for different content/files may, in some instances, be mapped to the same content.

The data is retrieved from the cache and transmitted to the UE if MX-A finds it in the MX-A cache (messages 244 and 246). If there is a cache hit, then MX-A will attempt to serve this file to the UE according to the UE request. In various embodiments, CDN media adaption (transcoding, transrating, file format adaptation, etc.), PCRF QoS oriented treatments (QoS guarantees and limiting/capping of bandwidth based on user or rating group, etc.) may be applied. This is further discussed with respect to handling of policies. After applying media adaption as necessary the MX-A sends the first HTTP response to the UE with media data. This is done via the GTP-U routing capability of the RNC/IWF node through the existing GTP-U tunnel between UE and the GSN, using the correct GTP-U sequence # kept at RNC/IWF. IWF function needs to keep the sequence # by itself if IWF function is a standalone node separated from the RNC on the IuPS interface, while the combined RNC/IWF function does not require duplication of this GTP handling function in order to route the MX-A to UE messages into the UE's existing GTP tunnel.

In various embodiments, after the session with UE terminates, a log is computed and transmitted to CDN for various operations such as accounting, charging, analysis, etc. Media delivery from the MX-A to UE continues until the session ends, after which case, MX-A generates delivery log(s). These delivery logs are sent to the Media Data (MD) Cloud of CDN network for processing as described below regarding Charging, Report and Analytics.

However, if the requesting data is not in the cache of MX-A, i.e., there is a cache miss, MX-A follows its stored policy rule (existing CDN/MX function) to try to find the content from the next cache server in the cache hierarchy or the origin server (media portal server, whose URL is in the 303/302 redirect message). GGSN/DPI receives the message 250 from MX-A. DPI and DPI-C recognizes that routing for this HTTP request (message 250) from MX-A is not a UE request and forwards it to the media portal server (message 252). This avoids the possibility for an infinite loop to MC again. The media portal server sends the data requested, which is received as an HTTP response (message 254) at the GGSN/DPI. The GGSN/DPI forwards the data through the GTP tunnel to the MX-A (messages 256 and 258). MX-A may cache the content in its caching system and serve the data to the UE (message 260).

However, in some embodiments, the MX-A may also contact MC to find out the location of the content in the CDN network. For this fetch from the upper cache server(s), the MX-A may use the original user HTTP request URL (embedded in the redirect message from the MC), but over a new TCP connection to the upper cache server or origin server via the IP transport network as illustrated in FIG. 7.

Embodiments of the invention have several unique advantages. Using embodiments of the invention allows effective decoupling of Access Network and CDN network for OTT traffic caching. Embodiments of the invention enable deployment of layer3 based media server (media caching and adaptation) in a layer2 network, which is advantageously much closer to the end users without the usual complexity of layer2 DPI and decision making. Embodiments of the invention support a more centralized content level DPI (DPI-C) and decision making in a single CDN, which can serve both MBB and FBB, thereby avoiding including a DPI-C (content level) inside the access network. Embodiments of the invention may leverage a layered cache network to increase cache hit rate and reduce cache miss retrieval time. Embodiments of the invention also provide a hierarchy of cache (MS) backup among distributed MS servers in case of failure of any MS server. Embodiments of the invention support OTT, B2B and B2C services over MBB and FBB networks with a common, unified CDN with identical network configurations which greatly simplifies network deployment, management, and operations.

FIGS. 12 and 13 illustrate the relocation and roaming scenarios in accordance with embodiments of the invention.

In particular, the UE may roam across multiple networks during a session. Embodiments of the invention describe methods to enable caching during/after roaming. Depending on the movement of the UE, different scenarios are possible. These are listed in FIG. 13 and illustrated in FIG. 12.

FIG. 12 illustrates possible reassignment of resources when a UE roams within/across multiple networks. FIG. 13 illustrates a table corresponding to reassignment of resources when a UE roams within/across multiple networks and highlights the possible impact in accordance with embodiments of the invention. In a first scenario I, the UE's relocation may require a relocation of the serving base station, for example, between adjacent base stations (NB 1 1211 and NB2 1212). A second scenario II involves a relocation that requires a relocation in RNC i.e. from a RNC1 1221 to a RNC2 1222 A third scenario III involves requires a relocation in SGSN from SGSN1 1351 to a SGSN2 1352 without changing the GGSN. In a fourth scenario IV, the serving GGSN is relocated i.e. from GGSN1 1361 to GGSN2 1362. Finally, some UE relocates may involve a change from a MBB to a FBB network or vice versa (not illustrated).

Referring to FIGS. 12-13, in the first scenario (I), the UE moves from a first base station (NB1 1211) to another base station (NB2 1212) within the same RAN 120. However, NB1 1211 and NB2 1212 are controlled by the same RNC 1221. Therefore, this relocation is transparent to IWF1 1231 and the MX-A1 1241 because MX-A1 1241 and IWF1 1231 are shared through the common RNC1 1221 (not shown in FIG. 12, see, e.g., 14A). Consequently, no modification is necessary.

Referring to FIGS. 12-13, in the second scenario, UE moves from a first RNC (RNC1 1221) to a second RNC (RNC2 1222). This scenario has several handling options.

Figure 14A:
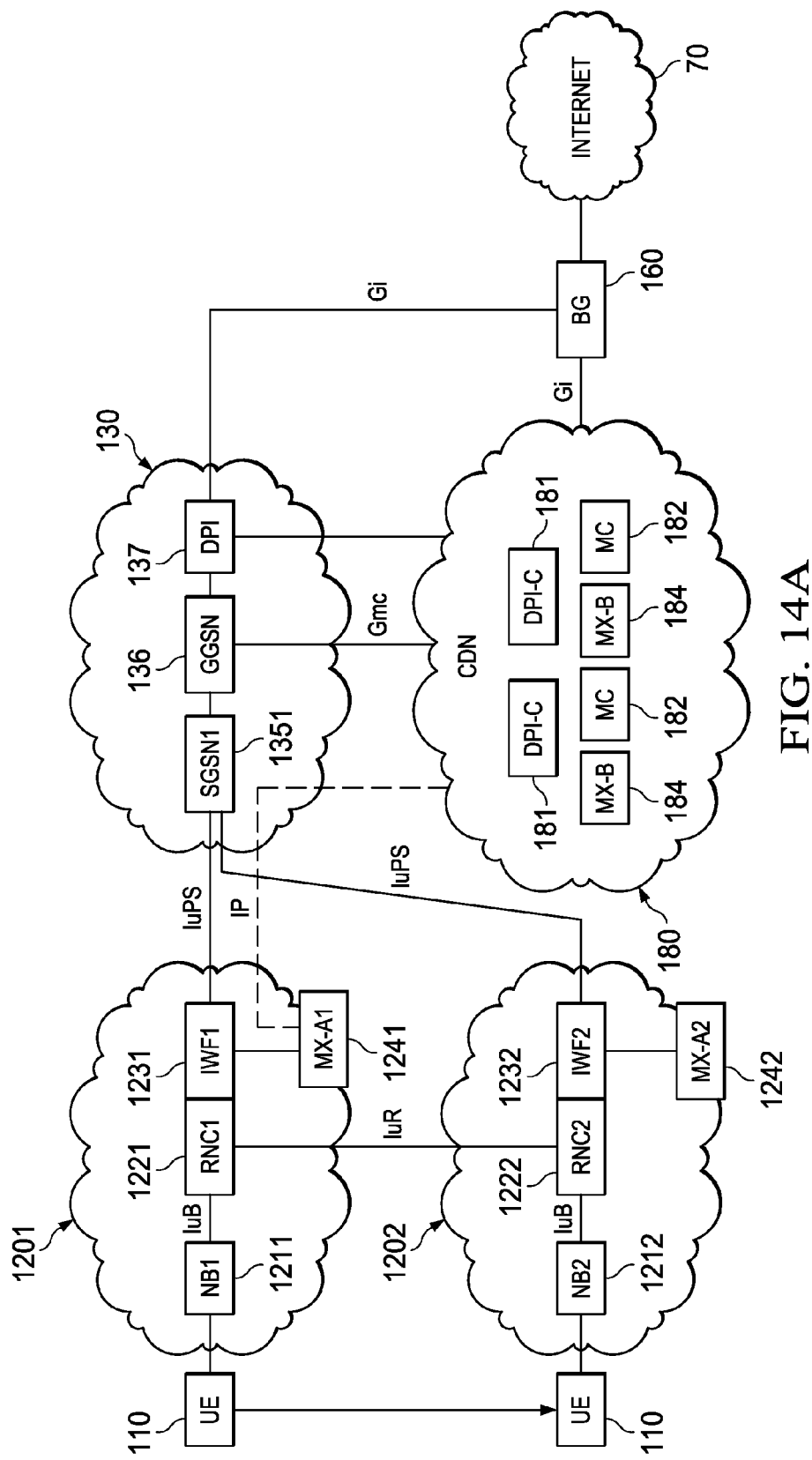
Figure 14B:
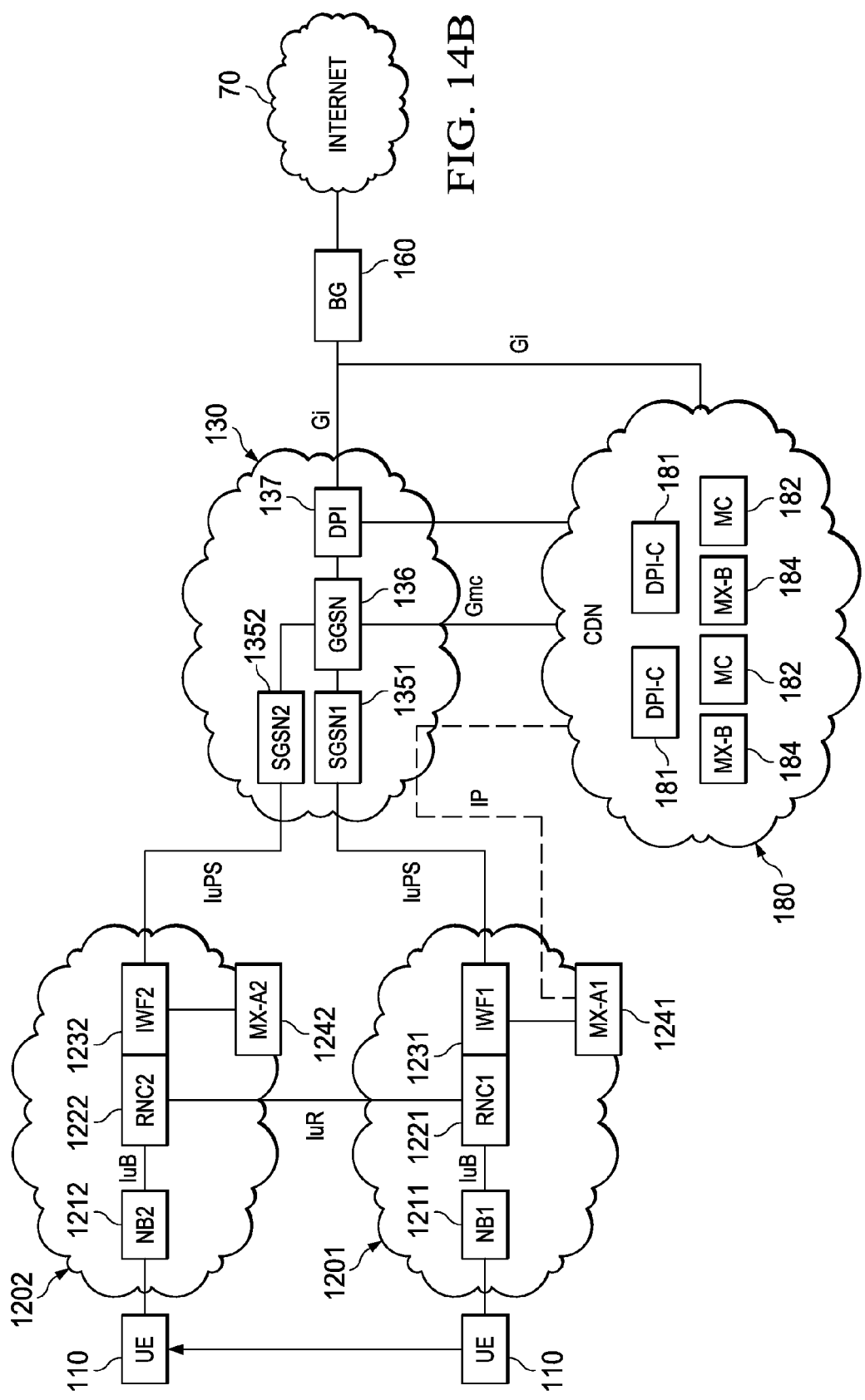
FIG. 14B illustrates an embodiment of roaming under scenario III in FIG. 13.

FIG. 14 illustrates the general network architecture for handling of relocation and roaming in a MBB network in accordance with embodiments of the invention, wherein FIG. 14A illustrates an embodiment of roaming under scenario II in FIG. 12, and wherein FIG. 14B illustrates an embodiment of roaming under scenario III in FIG. 13.

In a first embodiment, the session may be broken and MC 182 redirects the request to a new MX-A (MX-A2 1242), which is local to RNC2 1222. Therefore, in this embodiment, standard 3GPP procedures are followed for relocation and the session between MX-A1 1241 and UE 110 may break. The UE auto-retry scheme (present in most media player) will retry the HTTP GET request through the new RNC2 1222, which forwards the request to the MC 182. The MC 182 redirects the request to the new MX-A2 1242 (local to the RNC2 1222). The new MX-A2 1242 continues content delivery from there as described above. However, the media may restart from the beginning as opposed to where the UE was cut off.

In a second embodiment, the old MX-A1 1241 associated with RNC1 1221 continues to be used. A modified standard 3GPP procedures is followed, which suppresses the relocation procedure at SGSN 135. Therefore, old MX-A1 1241 continues to deliver to the UE 110 through old RNC1 1221/IWF1 1231→IuR→new RNC2 1222→new NB2 1212→UE 110 until the session naturally ends. However, any new request from UE will be redirected to the new MX-A2 1242 serving via new RNC2/IWF2. As mentioned above, the SGSN 135 is modified to implement this option such that it recognizes that there is ongoing delivery session between MX-A1 1241 and UE 110, and therefore, SGSN 135 does not issue a relocation request. Reconfiguration of RNC 1 1221 and RNC2 1221 is required in order for them to forward the UE requests back to the old MX-A1 1241 in the old RAN1 1201 network.

In a third embodiment, the session is broken as in the first embodiment but due to smart buffer management, the UE 110 receives a smooth video without any breaking. As in the first embodiment, a standard 3GPP procedure is followed breaking the session. A special media player performs error concealment so that the user sees a smooth playback although redirection processes are implemented in the background. In one embodiment, the media player includes a smart buffer management with sufficient buffer size. In various embodiments, the media player also includes the ability to retry a non-responding HTTP request with a modified Byte Range parameter so that the media player at the UE will retry starting from where it left off. Since the UE is now in the new RAN2 1202 under the new RNC2 1222, the retry message will be captured by the DPI 137/DPI-C 181/MC 182, and the MC 182 redirects the request to the new MX-A2 1242. The rest of the delivery will continue starting with the Byte Range request from UE. Thereby, the UE avoids restarting the media from the beginning of the session.

In a fourth embodiment, the MC 182 is informed of the impending relocation and MC 182 and/or MX-A1 1241 perform a mid-stream redirect using a smart session. Therefore, the MC 182 and/or MX-A1 1241 are notified of an impending relocation (via SGSN 135 or RNC1 1221). The MC 182 and/or MX-A1 1241 perform a mid-stream redirect request to relocate the UE 110. This communication may be transmitted over the existing IWF1 1231/RNC1 1221→NB1 121→UE 110 or existing IWF1 1231/RNC1 1221→IuR→RNC2 1222→NB2 122→UE 110. The UE 110 media player is configured to support this mid-stream redirect request. The media player is configured to launch a request (with Byte Range starting from the current playback time code offset) to new MX-A2 1242 in response to the redirection instruction from the MC 182 and/or the MX-A1 1241. In the mean time, the UE is receiving the playback from the media player's buffer and does not experience any interruption. The delivery from the new MX-A2 1242 starts before the player buffer is depleted, thereby offering a smooth playback experience to the user.

Referring to FIGS. 12-13, in the third scenario, UE moves from a first SGSN (SGSN1 1351) to a second SGSN (SGSN2 1352). The handling for this scenario is similar to the handling of the previous scenario with some differences in the standard 3GPP messaging flow. Therefore, in various embodiments, the third scenario may be implemented by (a) breaking the session and redirecting to a new MX-A 1241, (b) using the current (old) MX-A 1241 until the session terminates, (c) using a smart session management procedure while breaking the session and redirecting to a new MX-A 1242, or (d) using a smart session management procedure in combination with a mid-stream redirecting procedure.

Figure 15:
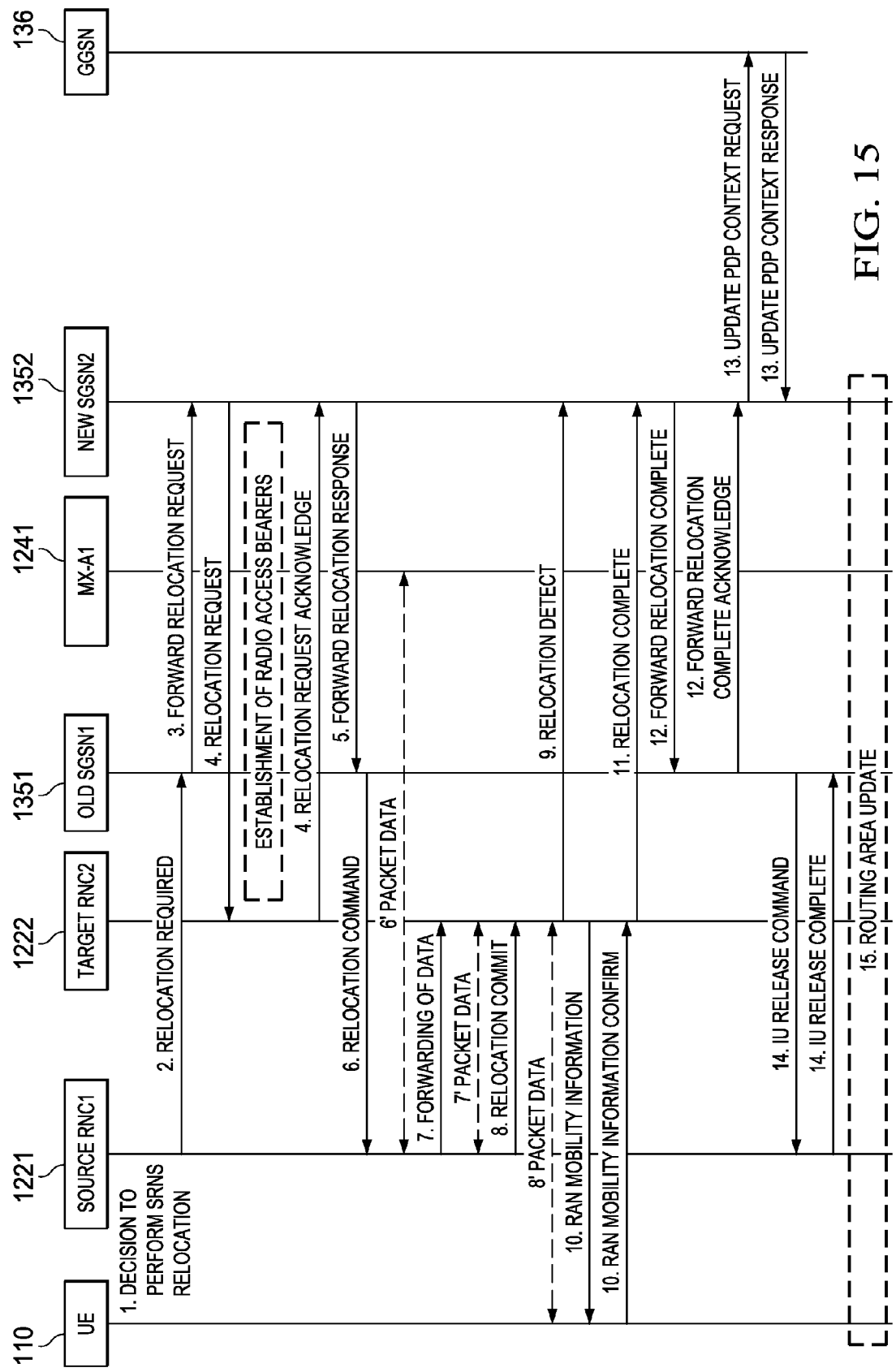
FIG. 15 illustrates a modified procedure for UE relocation across SGSNs in accordance with an embodiment of the invention.

FIG. 15 illustrates a modified procedure for UE relocation across SGSNs in accordance with an embodiment of the invention.

Although described with respect to the third scenario III, the procedure described below may also be implemented in the second embodiment of the second scenario II.

The MX-A is only related to the packet data. Therefore, all the other signaling messages of the MBB network caching relocation procedure remain the same as the relocation procedure of 3GPP. The difference in packet data forwarding illustrated as dashed lines in the messaging flow diagram above. During SRNS Relocation procedure, packet data between old MX-A1 1241 and UE 110 are forwarded by source RNC1 1221 and target RNC2 1222 through LuR, which is the interface between the RNCs. This is illustrated in FIG. 15 as step 6' in which the packet data from the old MX-A 1241 is transmitted to the source RNC1 1221. In step 7', the packet data from the source RNC1 1221 is transmitted to the target RNC2 1222 through IuR. In step 8', the packet data from the target RNC2 1222 is transmitted to the UE 110.

The above relocation scenarios (steps 6', 7' and 8' in FIG. 15) may be implemented in different way in various embodiments.

In a first embodiment, the source RNC1 1221 and target RNC2 1222 are modified. In particular, the source RNC1 1221 is configured to forwarded packet data, whose destination is MX-A1 1241 address, to MX-A2 1242 in relocation state. The new RNC2 is configured to forwarded packet data, whose destination is MX-A1 address, to source RNC1 1221 in relocation state.

In a second embodiment, the target RNC2 1222 may use IP address of the serving MX-A1 1241 (old one) to route through the VPN/IP transport network that connects all of the RNCs and PS core. In this case, each MX-A has a unique IP address in order for the routing to work.

Embodiments of the invention for implementing lawful interception will be described using FIGS. 16-19.

Figure 16:
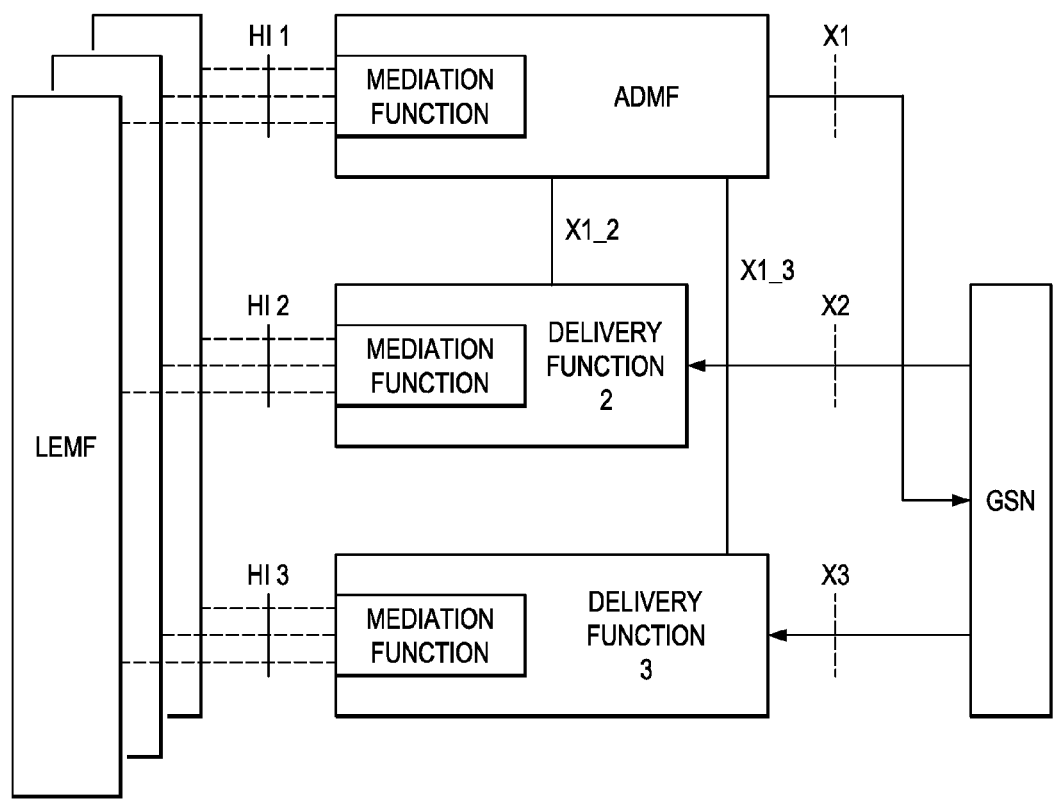
FIG. 16 is a prior art reference configuration of packet switched lawful interception (LI) under 3GPP 33.107, which is incorporated herein by reference.

FIG. 16 is a prior art reference configuration of packet switched lawful interception (LI) under 3GPP 33.107, which is incorporated herein by reference.

In FIG. 16, the reference configuration is only a logical representation of the entities involved in lawful interception and does not mandate separate physical entities. This allows for higher levels of integration.

A Law Enforcement Monitoring Facility (LEMF) is connected to an Administration Function ADMF and two Delivery Functions DF2 and DF3 each having mediation functions. There is one Administration Function (ADMF) in the network. The ADMF interfaces with all the LEAs that may require interception in the intercepting network. The ADMF keeps the intercept activities of individual LEAs separate and interfaces to the intercepting network.

Together with the delivery functions, multiple activations by different Law Enforcement Agencies (LEAs) on the same target are hidden from the 3G intercepting control elements (ICEs). ICEs may be 3G MSC Server, 3G GMSC Server, P-CSCF, S-CSCF, SGSN, GGSN, HLR, AAA Server, PDG, MME, S-GW, PDN-GW, HSS.

The Administration Function and the Delivery Functions are each one connected to the LEMF via standardized handover interfaces HI1, HI2, HI3, and connected to a telecommunication system (GSN, which may be a SGSN or a GGSN) via the interfaces X1, X2, and X3. The ADMF is connected via the interfaces HI1 and X1 while DF2 is connected via HI2 and X2 and DF3 is connected via HI3 and X3.

The messages sent from LEMF to ADMF via HI1 and from the ADMF to the GSN via the X1 interface comprise identities of a target that is to be monitored. The DF2 receives Intercept Related Information (RI) from the network via the X2 interface and delivers the IRI to relevant Law Enforcement Agencies through the HI2 interface. The Delivery Function DF3 receives Content of Communication CC, i.e., speech and data via the X3 interface and delivers the CC to the LEAs through the HI3 interface.

Figure 17:
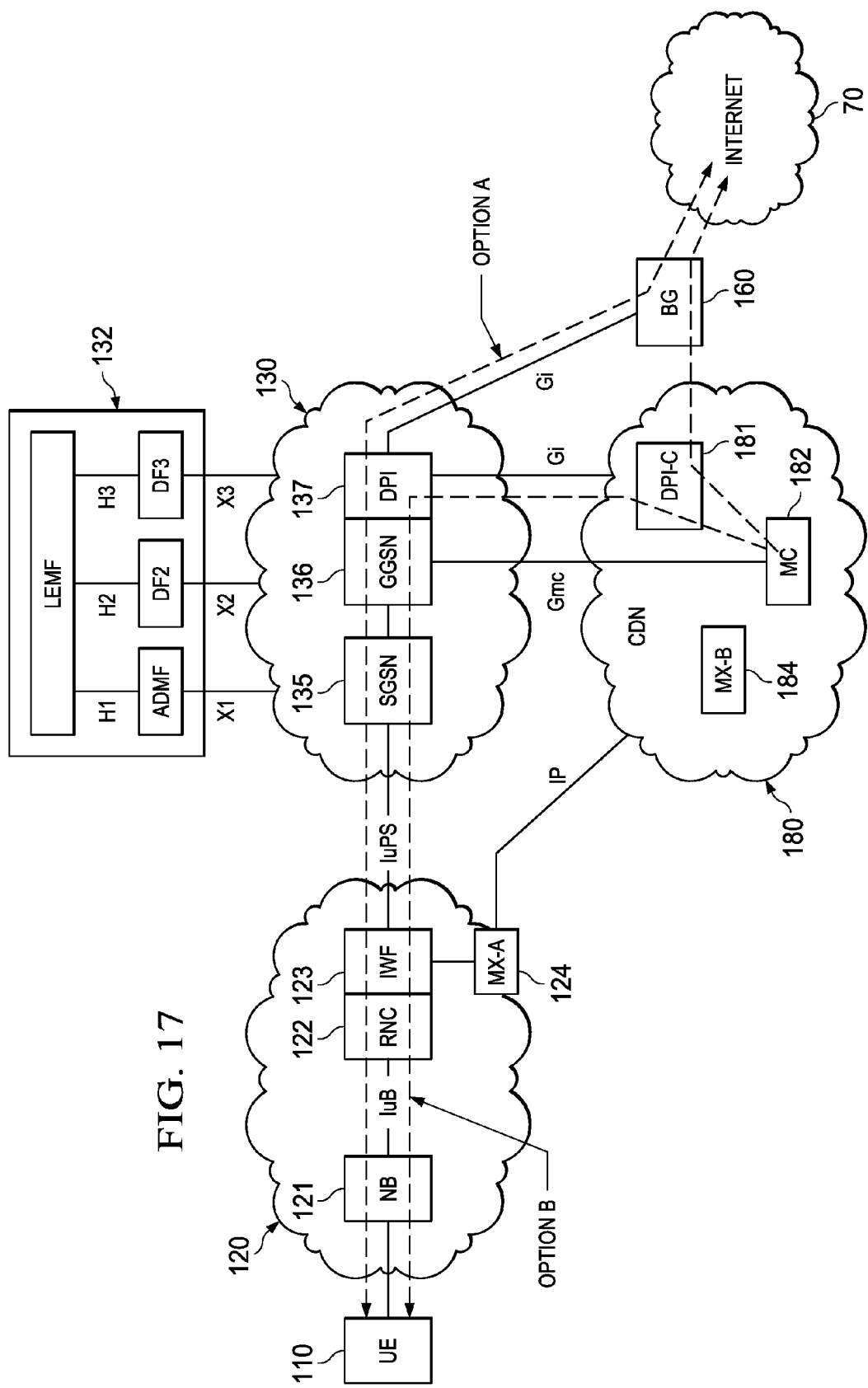
FIG. 17 describes a embodiment for a method of implementing lawful interception.

FIGS. 17-19 illustrate embodiments of lawful interception for MBB network and CDN in accordance with embodiments of the invention.

FIG. 17 describes a embodiment for a method of implementing lawful interception. This embodiment is the easiest to implement and therefore advantageous. In this embodiment, if a UE has been targeted for interception, then the UE is not assigned to a caching media server (e.g., MX-A 124). Therefore, all communications including OTT traffic to and from the UE can be intercepted at the GGSN 136 (and/or SGSN 135) and communicated to the LEMF as described above.

To implement this embodiment, DPI 137 may include additional functionality to determine if a UE 110 is to be intercepted. The DPI 137 checks the UE request and determines if the UE request belongs to a PDP context with LI flag set (e.g., UE is a LI target). If the UE is a target, then DPI 137 will not forward the UE request to the CDN 180 for content deep packet inspection and assignment to a caching media server. Instead, the UE request is forwarded to the BG 160 or an on-path router so that this request is processed without caching using the GGSN 136.

To determine if the UE is targeted, the DPI 137 checks with the GGSN 136 for the PDP context using the source IP address as the index. As described above, GGSN 136 may interface with the LEMFs and may have the up to date information regarding the UEs being targeted. In some embodiments, only if the UE request matches the provisioned signatures, the DPI 137 checks with GGSN 136 for the LI information. This is because the DPI 137 forwards only those UE requests that match the provisioned signatures (see FIG. 11).

DPI 137 and GGSN 136 may be a single unit or may be in separate units, for example, as described in FIG. 6. As described below, the location of the LI interception checking functionality may have architectural ramifications.

This information exchange is simpler if the GGSN 136 and DPI 137 are integrated in a single unit because the PDP context data is readily available and the mapping between UE's IP address and international mobile subscriber identity (IMSI) is easy as that data is also available from the GGSN 136. This option is shown in FIG. 17 as option A.

Alternatively, at least two embodiments are possible if the DPI 137 is a standalone function independent of GGSN 136.

In a first embodiment, a proprietary API may be constructed to fetch the PDP data using UE IP as index from the GGSN 136. This may be structured similar to the Gmc interface, which may either be a pull or a push model. If the DPI 137 is integrated with DPI-C 181, then the existing Gmc interface may be used.

In a second embodiment, DPI 136 may simply defer the checking to the DPI-C 181 and/or MC 182. The DPI-C 181 and/or MC 182 fetches the mandatory updated LI information from the GGSN 136, for example, through the Gmc interface. This scenario is illustrated with the reference label Option B in FIG. 17.

However, the embodiment described in FIG. 17 has some limitations because of the location of the interception point which is the location of the GGSN 136. Therefore, once a UE session is established through a MX-A 124, any updates to the LI flag has no impact on the ability to intercept the communication during that session. However, any new UE session request can be monitored after the UE has been targeted. In other words, UE's on-going session can not be monitored and only new sessions from this point on can be monitored. However, this limitation may be acceptable under most LI regulations; for example, it is acceptable for North America.

FIGS. 18 and 19 describe embodiments of the invention for lawful interception that overcome these and other limitations.

Figure 18A:
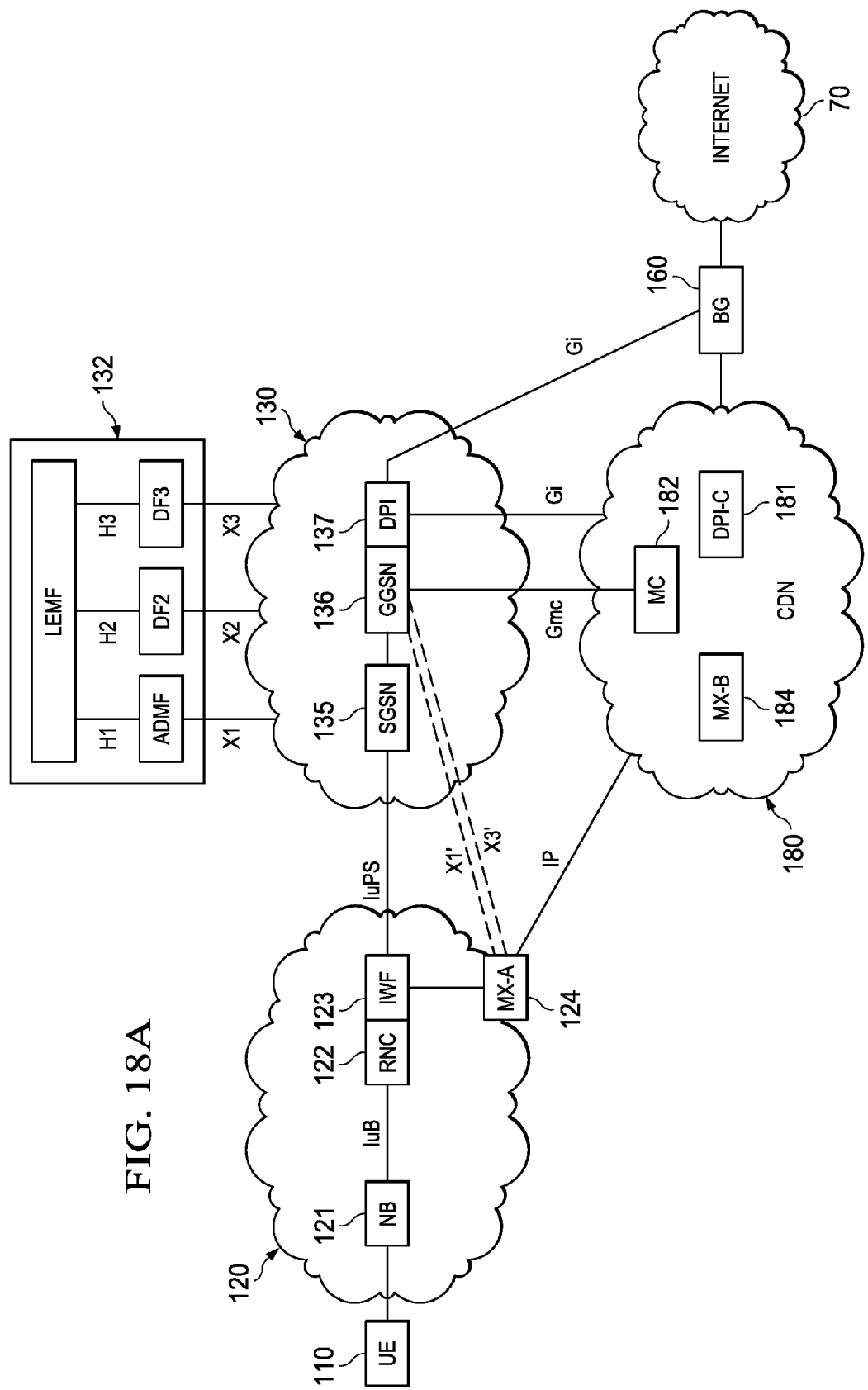
FIG. 18A illustrates a context diagram of implementing LI and FIG. 18B illustrates the LI message flow.
Figure 18B:
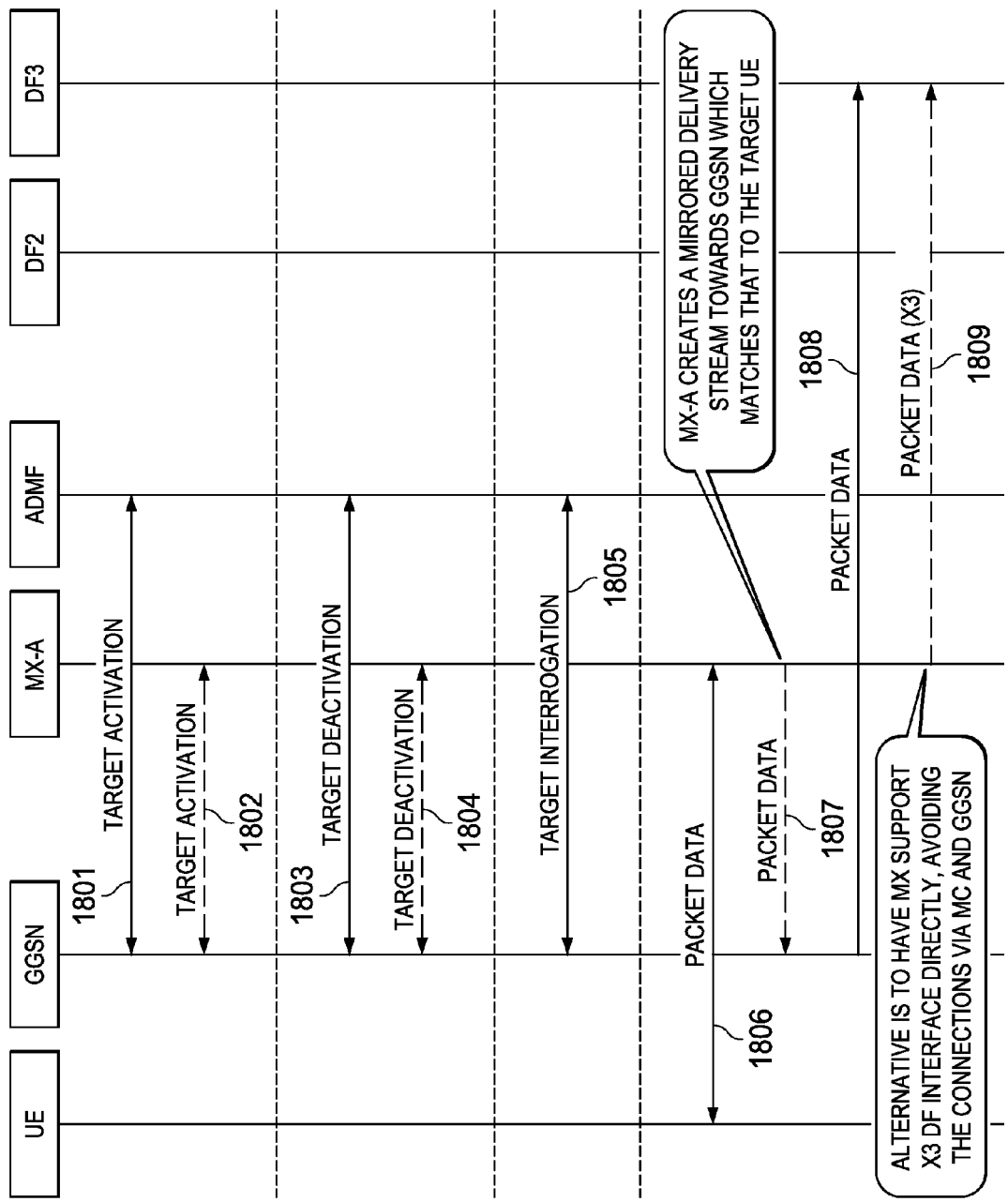

FIG. 18, which includes FIGS. 18A and 18B, describes an alternative embodiment for a method of lawful interception wherein the media server in the layer2 network decides and delivers communications with a targeted UE, wherein FIG. 18A illustrates a context diagram of implementing LI and FIG. 18B illustrates the LI message flow.

Referring to FIG. 18A, two additional interfaces X1' and X3' are required for implementing this embodiment.

In this embodiment, the GGSN 136 is configured to notify the serving MX-A 124 of any updates to the LI requests from the LEAs. The MX-A IP address is regularly maintained in the PDP context as the requirement of Gmc interface. Therefore, the GGSN 136 notifies the serving MX-A 124 of any new activation of LI for any UE, which is identified by UE IP. GGSN 136 also notifies any deactivation of the LI target UE. Therefore, the MX-As store a table of list of all LI target UE's. In various embodiments, the MX-A 124 is configured to have the ability to perform interrogation, which is described below. In particular, the MX-A 124 is configured to perform a mirrored delivery of any packet data to and from the UE's flagged as a target.

In various embodiments, the interfaces X1' and X3' may be implemented in different ways. In various embodiments, the interface X1' may be used to communicate control messages from the GGSN, for example, after ADMF makes a control decision. The interface X3' may be used to communicate media data with the GGSN, for example, data during interception.

In one embodiment, GTP-U/GTP-C message tunnel between RNC 122 and GGSN 126 may be implemented, for example, using the IWF 123.

In an alternative embodiment, the IP transmission that connects the MX-A 124 and CDN 180 may be used. However, using the IP transmission, a VPN or IPSec has to be used for security reasons. Further, GGSN has to be configured to correctly identify that the packet data flow over the IP connection from MX-A 124 is a valid UE traffic and forward to DF3.

The LI Message Flow for the LI framework described above with respect to FIG. 18A will now be described using FIG. 18B. The messages 1801, 1803, 1805, 1806, and 1808 refer to messages that are compliant with 3GPP standards (TS 3GPP 33.107). Messages 1802, 1804, and 1807 are added herein in accordance with embodiments of the invention.

First, the target activation procedure will be described. The ADMF sends Target Activation 1801 (target ID, report type, etc.) to GGSN. The GGSN sets a flag for intercepted target in the PDP context. GGSN responds the result to ADMF.

GGSN checks if the intercepted target has an activate PDP context. If the target has an active PDP context, the GGSN notifies MX-A (target ID, GGSN IP, etc.) to monitor this target (message 1802). If this target does not have an active PDP, the GGSN will wait until the next time this target establishes an active PDP context.

Next, the target deactivation procedure will be described. ADMF sends Target deactivation (target ID, etc.) to GGSN (message 1803). GGSN clears the flag for the intercepted target. GGSN responds to ADMF acknowledging the deactivation (message 1803). GGSN notifies MX-A (target ID, etc.) to clear its monitoring flag for this target (message 1804). MX-A clears the flag for the UE being deactivated.

Target interrogation procedure will next be described. ADMF sends Target Interrogation (target ID, etc.) to GGSN (message 1805). The GGSN responds the result to the ADMF.

Intercepted communication content report procedure will next be described. UE receives requested packet data from MX-A (message 1806). MX-A will also report a packet data (comprising target id, content of the data packet sent to the UE, GGSN IP, etc.) to the GGSN if this UE is flagged to be intercepted (message 1807). In various embodiments, the MX-A ouputs a mirrored delivery stream towards the GGSN that matches the data being sent to the UE. The GGSN reports the intercepted packet data (e.g., comprising target id, content, GGSN IP, etc.) from MX-A to DF3.

In an alternative embodiment, MX-A transmits interrogation (X3) directly to the DF3 instead of using GGSN to relay the interrogated packet data stream. To implement this procedure, MX-A has to be configured to transmit interrogation with the following X3 message header information. The X3 message header comprises target identity; correlation number; an optional time stamp; optionally a direction (indicating whether T-PDU is mobile originated (MO) or mobile terminated (MT)); and the target location (if available).

However, these parameters are typically in the GGSN and therefore a direct connection to DF3 from MX-A may be less practical.

Figure 19A:
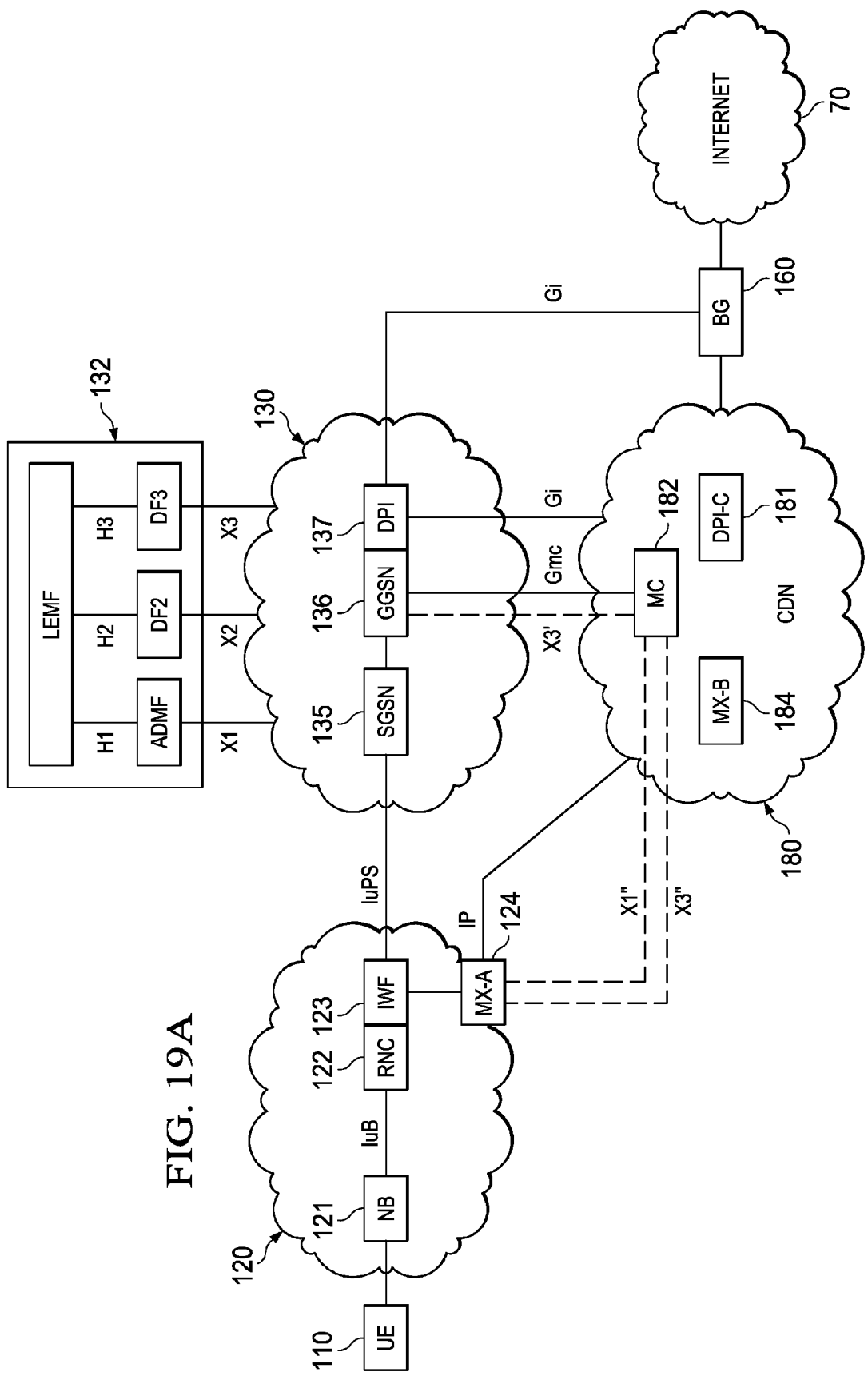
FIG. 19A illustrates a context diagram of implementing LI and FIG. 19B illustrates the LI message flow.
Figure 19B:
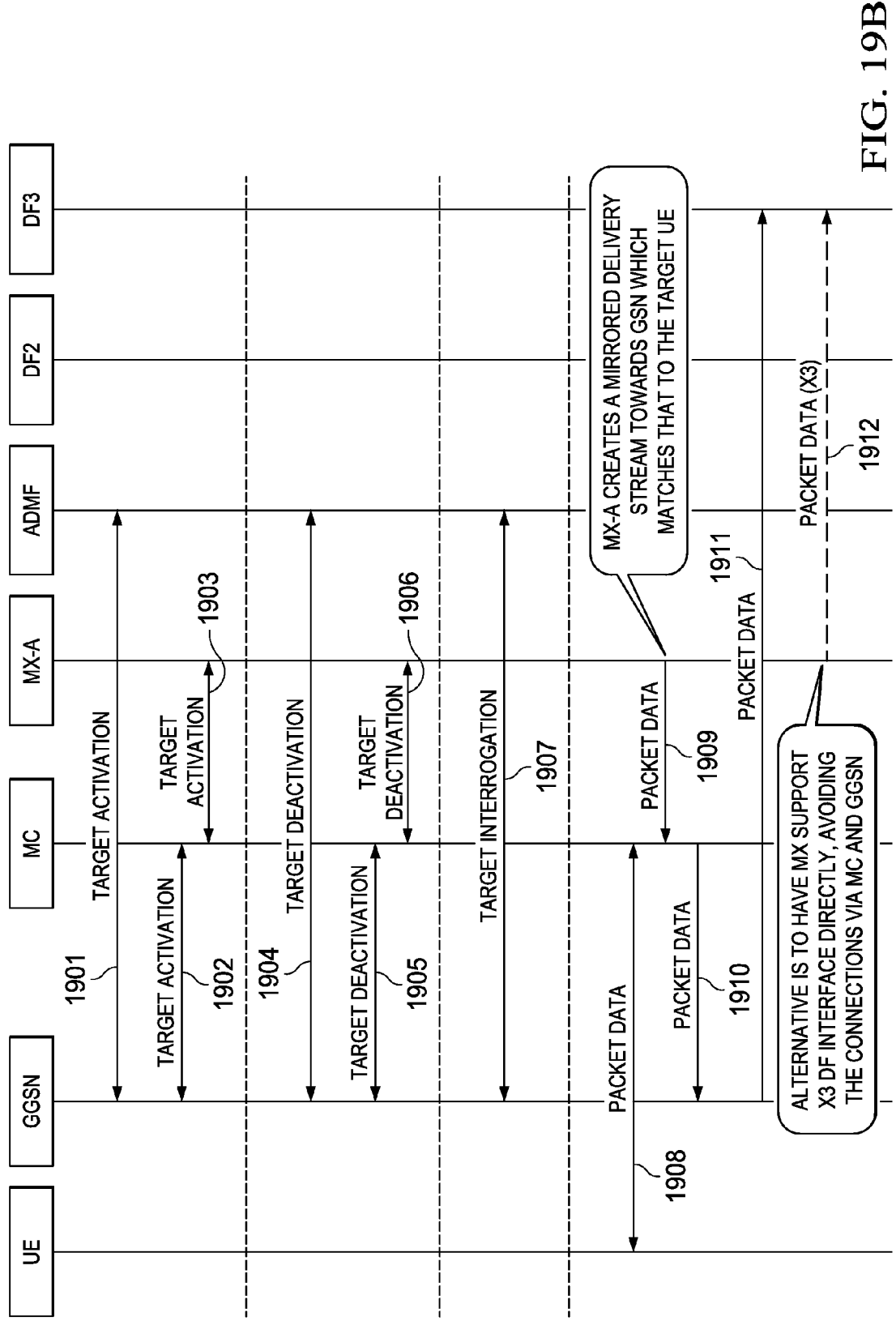

FIG. 19, which includes FIGS. 19A and 19B, describes a third embodiment for a method of lawful interception wherein the media server in the layer2 network decides and delivers communications with a targeted UE but through the media controller, wherein FIG. 19A illustrates a context diagram of implementing LI and FIG. 19B illustrates the LI message flow.

Unlike the previous embodiment, in this embodiment, a media controller MC interfaces between the MX-A and the GGSN. Referring to FIG. 19A, three additional interfaces X1", X3', and X3" are required for implementing this embodiment.

Referring to FIG. 19A, the MC 182 is the interface for the GGSN 136 instead of the MX-A 124. The Gmc interface between the GGSN 136 and the MC 182 is utilized. Therefore, the MX-A 124 is notified from the MC 182 not directly by the GGSN 136. This embodiment further simplifies the interaction between the access networks and the CDN network. This is because the Gmc interface already provides the MC 182 with updated LI notifications (LI activation, deactivation etc. via the PDP context update). Consequently, the X1' interface for passing control information regarding the LI activation, deactivation etc. is not needed. The X3' interface is the interrogation packet data flow between MC 182 and GGSN 136 and is provided for the target LI UE. The X1" interface between the MC 182 and the MX-A 124 may be used for transferring control information regarding LI activation, deactivation etc.

The LI Message Flow for the LI framework described above with respect to FIG. 19A will now be described using FIG. 19B.

As described above, the ADMF may communicate to the GGSN regarding activating a UE as a target (step 1901). The target activation is communicated to the MC (step 1902) through the Gmc interface, and to the MX-A through the X1" interface (step 1903). Similarly, a target deactivation may be communicated to the GGSN (step 1904), which is then communicated to the MC (step 1905), and forwarded to the MX-A (step 1906). Next, a target interrogation may be requested by the ADMF (step 1907). The MX-A may initiate a packet data transmission with a UE that is being targeted (step 1908). The MX-A generates a mirrored stream that matches the packet data communication with the UE. The MX-A transmits the mirrored packet data to the MC through the interface X3" (step 1909). The MC forwards the mirrored packet data to the GGSN (step 1910). The GGSN forwards the intercepted packet data received from the MC to the DF3 (step 1911). In an alternative, the MX-A has a direct interface with DF3 avoiding going through the MC and GGSN (step 1912).

This embodiment advantageously allows lawful interception even during roaming if the serving MX-A is changed to another MX-A (e.g., relocates under same SGSN). This is because MC is aware of this change and therefore redirects the new serving MX-A to continue with the lawful interception. However, this embodiment may fail if the UE relocates under a new GGSN or if the MX-A fails.

In this embodiment, unlike the prior embodiment, the interface X3' between MC and GGSN is a media path and not a control path and may have some limitations. Therefore, in some embodiments, the intercepted packet data from MX-A may be directly sent to the GGSN as described in the prior embodiment.

In another alternative embodiment, the serving MX-A performs a mid-stream redirect to the MX-B, which is deployed at the GGSN level, so that all traffic will be monitored and sent to DF3 from GGSN. In various embodiments, the UE does not detect any noticeable changes to the current session although the serving media server is being moved up to a media server situated at a higher level in the network. This may in turn depend on how the mid-stream redirection is done by the MX-A and the types of media and delivery protocol (assuming HTTP delivery of video content, the availability of the exact same content at MX-B, and the UE client's support for mid-stream redirect), and the ability to start at MX-B at the point of redirect in the video.

It is important to note that these interrogation processes are very resource intensive and security sensitive operations. Therefore, in some embodiments, it may be advantageous to combine the embodiments described in FIGS. 17-19. For example, the embodiment of FIG. 17 may be used for normal handling while the embodiment of FIG. 18 and/or FIG. 19 may be used in extreme situations. For example, LEAs may request that all sessions with a few selected target UE have to be intercepted. In such rare situations, the embodiments described in FIGS. 18 and/or 19 may be deployed. This will ensure optimizing the resource consumption without compromising the ability to lawfully intercept communications.

Figure 20:
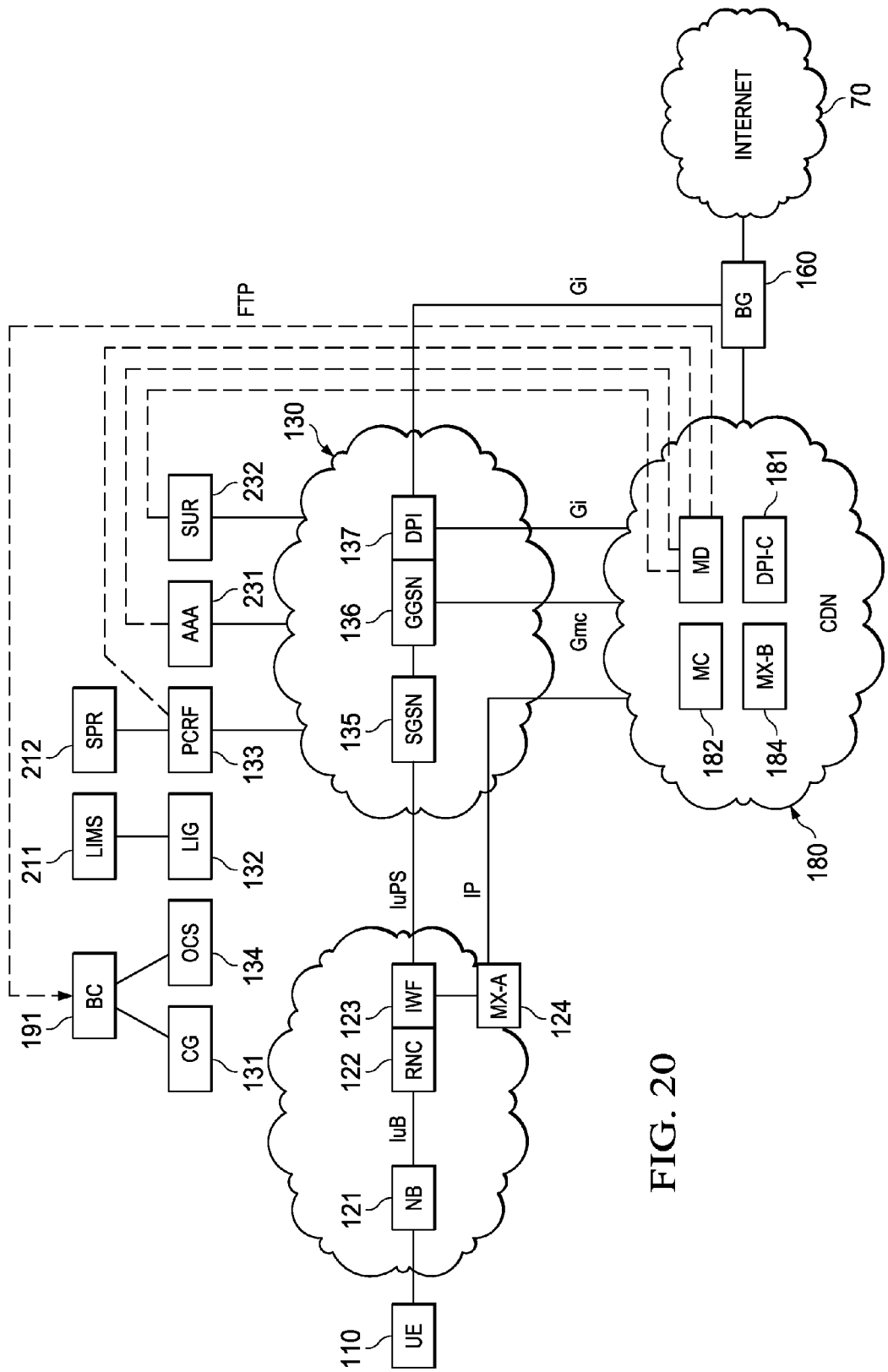
FIG. 20 illustrates the general network architecture for handling of charging, reports, and analytics as well as quality of experience provisions in accordance with embodiments of the invention.

FIG. 20 illustrates the handling of charging, reports, and analytics in accordance with embodiments of the invention.

In various embodiments, charging and billing may include both post-paid and prepaid charging/billing support. The following diagram illustrates the context for billing and some additional back office functions.

Embodiments of the invention include offline billing and real time charging, which are described further below.

An embodiment of the invention relating to offline billing will be first described. A media data (MD) 186 in the CDN 180 collects usage information and reports to the Billing Center (BC) 191 after a certain number of pre-determined minutes (such as 10 minutes and it is configurable).

In accordance with an embodiment of the invention, a filtering algorithm may be used. No control may be needed for subscribers on a flat rate plan (i.e. unlimited data plan). In contrast, for other subscribers, whose bills depend on the amount of data used, actual monitoring may be dependent on the type of subscriber plan.

Some subscribers may be allowed to use traffic even if they exceed their contracted limits. However, such traffic called overage traffic is billed differently. Embodiments of the invention enable hot billing for subscribers with tiered traffic subscription packages. In accordance with one or more embodiments, the MD 186 collects usage information from all MX-A nodes and reports to BC 191 in every pre-defined number of minutes. Thus, session for any user equipment that exceeds the pre-allocated limit or other limits may be terminated using hot billing. Hot billing requires continuous communication of user activity to the BC 191. The overage of subscriber traffic usage is considered bearable for this type of billing.

Alternatively, for subscribers without any contract (prepaid) or when an operator may like to avoid the overage of traffic from these subscribers, real time charging may be required.

Therefore, embodiments of the invention relating to real time billing will be described.

The GGSN 136 notifies the MC 182 via the Gmc interface that a new UE's PDP includes an online charging gateway (OCG) flag indicating that real time charging is needed for this particular UE. The MC 182 checks its local PDP info for OCG flag before redirecting this UE's request to a MX-A 124. In accordance with an embodiment of the invention, if the OCG flag indicates the need for real time charging, the MC 182 does not redirect the request to the MX-A 124. Instead, the MC 182 forwards the request to the BG 160 or an on-path router so that this request will be charged in real time using the GGSN 136. Hence, under real time charging no caching is performed.

Embodiments of the invention relating to reporting and analytics will next be described.

The report generation for non-billing purposes such as NOC/operational usage, network optimization, and tuning of DPI signature/algorithms can be served from the MD 186. In various embodiments, the MD 186 may be a cloud based Online Analytics Process (OLAP) that processes logs and operational data from the CDN network.

In accordance with an embodiment of the invention additional data (MBB data) may be collected because of the interaction between MBB network and the CDN 180. Such additional data may include users' PDP context data, e.g., stored at MC 182, additional PCRF data (some of which is already available from the Gmc interface), direct interface from PCRF 133 to get additional QoS policy rules and parameters, and data from the AAA 231 and SUR 232 functions. Interfaces with AAA 231, SUR 232, PCRF 133 may be added and supported at MD 186 to access these additional data. Embodiments of the invention also include interfaces between AAA 231, SUR 232, PCRF 133 and MD 186. Using these additional data, and further processing, the network operation may be able to better understand the OTT traffic (or B2B, B2C traffic etc.)

Embodiments of the invention relating to QoS approaches will be described using the following methods and using FIG. 20.

QoS policy is an important consideration for communication networks. This is particularly so for mobile broadband networks than fixed broadband networks. This is because the resources in the mobile infrastructure is generally more limited and expensive compared with FBB network infrastructure, for example the air interface and remote backhaul. Also the revenue differentials from a VIP subscriber vs. a low end subscriber can be 100× or more in MBB networks requiring differential treatment for these higher paying subscribers.

Referring to FIG. 20, in a first method, the MC 182 receives QoS/PCC parameters and uses it to provide differential treatment to users. At the MC 182, many QoS/PCC parameters may be passed on and routinely updated through the Gmc interface. For example, QoS/PCC parameters such as charging based on user profile, charging based on service type, charging base on location, charging based on congestion, charging based on time range, charging based on user's accumulate usage, charging based on terminal type may be available at the MC 182. Further examples include user service plan info such as VIP or premium user, user equipment types such as 3G capable device, user general location such as RAI and SAI, user roaming status such as roaming user, user group type such as corporate user vs. individual user, and user billing preference types such as prepaid user.

The MC 182 may use the above information and allocate or select the appropriate media server (MX-A, MX-B, or MX-C) according to these QoS/PCC parameters and the conditions of the MBB and CDN networks.

In one embodiment, the Quality of Experience (QoE) for the UE may be improved by combining the request routing policy/heuristics with UE profile and/or QoS parameters from PCRF 133 or the GGSN 136. For example, for VIP users, the PDP context data subset at the MC 182 may indicate that the UE making the UE request has VIP status, and deserves special request routing treatment. For example, such VIP users may be always routed to the serving MX-A with priority, for example, with further (implict/explicit) instructions to serve UE with the highest bit rate (when multiple available) that matches the guaranteed throughput in the PS/RAN link. Similarly, if a UE is not a VIP user, these requests may be forwarded to other media servers, e.g., MX-B 184 or MX-C (at peering point/BG) or at service provider (SP) site to retrieve content and with lower throughput in the PS network to reserve resource for the VIP users. In alternative embodiments, a video rate may be selected from a list of transcoded video rates. For example, the MC 182 or media servers may have the option to transmit video at different coding rate. For example, depending on the UE profile, (e.g., the network conditions) a file encoded at a higher video coding rate may be selected instead of transmitting a file encoded a lower coding rate. For example, a high resolution video may be selected for a user connected through a high bandwith connection while a low resolution video may be selected for a user connected through a low bandwidth connection. Further, in some embodiments, the video rate may be dynamically adjusted periodically, e.g., every few seconds.

For example, if the bandwidth deteriorates during transmission, then the file with a lower coding rate is selected for the subsequent video segment. Similarly, a low resolution video may be selected for a user device having a low resolution screen (e.g., smart phone) while a large coding rate may be selected for a user device having a high resolution screen (1080p large screen television).

In a second embodiment, the MC 182 directly retrieves information from PCRF and uses this for serving UE over both MBB and FBB networks. In this embodiment, the MC 182, using a direct interface to the PCRF 133 over Diameter (a AAA/Radius like interface) over IP, obtains policy rules from PCRF 133. This allows MC to obtain additional policy rules that may not be available from the private GGSN Gmc interface. For example, PCRF 133 may control both the MBB and FBB QoS policy rules, and therefore, MC 182 may be able to obtain a common policy rules for a particular user. Thus, in this embodiment, CDN 180 works directly between MBB and FBB with a common set of PCRF nodes.

In a third embodiment, the MC 182 forwards a subset of QoS data to the serving media server (e.g., MX-A 124), which then uses that information to differentially serve the UE.

QoS policy parameters and rules may also be forwarded from the MC 182 to other functional components such as MX-A 124, MX-B 184, MX-C, MD 186 (for analytics), and/or media storage cloud for B2B and B2C services. These components may react differently based on the forwarded QoS parameters and rules, the current conditions of the function/node, and other related environmental parameters to offer the appropriate QoS per UE type, etc.

One of the purposes of forwarding the QoS rules and parameters to the media servers is that these media servers have the ability to adapt to the changing requirements of any delivery at any time. For example, methods such as bitrate adaptation (with cached multi-rates files/segments), on demand transrating at MX, or changing of media file format or characteristics (such as resolution, bitrates, mobile screen dimension, media profile, etc.) may be performed on the fly to serve the UE with the most appropriate QoS demanded by policy entities such as PCRF 133.

Embodiments of the invention also include configuration of the media player and/or media server MX-A or MX-B etc so that the user may be served more effective offering advanced features such as fast start, intelligent buffer control for smooth playback, HTTP rate capping, mid-stream redirect to another media server, recovery from a media server failure, and/or collection and delivery of QoS data from the media player to the CDN 180 for improving operation and accumulating business intelligence.

Figure 21:
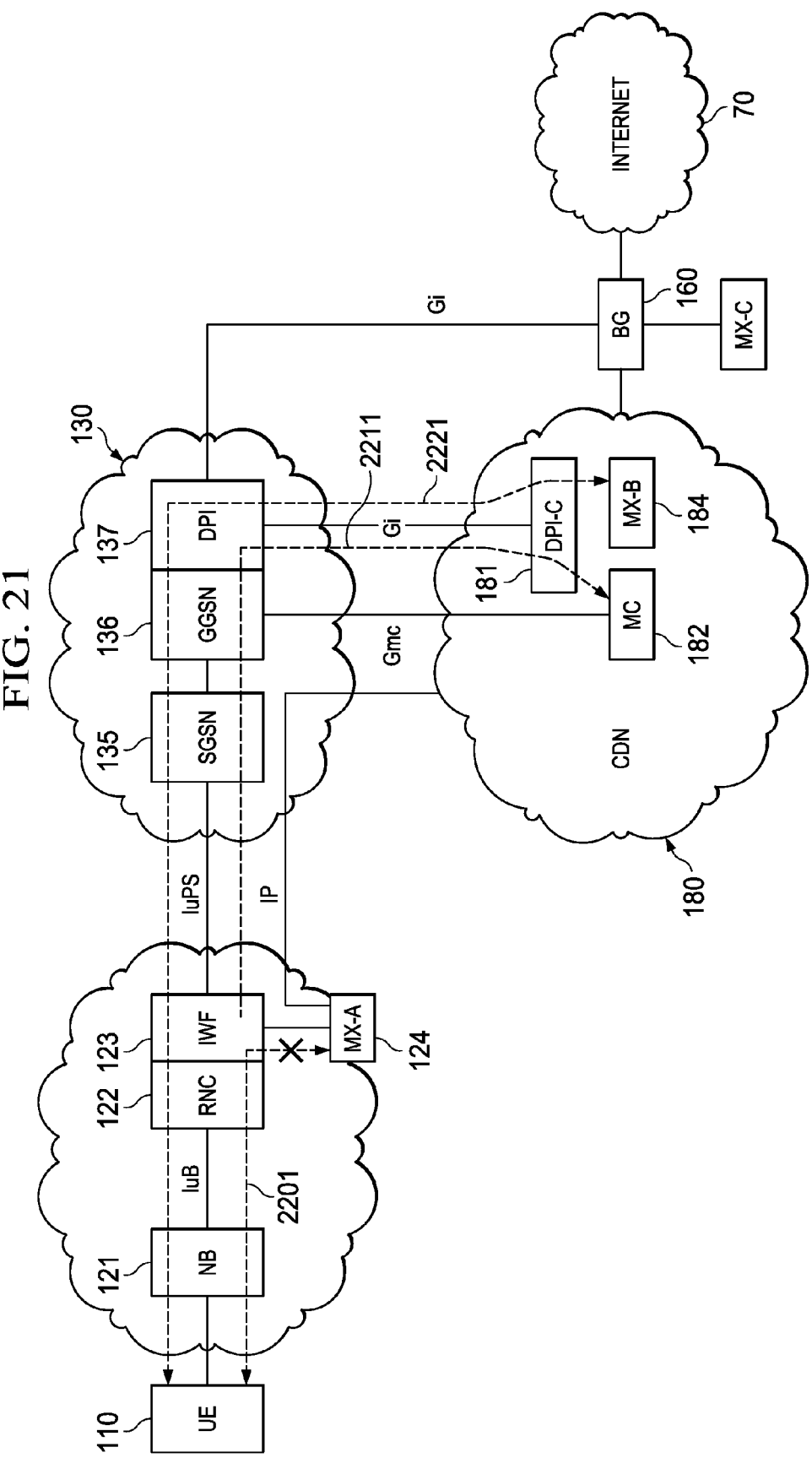
FIG. 21 illustrates the general network architecture for handling of failure of media server(s) in accordance with embodiments of the invention.

FIG. 21 illustrates the handling of failure of media servers in accordance with embodiments of the invention.

As described in various embodiments above, each MX-A serves a large number of live subscribers. Therefore, failure of a MX-A can have a critical impact for many users unless mitigating procedures are in place.

A first embodiment of failure recovery will be first described. As illustrated in FIG. 21, IWF 123 is configured to immediately detect if a MX-A 124 fails or stops serving the UE 110 (see line 2201 in FIG. 21).

The IWF 123 either keeps a heart beat with MX-A 124 or sets a timer every time IWF 123 forwards a message from UE 110 to MX-A 124. If MX-A 124 does not respond after the heart beat timer or the message response timer expires, the IWF 124 is configured to forward this UE request (or a UE retry message) to the serving MC 182 on the PS path going through DPI 137 and DPI-C 181 (line 2211 in FIG. 21). DPI 137 and DPI-C 181 are configured to forward this message to the MC 182, which also may have a broken heartbeat with the failed MX-A 124. The MC 182 selects a different media server such as MX-B 184, for example, which may likely be the one connected to the GGSN 136/DPI 137/DPI-C 181, and redirect the UE request to the new media server MX-B 184. The UE 110 now continues getting media delivered from the MX-B 184 (line 2221 in FIG. 21).

The above described method requires enhancement at the IWF 123 and/or RNC 122 to detect failure of the MX-A 124 and to correctly route the request to MC 182.

A second embodiment of the failure recovery method will be next described. This embodiment illustrates a simplification of the above embodiment in that the RNC 122 and/or IWF 123 are not modified. In this embodiment, the MC 182 detects the failure of the MX-A 124, for example, because of a broken heart beat with MX-A 124. The MC 182 selects a new media server as described above, for example, MX-B 184 may be selected. The MC 182 constructs an HTTP direct message (HTTP 302) destined to each of the currently impacted UEs while faking the source address as the IP address of MX-A 124. This is possible because the MC 182 conveniently has a list of the active PDP with IP addresses of UE's. The MC 182 transmits these messages to the respective UEs. When each of these message from MC 182 is received at the IWF 123/RNC 122, the IWF 123/RNC 122 simply forwards them to the designated UE because the message comes in via the correct GTP-U tunnel and with the correct tunnel end point identifier (TEID). The UE's receiving such a message will contact the new media server, e.g., MX-B 184, for delivery.

The first and the second embodiments described above may have some limitations. For example, the user's media session may be abruptly terminated and a new session may start from the beginning of the media clip when the new media server MX-B 184 starts streaming. In embodiments using HTTP adaptive streaming the media player may request the new feed from the point of failure of the previous session and therefore avoid the user having to see the media clip from the beginning. However, this issue may be difficult to avoid in the first and the second embodiments of the invention using regular HTTP progressive download.

The following third embodiment is proposed to at least overcome the above described limitations of the first and the second embodiments for failure recovery. The third embodiment described below is an enhancement to the first and the second embodiments.

In accordance with this embodiment, the media player may be enhanced to handle the transfer of the session from the first media server (MX-A 124) to another media server (MX-B 184). When the media player at UE 110 detects that it is being redirected to another media server in the middle of a playback session (which means interruption of service), the media player includes additional information regarding the session. For example, the media player may modify the HTTP Get request to the new media server (e.g. MX-B 184) with a BYTE RANGE request starting from the current time code (TC) or byte range. For HTTP adaptive streaming, simply fetching the current segment (a few second worth of content) is sufficient, and the rest will continue coming from the MX-B 184.

Embodiments of the invention also include methods for minimizing degradation of user experience if even the backup media server (MX-B 184) fails. For example, in accordance with an embodiment of the invention, in case the backup media server MX-B 184 also fails, the first, second, and/or third embodiments described above may be implemented. For example, the IWF 123 or the MC 182 may detect the failure of the MX-B 184 and reallocate the UE request to a new media server, for example, a MX-C connected to the BG 160 or core routers at peering points of the operators' PDN. Alternatively, the MC 182 may redirect to other MX-B's in the CDN 180.

Some of the network functions and components described above that require reconfiguration and provisioning are described below. The following discussion may not include all changes in configuration that may be required in implementing embodiments of the invention.

In one or more embodiments, interworking function and radio network controller may need to be configured to recognize a local MX-A that the IWF may connect to, for example, based (such as an IP range). The IWF/RNC may need to be configured to recognize failure of the local media server, for example, by the use of timers etc as described above. The IWF/RNC may need to be configured to recognize the IP address of the media controller so as to be able to forward UE request when the local media server fails. The IWF/RNC may need to be configured with a mapping of IP address and Tunnel Endpoint Identifier (TEID) for the UE's being served. The IWF/RNC may need to be configured forward new RNC data packet coming from IuR to IWF/MX-A, e.g., to enable continued streaming roaming/relocation or media failure.

In one or more embodiments, the GGSN may need to be configured to recognize IP addresses of the media controller. The GGSN may need to be configured to recognize MX-A IP addresses within the GGSN scope. The GGSN may need to be configured to recognize DPI if the DPI queries the GGSN for PDP context information for decision making. The GGSN may need to be configured to send PDP context updates (creation, modification, and deletion) to the serving MC. The GGSN may need to be configured to maintain the current serving MX-A for any given PDP context (UE).

In one or more embodiments, the SGSN may need to be configured to suppress termination during/after relocation so that the old MX-A may continue to delivery the media stream to the UE. In some embodiments, SGSN is not changed unless we use it to pass on RNC IP or ID via GTP extension to pass that info to GGSN and placed in the PDP context field as a custom parameter.

In one or more embodiments, the local media server (MX-A) in the layer2 access network may need to be configured with the GGSN IP address to which it needs to connect for LI related features. MX-A may need to be configured with CDN default content retrieval algorithms and any dynamically provisioned updates to the MX-A from the CDN's network operations center. This configuration file may be used when there is a cache miss in serving a UE request. MX-A may need to be configured to send MX-A local logs to CDN's MD server(s), for example, for billing, charging, analytics. For lawful interception, MX-A may need to be configured to recognize the DF3 in case the method with direct connection to DF3 is used. In one or more embodiments, MX-A may need to be configured to receive PDP related info to support X3 interface towards DF3 such as target identity, correlation number, an optional time stamp, optionally a direction indicating whether transfer protocol data unit (T-PDU) is mobile originated or mobile terminated, and the target location (if available).

In one or more embodiments, the media controller may need to be configured with the GGSNs IP addresses it is serving, each media controller may serve multiple GGSNs. The media controller may need to be configured to recognize higher level media servers (MX-B) and DPI-C functions and their IP addresses for forwarding messages. The media controller may need to be configured with a table of the static mapping between RNC IP/ID and its local MX-A IP address. The media controller may need to be configured to with PCRF's IP addresses.

In one or more embodiments, the media data unit may need to be configured to recognize the Billing Server (BS) IP addresses and to be able to communicate with BS over a RESTful interface over IP. The media data unit may need to be configured to recognize PCRF IP addresses, AAA server IP addresses, and SUR server IP addresses.

In one or more embodiments BS, PCRF, AAA, and SUR may need to be configured to recognize CDN components such as MD, and MC. In one or more embodiments, DF3 used in lawful interception may need to be configured to recognize the MX-A IP addresses if the method of direct MX-A to DF3 option is used.

Embodiments of the invention described above may be applied to other types of networks besides MBB networks.

In various embodiments, the MBB network may be 2G, 2.5G, 3G, 4G or higher cellular wireless network. Embodiments of the invention may be applied to other wireless networks such as WiMAX (or higher) networks. Similarly, embodiments of the invention may be applied to FBB networks including digital subscriber line (XDSL) networks, cable broadband networks, fiber to the homes/premises (FTTX) networks, power line communication (PLC) networks, as examples. Wireless networks such as WiMAX and other fixed broadband networks or limited mobility networks may have similar pressures resulting from the OTT traffic, which may be reduced using embodiments of the invention described above.

Figure 22:
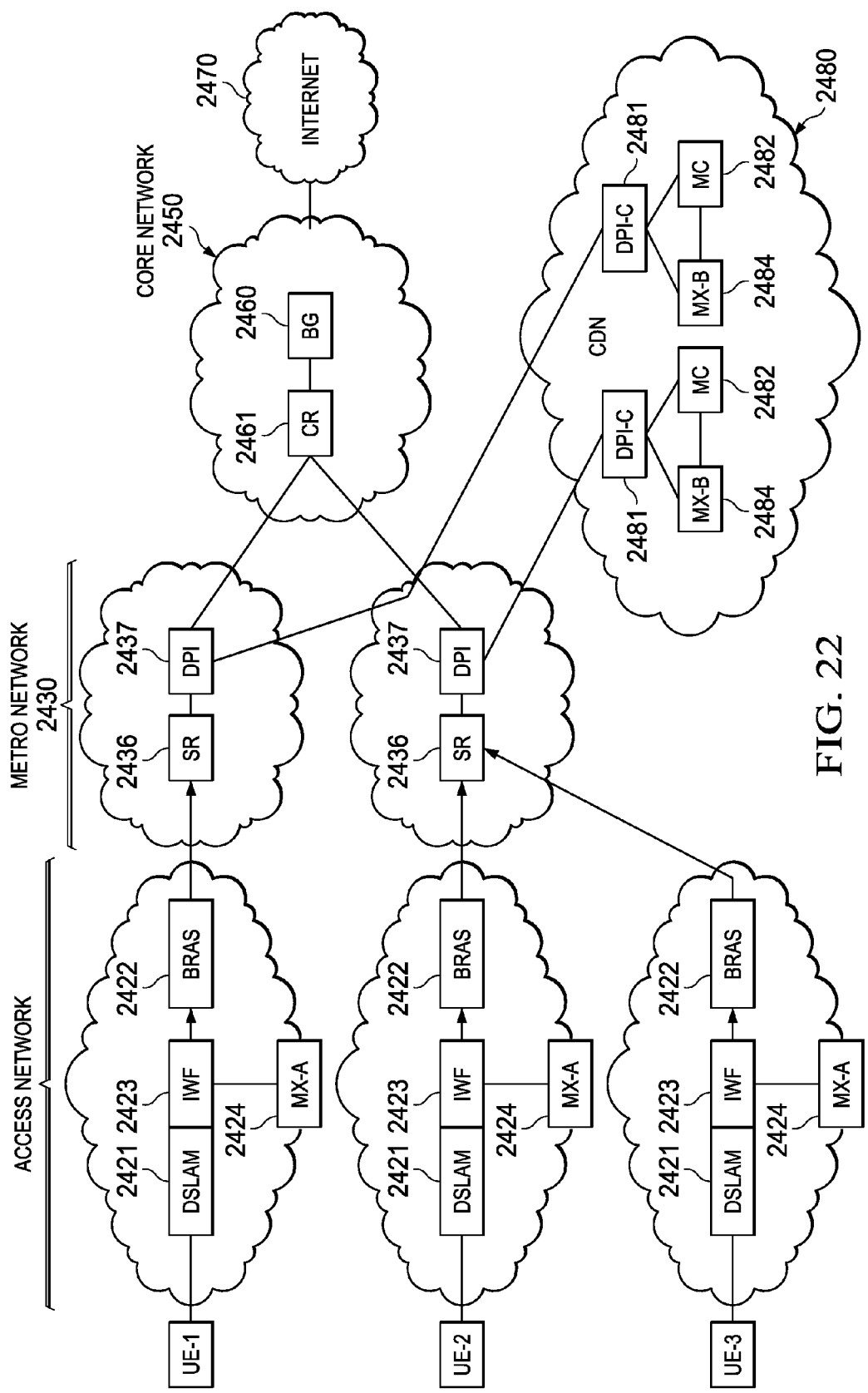
FIG. 22 illustrates a XDSL network implementing embodiments of the invention described above.

FIG. 22 illustrates a XDSL network implementing embodiments of the invention described above. As illustrated in FIG. 22, a plurality of UEs 2310 (e.g., UE-1, UE-2, UE-3) are serviced through an access network 2320, which is coupled to a core network 2350 through a metro network 2330. The access network 2320 comprises a digital subscriber line access multiplexer (DSLAM) 2321, which is a layer2 switch that connects multiple digital subscriber lines (DSLs) (UEs 2310) to a high-speed Internet backbone line using multiplexing techniques. The traffic from the DSLAM 2321 is switched to a Broadband Remote Access Server (BRAS) 2322 from where the end user traffic is then routed across the ISP network to the internet 2370. The BRAS 2322 is coupled through a service router 2336, which may have the DPI 2337. Alternatively, the DPI 2337 may be a separate unit in the metro network 2330. The DPI 2337 is coupled to a core router 2361 in the core network 2350 and a DPI-C 2381 in the CDN 2380.

In accordance with embodiments of the invention, a CDN 2380 having a DPI-C 2381 decides if a UE request involves a cacheable content and then a MC 2382 in the CDN 2380 assigns a media server to serve the UE 2310. The MC 2382 may assign a local media server such as MX-A 2324 in the access network 2320. In one embodiment, the MX-A 2324 is coupled through an IWF 2323 as described in various embodiments so that MX-A 2324 becomes the serving media server, and performs the caching functions described above in various embodiments. As described in various embodiments above, the DPI-C 2481 may be integrated with the DPI 2337, MX-B 2384, and/or MC 2382.

Figure 23:
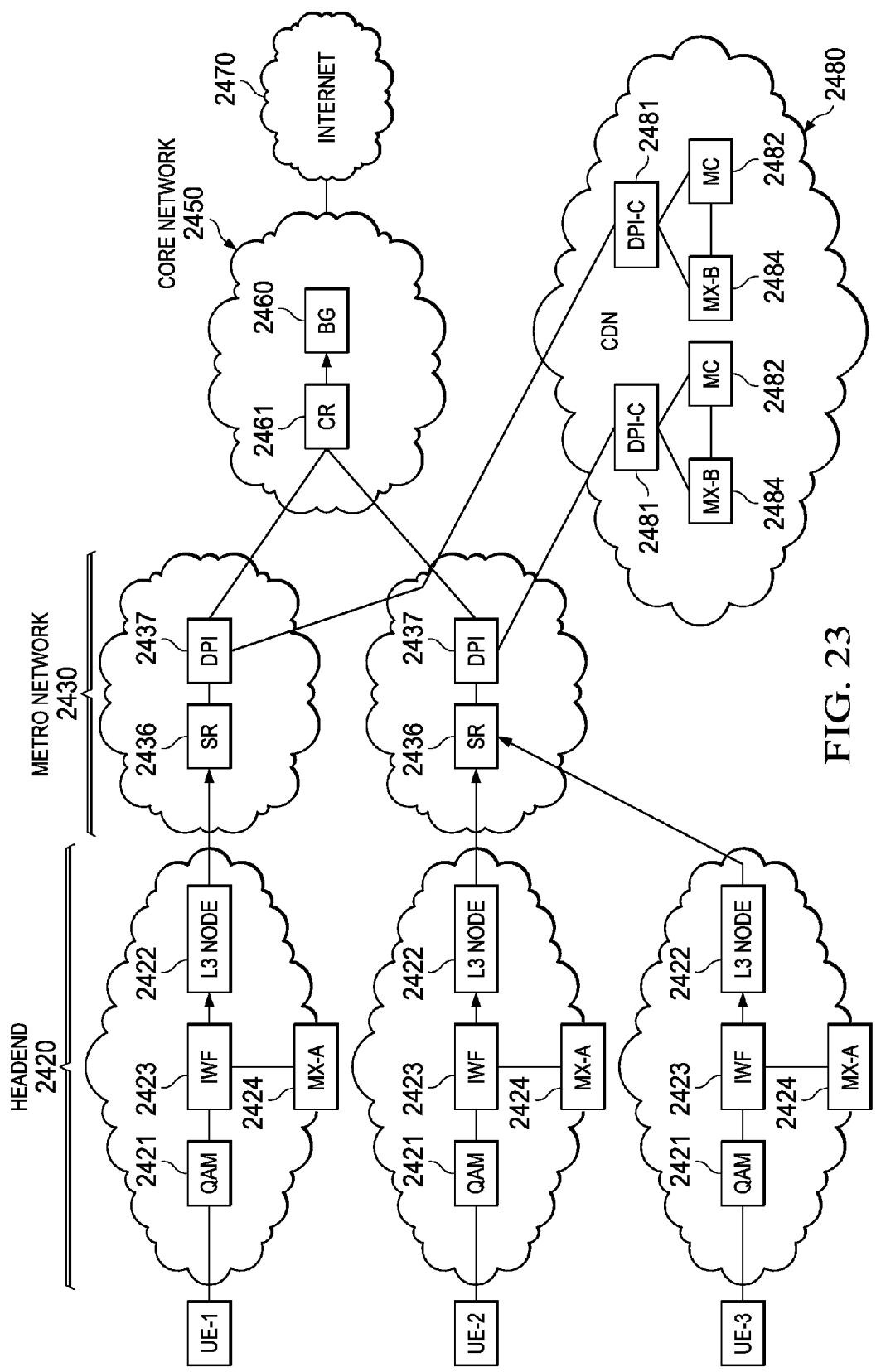
FIG. 23 illustrates a cable broadband network implementing embodiments of the invention described above.

FIG. 23 illustrates a cable broadband network implementing embodiments of the invention described above. As illustrated in FIG. 23, a plurality of UEs 2410 (e.g., UE-1, UE-2, UE-3) are serviced through a head-end 2420, which is coupled to a core network 2450 through a metro network 2430. The head-end 2420 comprises a quadrature amplitude modulation unit (QAM) 2421 that connects UEs 2410 to a high-speed internet backbone line using multiplexing techniques. The traffic from the QAM 2421 is switched through a layer3 node 2422 from where the end user traffic is then routed across the ISP network to the internet 2470. The layer3 node 2422 is coupled through a service router 2436, which may have the DPI 2437. Alternatively, the DPI 2437 may be a separate unit in the metro network 2430. The DPI 2437 is coupled to a core router 2461 in the core network 2450 and a DPI-C 2481 in the CDN 2480.

In accordance with embodiments of the invention, a CDN 2480 having a DPI-C 2481 decides if a UE request involves a cacheable content. Then a MC 2482 in the CDN 2480 assigns a media server to serve the UE 2410. The MC 2482 may assign a local media server such as MX-A 2424 in the head-end 2420. In cable broadband networks (e.g., used over CATV networks) the cable head-end may be a good location for MX-A 2424. In one embodiment, the MX-A 2424 is coupled through an IWF 2423 as described in various embodiments so that MX-A 2424 becomes the serving media server, and performs the caching functions described above in various embodiments. As described in various embodiments above, the DPI-C 2481 may be integrated with the DPI 2437, MX-B 2484, and/or MC 2482.

As described above, embodiments of the invention include PLC networks. In PLC networks, a local media server (MX-A) may be deployed in the low voltage or medium voltage head-end units for PLC network.

Figure 24:
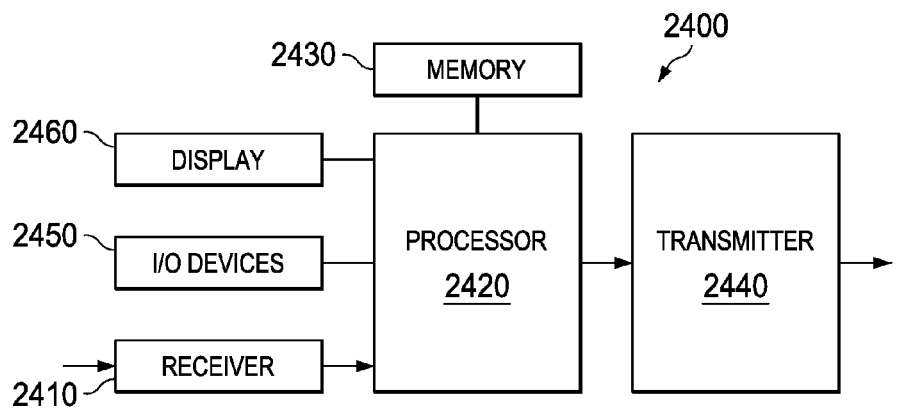
FIG. 24 illustrates a representative media server in accordance with embodiments of the invention.

FIG. 24 illustrates a representative media device in accordance with embodiments of the invention.

The media device 2400 includes a receiver 2410, which may include a wireless antenna receiver and/or a wired network connection port for receiving the media content, for example, if it is stored at a remote location. The media device 2400 also includes a memory 2430, which may include both a non-volatile memory and a volatile memory. In one embodiment, instructions for performing the operations described with respect to FIGS. 4-15, 17-23 may be stored in a non-transitory storage medium such as a magnetic storage medium or a solid state storage medium in the memory 2430.

The media device 2400 may include further I/O devices 2450 for inputting and outputting data. For example, the I/O devices 2450 may include an optical disc such as a laser readable medium, for example, a compact disc reader, a blue ray disk reader, and/or digital video reader etc. In one or more embodiments, the instructions for performing the operations as described in FIGS. 4-15, 17-23 may be stored in an optical disc, which is a non-transitory storage medium.

The media device 2400 may also include a display 2460 and a transmitter 2440 for transmitting the compressed data. The transmitter 2440 may include plurality of wireless antennas and/or a wired port. The transmitter 2440 and the receiver 2410 can be combined together in some embodiments.

The media device 2400 includes a processor 2420 configured to execute the instructions for performing the operations described with respect to FIGS. 4-15, 17-23. The processor 2420 may comprise a single processor or a plurality of processors.

In various embodiments, the media device 2400 may be a L2 node such as radio network controller and/or eNB, IWF, L3 node such as a gateway server such as GGSN, SGSN, media server including MX-A, media controller, media data unit, DPI, DPI-C, PCRF, CG, DSLAM, BRAS, SRC, QAM, as well as other units described above in various embodiments (see, e.g., FIGS. 4, 7, 20, 22-23).

Figure 25:
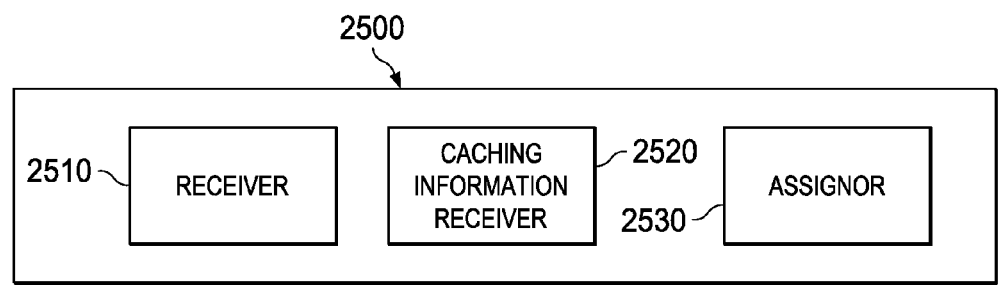
FIG. 25 illustrates components of a media controller for serving media in accordance with embodiments of the invention.

FIG. 25 illustrates components of a media controller for streaming media in accordance with embodiments of the invention. The media controller may include the general components described with respect to FIG. 24. Additionally, referring to FIG. 25, the media controller (e.g., processor 2420 in FIG. 24) comprises a receiver 2510 configured to receive a request to serve media content to a user equipment. A caching information receiver 2520 is configured to receive caching information regarding the media content. The caching information comprises information regarding whether the media content requested by the user equipment is cacheable. The media controller 2500 further comprises an assignor 2530 configured to assign a first media server from a hierarchical set of media servers to serve the user equipment if the media content to be served is cacheable. The hierarchical set of media servers comprises a plurality of first type of media servers deployed in a plurality of layer2 (L2) access networks. The user equipment is coupled to a content delivery network through a layer2 access network of the plurality of layer2 access networks.

In one embodiment, the processor of the media controller comprises a plurality of separate chips performing one or more of the functions as the receiver 2510, the caching information receiver 2520, and the assignor 2530. In an alternative embodiment, the functions of the receiver 2510, the caching information receiver 2520, and the assignor 2530 may be performed within the same processor at different times. In other words, the processor behaves as the receiver 2510, the caching information receiver 2520, and the assignor 2530 at various stages of the media processing.

Figure 26:
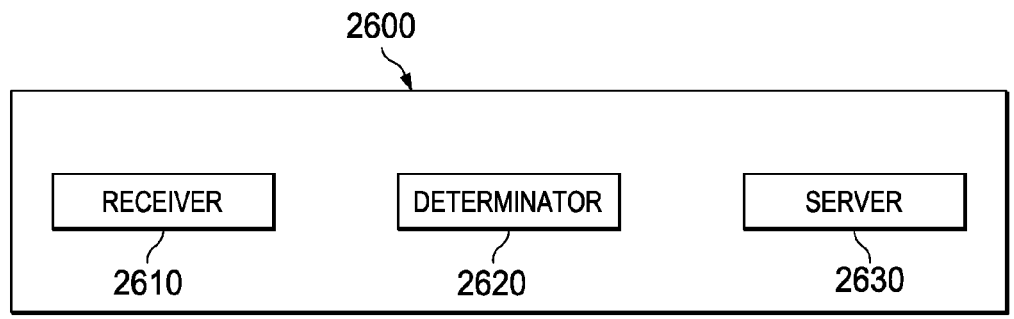
FIG. 26 illustrates components of a media server for serving media in accordance with embodiments of the invention.

FIG. 26 illustrates components of a media server 2600 for streaming media in accordance with embodiments of the invention. The media server 2600 may include the general components described with respect to FIG. 24. Additionally, referring to FIG. 26, the media server 2600 (e.g., processor 2420 in FIG. 24) comprises a receiver 2610 configured to receive a request to serve a cacheable media content to a user equipment. The user equipment is coupled to a content delivery network through a layer2 (L2) access network. A determinator 2620 is configured to determine if the cacheable media content is stored in a cache of the first media server. The media server 2600 does not determine if the cacheable media content is cacheable content. A server 2630 is configured to serve the cacheable media content from the cache to the user equipment if the media content is stored in the cache of the first media server.

In one embodiment, the processor of the media server 2600 comprises a plurality of separate chips performing one or more of the functions as the receiver 2610, the determinator 2620, and the server 2630. In an alternative embodiment, the functions of the receiver 2610, the determinator 2620, and the server 2630 may be performed within the same processor at different times. In other words, the processor behaves as the receiver 2610, the determinator 2620, and the server 2630 at various stages of the media processing.

Figure 27:
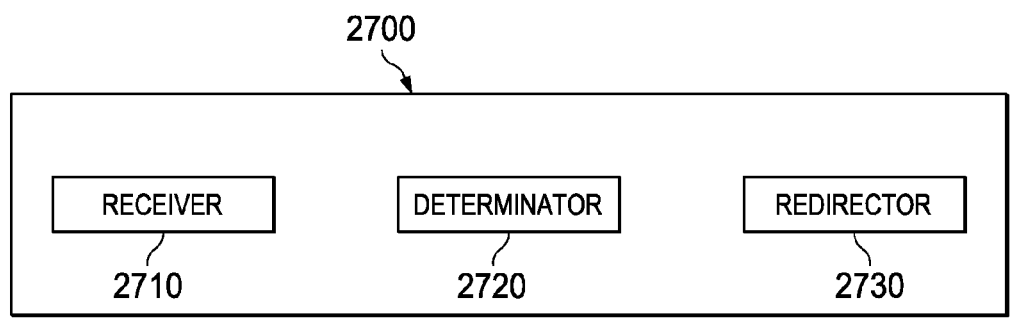
FIG. 27 illustrates components of a content processing unit for serving media in accordance with embodiments of the invention.

FIG. 27 illustrates components of a content processing unit 2700 for streaming media in accordance with embodiments of the invention. The content processing unit 2700 may include the general components described with respect to FIG. 24. Additionally, referring to FIG. 27, the content processing unit 2700 (e.g., processor 2420 in FIG. 24) comprises a receiver 2710 configured to receive a request to serve media content to a user equipment. The user equipment is coupled to a content delivery network through a layer2 access network of a plurality of layer2 access networks. A determinator 2720 is configured to determine whether the media content to be served is cacheable. A redirector 2730 is configured to redirect the request to serve the media content to a first media server if the media content to be served is cacheable. The first media server is a media server from a hierarchical set of media servers. The hierarchical set of media servers comprising a plurality of first type of media servers deployed in the plurality of layer2 access networks.

In one embodiment, the processor of the content processing unit 2700 comprises a plurality of separate chips performing one or more of the functions as the receiver 2710, the determinator 2720, and the redirector 2730. In an alternative embodiment, the functions of the receiver 2710, the determinator 2720, and the redirector 2730 may be performed within the same processor at different times. In other words, the processor behaves as the receiver 2710, the determinator 2720, and the redirector 2730 at various stages of the media processing.

Figure 28:
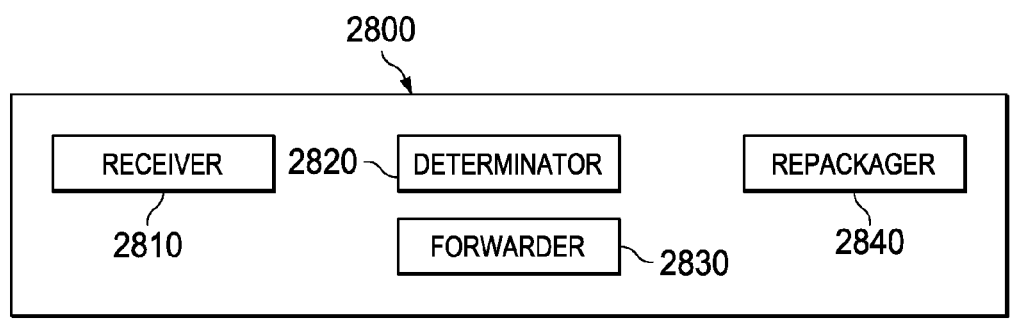
FIG. 28 illustrates components of an interworking function unit for serving media in accordance with embodiments of the invention.

FIG. 28 illustrates components of an interworking function unit 2800 for streaming media in accordance with embodiments of the invention. The interworking function unit 2800 may include the general components described with respect to FIG. 24. Additionally, referring to FIG. 28, the interworking function unit 2800 comprises a receiver 2810 configured to receive a request to serve a cacheable media content to a user equipment. A determinator 2820 is configured to determine a destination IP address of the request. A forwarder 2830 is configured to forward the received request to a first media server in a first layer2 access network if the destination IP address matches a stored list of destination IP addresses. A repackager is 2840 configured to repackage the received request into a TCP/IP message. The forwarder 2830 is configured to forward the received request to the first media server.

In one embodiment, the processor of the interworking function unit 2800 comprises a plurality of separate chips performing one or more of the functions as the receiver 2810, the determinator 2820, the forwarder 2840, and the repackager 2840. In an alternative embodiment, the functions of the receiver 2810, the determinator 2820, the forwarder 2840, and the repackager 2840 may be performed within the same processor at different times. In other words, the processor behaves as the receiver 2810, the determinator 2820, the forwarder 2840, and the repackager 2840 at various stages of the media processing.

Figure 29:
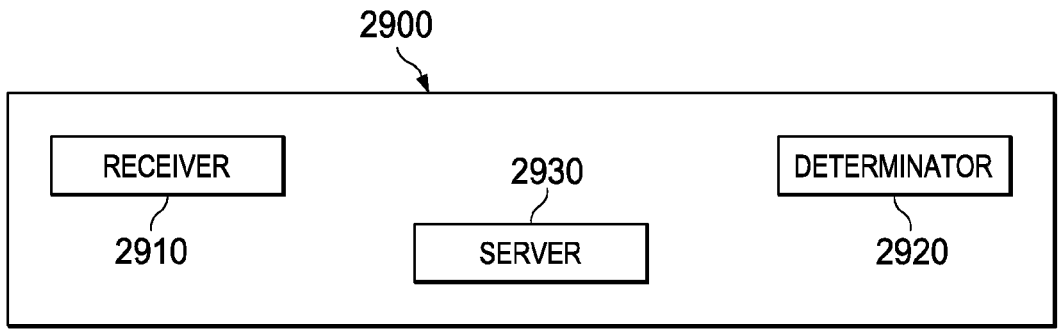
FIG. 29 illustrates components of a second media server for streaming media in accordance with embodiments of the invention.

FIG. 29 illustrates components of a second media server 2900 for streaming media in accordance with embodiments of the invention. The second media server 2900 comprises a receiver 2910 configured to receive a request to serve a cacheable media content to a user equipment. The request is received around when the user equipment is handed-off from a first layer2 node in a first layer2 access network to a second layer2 node in a second layer2 access network and a streaming session of the cacheable media content to the user equipment from a first media server is terminated. The second media server 2900 further comprises a determinator 2920 configured to determine if the cacheable media content is stored in a cache of the apparatus, and a server 2930 configured to serve the cacheable media content from the cache to the user equipment if the media content is stored in the cache of the apparatus. The second media server 2900 may include the general components described with respect to FIG. 24.

In one embodiment, the processor of the second media server 2900 comprises a plurality of separate chips performing one or more of the functions as the receiver 2910, the determinator 2920, and the server 2930. In an alternative embodiment, the functions of the receiver 2910, the determinator 2920, and the server 2930 may be performed within the same processor at different times. In other words, the processor behaves as the receiver 2910, the determinator 2920, and the server 2930 at various stages of the media processing.

Figure 30:
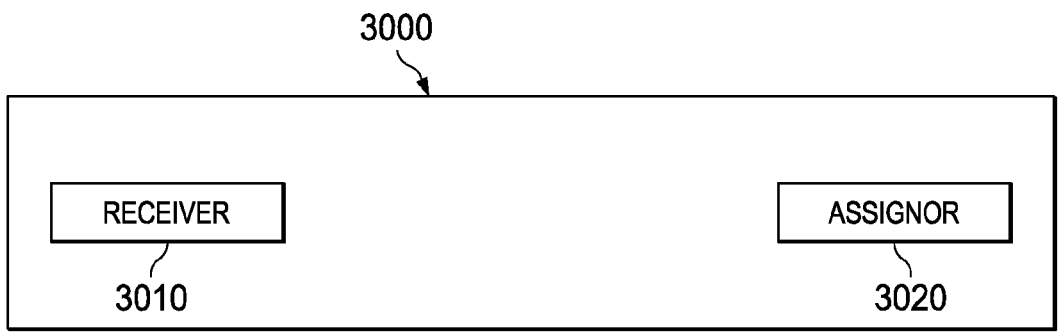
FIG. 30 illustrates components of a media controller for streaming media in accordance with embodiments of the invention.

FIG. 30 illustrates components of a media controller 3000 for streaming media in accordance with embodiments of the invention. The media controller 3000 may include the general components described with respect to FIG. 24. The media controller 3000 comprises a receiver 3010 configured to receive a second request to stream a cacheable media content from a user equipment. The second request is received when the user equipment is handed-off from a first layer2 node in a first layer2 access network to a second layer2 node in a second layer2 access network and a streaming session of the cacheable media content to the user equipment from a first media server is terminated. A assignor 3020 is configured to assign a second media server in the second layer2 access network to serve the user equipment.

In one embodiment, the processor of the media controller 3000 comprises a plurality of separate chips performing one or more of the functions as the receiver 3010, and the assignor 3020. In an alternative embodiment, the functions of the receiver 3010, and the assignor 3020 may be performed within the same processor at different times. In other words, the processor behaves as the receiver 3010, and the assignor 3020 at various stages of the media processing.

Figure 31:
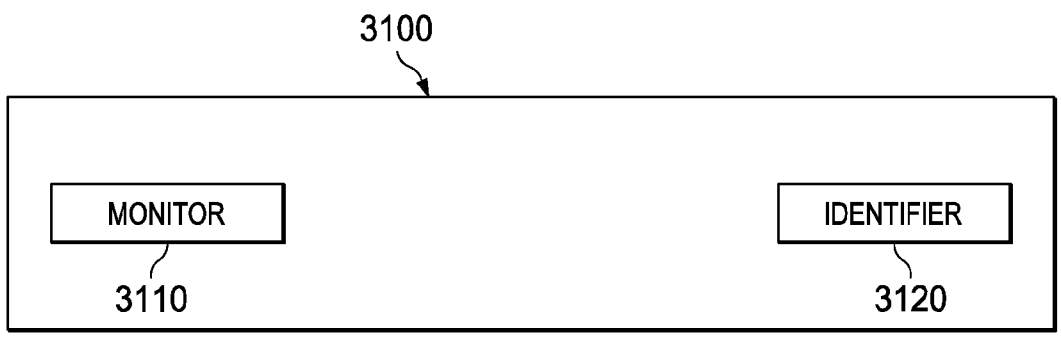
FIG. 31 illustrates components of a layer3 node 3100 for streaming media in accordance with embodiments of the invention.

FIG. 31 illustrates components of a layer3 node 3100 for streaming media in accordance with embodiments of the invention. The layer3 node 3100 may include the general components described with respect to FIG. 24. The layer3 node 3100 comprises a monitor 3110 configured to monitor if a user equipment is being handed-off. The layer3 node 3100 is configured to terminate a session between a user equipment and a first media server serving the user equipment. An identifier 3120 is configured to identify media content is being streamed from the first media server to the user equipment during an hand-off of the user equipment from a first layer2 node to a second layer2 node. The layer3 node 3100 is configured to serve the first layer2 node and the second layer2 node. The layer3 node 3100 is configured to not terminate the streaming of the media content from the first media server if the user equipment is handed-off from the first layer2 node to the second layer2 node.

In one embodiment, the processor of the layer2 node 3100 comprises a plurality of separate chips performing one or more of the functions as the monitor 3110, and the identifier 3120. In an alternative embodiment, the functions of the monitor 3110, and the identifier 3120 may be performed within the same processor at different times. In other words, the processor behaves as the monitor 3110, and the identifier 3120 at various stages of the media processing.

Figure 32:
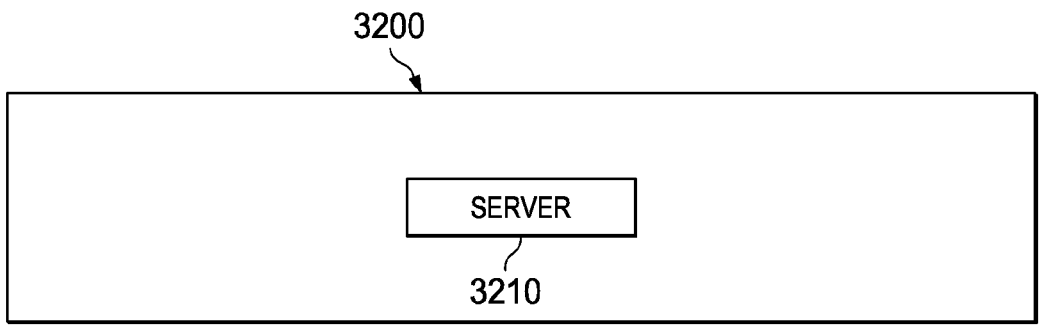
FIG. 32 illustrates components of a media server for streaming media in accordance with embodiments of the invention.

FIG. 32 illustrates components of a media server 3200 for streaming media in accordance with embodiments of the invention. The media server 3200 may include the general components described with respect to FIG. 24. The media server 3200 comprises a server 3210 configured to serve a user equipment located in a service area of a first access network. The server 3210 is configured to serve the user equipment located in a service area of a second access network after a hand-off of the user equipment from the first access network to the second access network. The serving comprises communicating with the user equipment through a first layer2 node in the first access network, an interface between the first layer2 node and a second layer2 node in a second access network, and the second layer2 node to the user equipment.

In one embodiment, the processor of the media server 3200 comprises a plurality of separate chips performing one or more of the functions as the server 3210. In an alternative embodiment, the functions of the server 3210 may be performed within the same processor at different times. In other words, the processor behaves as the server 3210 at various stages of the media processing.

Figure 33:
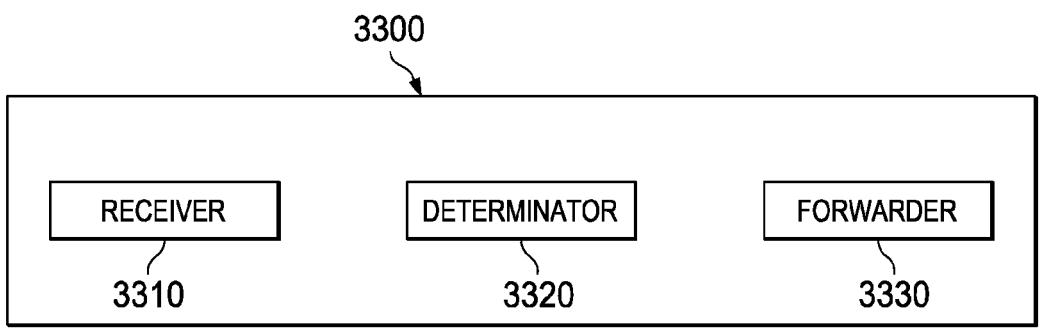
FIG. 33 illustrates components of a deep packet inspection node in accordance with embodiments of the invention.

FIG. 33 illustrates components of a deep packet inspection node 3300 in accordance with embodiments of the invention. The deep packet inspection node 3300 may include the general components described with respect to FIG. 24. The deep packet inspection node 3300 comprises a receiver 3310 configured to receive a request to serve media content to a user equipment, and a determinator 3320 configured to determine whether the user equipment is a target for lawful interception. The determinator 3320 is configured to determine the media content to be served is not cacheable if the user equipment is a target for lawful interception. A forwarder 3330 is configured to forward the request to serve the media content without caching if the user equipment is a target for lawful interception.

In one embodiment, the processor of the deep packet inspection node 3300 comprises a plurality of separate chips performing one or more of the functions as the receiver 3310, the determinator 3320, and the forwarder 3330. In an alternative embodiment, the functions of the receiver 3310, the determinator 3320, and the forwarder 3330 may be performed within the same processor at different times. In other words, the processor behaves as the receiver 3310, the determinator 3320, and the forwarder 3330 at various stages of the media processing.

Figure 34:
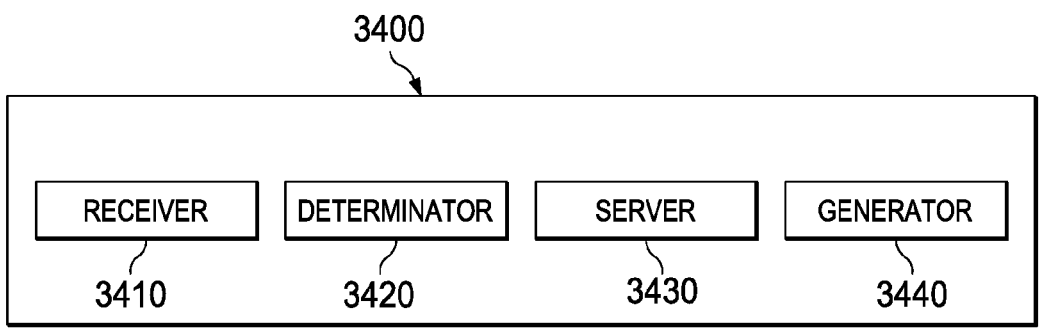
FIG. 34 illustrates components of a media server in accordance with embodiments of the invention.

FIG. 34 illustrates components of a media server 3400 in accordance with embodiments of the invention. The media server 3400 may include the general components described with respect to FIG. 24. The media server 3400 comprises a receiver 3410 configured to receive lawful interception (LI) information regarding a user equipment. The receiver 3410 is further configured to receive a request to serve a cacheable media content to a user equipment. The user equipment is coupled through a layer2 access network. A determinator 3420 is configured to determine whether the user equipment is a target for lawful interception based on the received LI information. A server 3430 is configured to serve the cacheable media content to the user equipment. A generator 3440 is configured to generate a mirrored delivery stream for transmitting all communications with the user equipment to a law enforcement monitoring facility if the user equipment is a target for lawful interception.

In one embodiment, the processor of the media server 3400 comprises a plurality of separate chips performing one or more of the functions as the receiver 3410, the determinator 3420, the server 3430, and the generator 3440. In an alternative embodiment, the functions of the receiver 3410, the determinator 3420, the server 3430, and the generator 3440 may be performed within the same processor at different times. In other words, the processor behaves as the receiver 3410, the determinator 3420, the server 3430, and the generator 3440 at various stages of the media processing.

Figure 35:
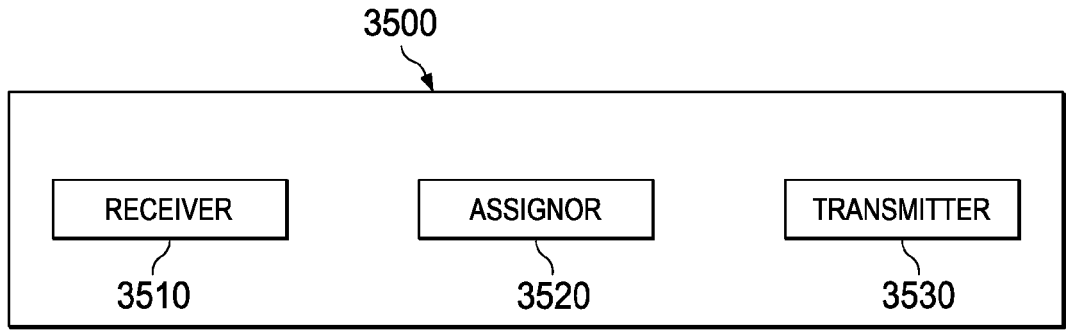
FIG. 35 illustrates components of a media server in accordance with embodiments of the invention.

FIG. 35 illustrates components of a media server 3500 in accordance with embodiments of the invention. The media server 3500 may include the general components described with respect to FIG. 24. The media server 3500 comprises a receiver 3510 configured to receive lawful interception (LI) information regarding a user equipment from a layer3 node. The receiver 3510 is further configured to receive a request to serve a cacheable media content to a user equipment. An assignor 3520 is configured to assign a first media server to serve the media content to the user equipment. A transmitter 3530 is configured to transmit the LI information to the first media server. The receiver 3510 is further configured to receive a mirrored delivery stream of all communications with the user equipment if the user equipment is a target for lawful interception. The transmitter 3530 is further configured to transmit the mirrored delivery stream to the layer3 node.

In one embodiment, the processor of the media server 3500 comprises a plurality of separate chips performing one or more of the functions as the receiver 3510, the assignor 3520, and the transmitter 3530. In an alternative embodiment, the functions of the receiver 3510, the assignor 3520, and the transmitter 3530 may be performed within the same processor at different times. In other words, the processor behaves as the receiver 3510, the assignor 3520, and the transmitter 3530 at various stages of the media processing.

Figure 36:
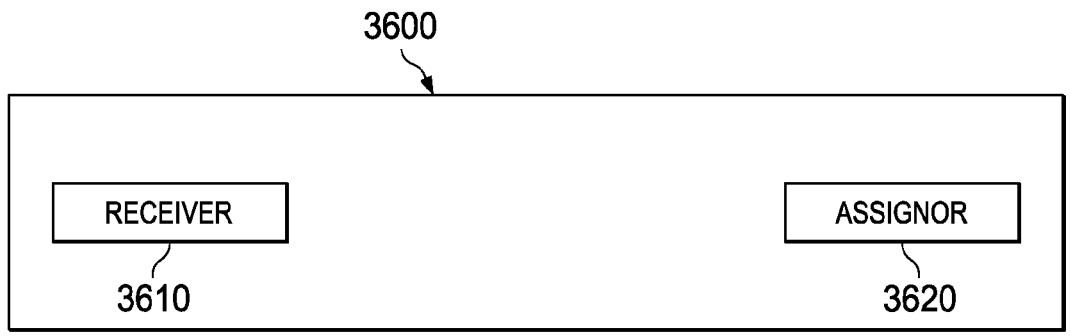
FIG. 36 illustrates components of a media controller in accordance with embodiments of the invention.

FIG. 36 illustrates components of a media controller 3600 in accordance with embodiments of the invention. The media controller 3600 may include the general components described with respect to FIG. 24. The media controller 3600 comprises a receiver 3610 configured to receive user profiles from a layer3 node in an access network. The user profiles include information relating to user account and/or network characteristics of a user equipment. The receiver 3610 is configured to receive a request to serve media content to the user equipment. An assignor 3620 is configured to assign a first media server using an user equipment information from the user profiles. The assignor 3620 is configured to assign the first media server from a hierarchical set of media servers to serve the user equipment if the media content to be served is cacheable. The hierarchical set of media servers comprise a plurality of first type of media servers deployed in a plurality of layer2 (L2) access networks. The user equipment is coupled to a content delivery network through a layer2 access network of the plurality of layer2 access networks.

In one embodiment, the processor of the media controller 3600 comprises a plurality of separate chips performing one or more of the functions as the receiver 3610, and the assignor 3620. In an alternative embodiment, the functions of the receiver 3610, and the assignor 3620 may be performed within the same processor at different times. In other words, the processor behaves as the receiver 3610 and the assignor 3620 at various stages of the media processing.

Figure 37:
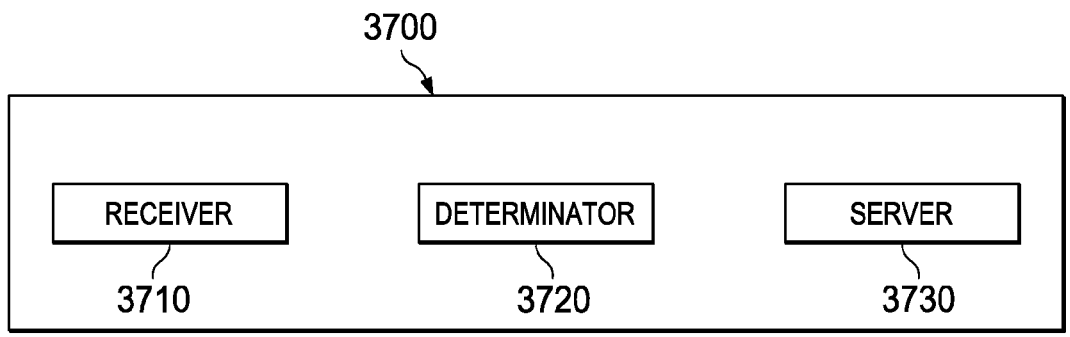
FIG. 37 illustrates components of a media server in accordance with embodiments of the invention.

FIG. 37 illustrates components of a media server 3700 in accordance with embodiments of the invention. The media server 3700 may include the general components described with respect to FIG. 24. The media server 3700 comprises a receiver 3710 configured to receive user profiles from a media controller in a content delivery network. The user profiles include information relating to user account and/or network characteristics of a user equipment. The receiver 3710 is further configured to receive a request to serve a cacheable media content to the user equipment. The user equipment is coupled to the content delivery network through a layer2 access network. A determinator 3720 is configured to determine a quality of experience for the user equipment by using an user equipment information from the user profiles. A server 3730 is configured to serve the cacheable media content to the user equipment at the quality of experience for the user equipment.

In one embodiment, the processor of the media server 3700 comprises a plurality of separate chips performing one or more of the functions as the receiver 3710, the determinator 3720, and the server 3730. In an alternative embodiment, the functions of the receiver 3710, the determinator 3720, and the server 3730 may be performed within the same processor at different times. In other words, the processor behaves as the receiver 3710, the determinator 3720, and the server 3730 at various stages of the media processing.

Figure 38:
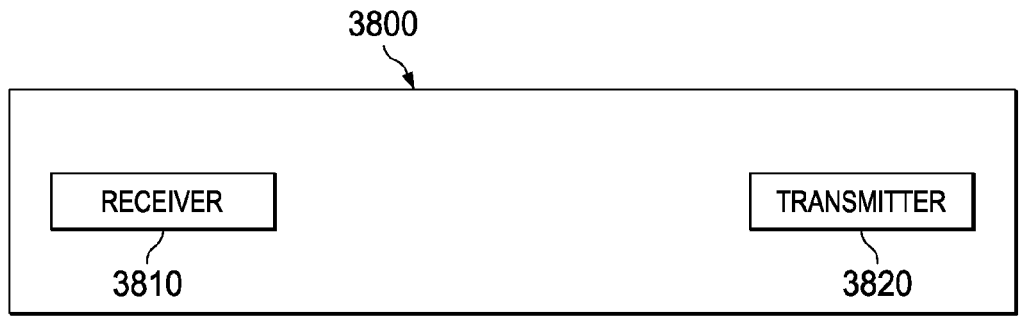
FIG. 38 illustrates components of a media data unit in accordance with embodiments of the invention.

FIG. 38 illustrates components of a media data unit 3800 in accordance with embodiments of the invention. The media data unit 3800 may include the general components described with respect to FIG. 24. The media data unit 3800 comprises a receiver 3810 configured to receive a delivery log of traffic use after every first time interval for an user equipment. The user equipment is part of a hot billing class of users. The traffic use comprises data usage by the user equipment during communication with a media server in a layer2 access network. A transmitter 3820 is configured to transmit a user traffic information from the delivery log to a billing and charging policy server. The receiver 3810 is further configured to receive account status information from the billing and charging policy server. The account status information is received if the user equipment exceeds a user account metric. The transmitter 3820 is further configured to transmit session termination information based on the account status information.

In one embodiment, the processor of the media data unit 3800 comprises a plurality of separate chips performing one or more of the functions as the receiver 3810, and the transmitter 3820. In an alternative embodiment, the functions of the receiver 3810, and the transmitter 3820 may be performed within the same processor at different times. In other words, the processor behaves as the receiver 3810, and the transmitter 3820 at various stages of the media processing.

Figure 39:
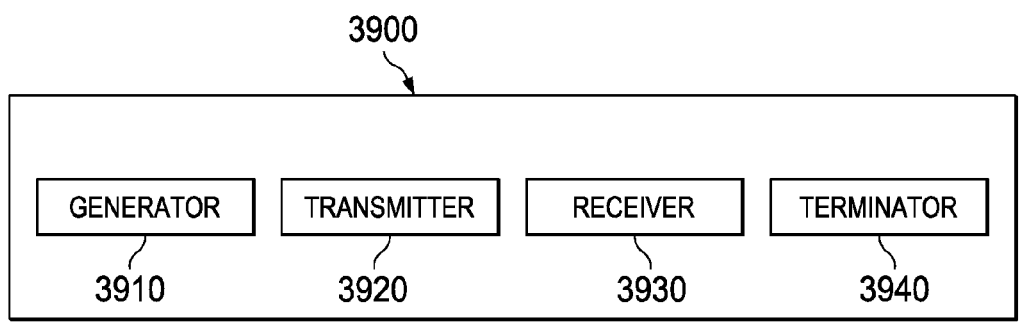
FIG. 39 illustrates components of a media server at a layer2 access network in accordance with embodiments of the invention.

FIG. 39 illustrates components of a media server 3900 at a layer2 access network in accordance with embodiments of the invention. The media server 3900 may include the general components described with respect to FIG. 24. The media server 3900 comprises a generator 3910 configured to generate a delivery log comprising traffic use for an on-going session with a user equipment. The generator 3910 is configured to generate the delivery log periodically after every first time interval. A transmitter 3920 is configured to transmit the delivery log periodically every second time interval. A receiver 3930 is configured to receive session termination information. The session termination information is received if the user equipment exceeds a user account metric. A terminator 3940 is configured to terminate the on-going session with the user equipment.

In one embodiment, the processor of the media server 3900 comprises a plurality of separate chips performing one or more of the functions as the generator 3910, the transmitter 3920, the receiver 3930, and the terminator 3940. In an alternative embodiment, the functions of the generator 3910, the transmitter 3920, the receiver 3930, and the terminator 3940 may be performed within the same processor at different times. In other words, the processor behaves as the generator 3910, the transmitter 3920, the receiver 3930, and the terminator 3940 at various stages of the media processing.

Figure 40:
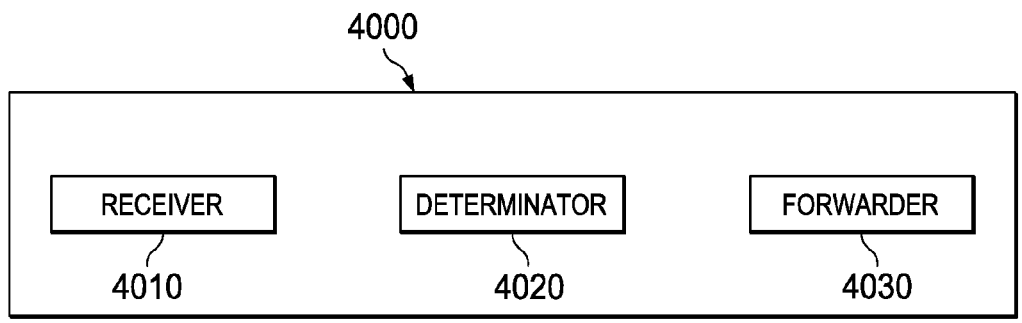
FIG. 40 illustrates components of a media controller in accordance with embodiments of the invention.

FIG. 40 illustrates components of a media controller 4000 in accordance with embodiments of the invention. The media controller 4000 may include the general components described with respect to FIG. 24. The media controller 4000 comprises a receiver 4010 configured to receive a request to serve media content to a user equipment. The receiver 4010 is configured to receive a subset of packet data protocol (PDP) information. The PDP comprises a flag indicating charging type of the user equipment. A determinator 4020 is configured to determine the charging type of the user equipment based on the flag. The determinator 4020 is configured to determine the media content to be served is not cacheable if the charging type of the user equipment is a real time charging type. A forwarder 4030 is configured to forward the request to serve the media content without caching if the charging type of the user equipment is a real time charging type.

In one embodiment, the processor of the media controller 4000 comprises a plurality of separate chips performing one or more of the functions as the receiver 4010, the determinator 4020, and the forwarder 4030. In an alternative embodiment, the functions of the receiver 4010, the determinator 4020, and the forwarder 4030 may be performed within the same processor at different times. In other words, the processor behaves as the receiver 4010, the determinator 4020, and the forwarder 4030 at various stages of the media processing.

Figure 41:
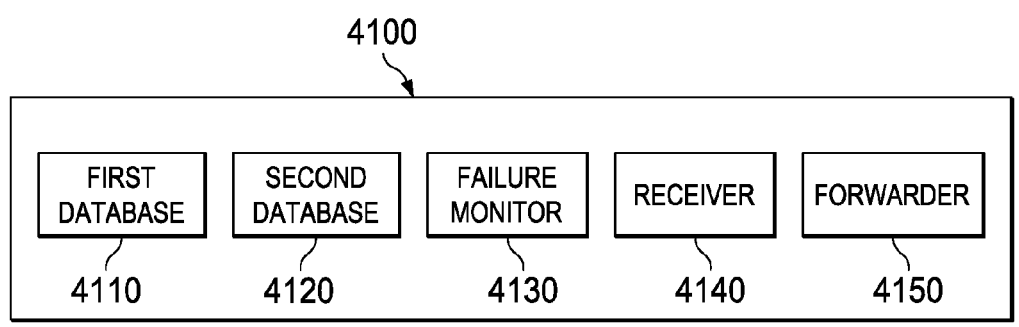
FIG. 41 illustrates components of an inter working function unit in accordance with embodiments of the invention.

FIG. 41 illustrates components of an inter working function unit 4100 in accordance with embodiments of the invention. The inter working function unit 4100 may include the general components described with respect to FIG. 24. The inter working function unit (IWF) 4100 comprises a first database 4110 configured to maintain a list of local media servers deployed in a first layer2 access network, and a second database 4120 configured to maintain a internet protocol (IP) address of a media controller in a content delivery network. The media controller is configured to assign a media server to serve a user equipment. The inter working function unit 4100 further comprises a failure monitor 4130 configured to determine if a local media server from the list of local media servers has failed, a receiver 4140, and a forwarder 4150. The receiver 4140 is configured to receive a request from the user equipment to serve media content. The forwarder 4150 is configured to forward the request from the user equipment to the media controller if the IWF 4100 determines the local media server has failed.

In one embodiment, the processor of the inter working function unit 4100 comprises a plurality of separate chips performing one or more of the functions as the first database 4110, the second database 4120, the failure monitor 4130, the receiver 4140, and the forwarder 4150. In an alternative embodiment, the functions of the first database 4110, the second database 4120, the failure monitor 4130, the receiver 4140, and the forwarder 4150 may be performed within the same processor at different times. In other words, the processor behaves as the first database 4110, the second database 4120, the failure monitor 4130, the receiver 4140, and the forwarder 4150 at various stages of the media processing. Further, the first and the second databases 4110 and 4120 may be stored in the memory 2430 of FIG. 24.

Figure 42:
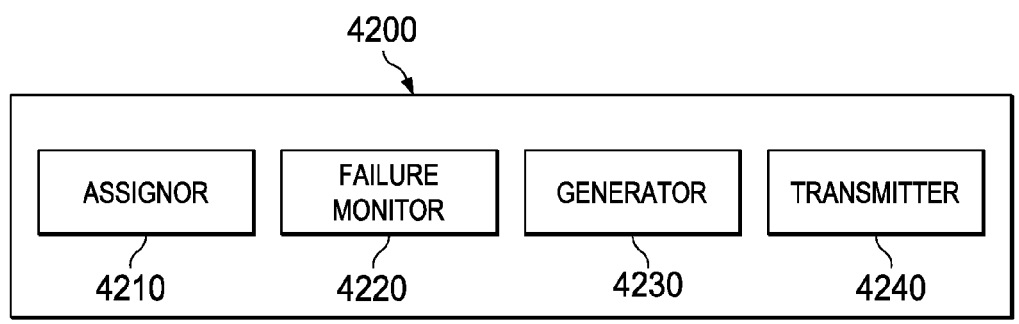
FIG. 42 illustrates components of a media controller in accordance with embodiments of the invention.

FIG. 42 illustrates components of a media controller 4200 in accordance with embodiments of the invention. The media controller 4200 may include the general components described with respect to FIG. 24. The media controller 4200 comprises a assignor 4210 configured to assign a first media server to serve a user equipment in response to a request to serve a cacheable media content to the user equipment, and a failure monitor 4220 configured to monitor a status of the first media server to determine if the first media server fails. The media controller 4200 further comprises a generator 4230 and a transmitter 4240. The generator 4230 is configured to generate a redirect message having a source message of the first media server to the user equipment. The transmitter 4240 is configured to transmit the redirect message. The assignor 4210 assigns a second media server to serve the user equipment if the failure monitor 4220 determines the first media server has failed. The generator 4230 generates a redirect message if the failure monitor 4220 determines the first media server has failed. The redirect message redirects the user equipment to the second media server. The transmitter 4240 transmits the redirect message if the failure monitor 4220 determines that the first media server has failed.

In one embodiment, the processor of the media controller 4200 comprises a plurality of separate chips performing one or more of the functions as the assignor 4210, the failure monitor 4220, the generator 4230, and the transmitter 4240. In an alternative embodiment, the functions of the assignor 4210, the failure monitor 4220, the generator 4230, and the transmitter 4240 may be performed within the same processor at different times. In other words, the processor behaves as the assignor 4210, the failure monitor 4220, the generator 4230, and the transmitter 4240 at various stages of the media processing.

As described in detail above, various embodiments of the present invention have many advantages. First, embodiments of the invention allow effective decoupling of the access network with the CDN network for OTT traffic caching. Second, embodiments of the invention enable deployment of layer3 based media servers (media caching and adaptation) in a layer2 network, which is much closer to the end users without the usual complexity of layer2 DPI and decision making. Third, embodiments of the invention support a more centralized content level DPI (DPI-C) and decision making in a single CDN, which may be able to serve both MBB and FBB networks. Consequently, DPI-C (content level deep packet inspection) functionality is not required within the access network. Fourth, embodiments of the invention may leverage a layered cache network to increase cache hit rate and reduce cache miss retrieval time. Embodiments of the invention provide a hierarchy of caching media server backup among distributed media servers in case of failure of any particular media server. Fifth, embodiments of the invention, support OTT, B2B and B2C services over MBB and FBB with a common, unified CDN with identical network configurations, which greatly simplifies network deployment, management, and operations.

Although the present invention and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of serving media, the method comprising:
   receiving a request to serve media content to a user equipment;
   receiving caching information regarding the media content, the caching information comprising information regarding whether the media content requested by the user equipment is cacheable; and
   assigning a first media server from a hierarchical set of media servers to serve the user equipment if the media content to be served is cacheable, the hierarchical set of media servers comprising a plurality of first type layer3 (L3) based media servers deployed in a plurality of layer2 (L2) access networks and a plurality of second type L3 based media servers deployed in a plurality of L3 networks, the user equipment being coupled to a content delivery network through a layer2 access network of the plurality of L2 access networks, wherein a hierarchy of the hierarchical set of media servers comprises a first level, a second level, and a third level, wherein the first type L3 based media servers are configured to interface with L2 nodes in the L2 access networks via an inter working function unit (IWF) and with L3 nodes in the L3 networks via a separately routable internet protocol (IP) address.

2. The method of claim 1, wherein the layer2 access network is part of a mobile broad band network.

3. The method of claim 1, wherein the layer2 access network is part of a fixed broad band network.

4. The method of claim 1, wherein the caching information regarding the media content is received at a media controller deployed in the content delivery network.

5. The method of claim 1, wherein the first media server is a first type of media server of the plurality of L3 based media servers deployed in the plurality of L2 access networks.

6. The method of claim 1, wherein the caching information is received from a content deep packet inspection (DPI-C) node.

7. The method of claim 6, wherein the DPI-C node is in the content delivery network.

8. The method of claim 1, wherein receiving a request comprises:
 receiving a forwarded GET request at a media controller;
 generating a HTTP redirect message including the GET request to the user equipment; and
 forwarding the GET request to the first media server through an inter-working function node in the L2 access network.

9. The method of claim 1, further comprising:
 receiving a subset of packet data protocol context information through a direct RESTful API interface.

10. The method of claim 1, further comprising:
 receiving context information after creation, update, or deletion of active packet data protocol context information.

11. The method of claim 1, further comprising:
 receiving an augmented HTTP message, the augmented HTTP message comprising packet data protocol context information for the user equipment (UE).

12. The method of claim 1, wherein assigning a first media server comprises:
 selecting the first media server from:
  the plurality of L3 based media servers deployed in the plurality of L2 access networks,
  the plurality of second type of L3 based media servers deployed in a plurality of L3 networks,
  a plurality of third type of media servers deployed in a transit network and/or border gateway location, and
  a plurality of fourth type of media servers deployed in a peering point.

13. The method of claim 1, wherein assigning a first media server comprises:
 selecting a media server in a packet data protocol path of the user equipment, the media server being deployed in the L2 access network.

14. The method of claim 13, wherein selecting a media server in the packet data protocol path comprises performing at least one of the following operations:
 using location information comprising routing area identity (RAI) or service area identity (SAI);
 mapping a range of IP address of the user equipment to a L2 node in the L2 access network;
 using a radio access network side Internet Protocol (IP) address of the media server; and
 determining an identification number of a L2 node in the L2 access network, and selecting a media server based on the identification number of the L2 node.

15. The method of claim 1, wherein assigning a first media server comprises performing at least one of the following operations:
 selecting the media server currently serving the user equipment; and
 assigning a first media server comprises using a stored policy.

16. A method of serving media, the method comprising:
 receiving a request to serve media content to a user equipment, the user equipment being coupled to a content delivery network through a layer2 access network of a plurality of layer2 access networks;
 determining whether the media content to be served is cacheable; and
 redirecting the request to serve the media content to a first media server if the media content to be served is cacheable, wherein the first media server is a media server from a hierarchical set of media servers, the hierarchical set of media servers comprising a plurality of first type layer3 (L3) based media servers deployed in the plurality of layer2 (L2) access networks and a plurality of second type L3 based media servers deployed in a plurality of L3 networks, wherein a hierarchy of the hierarchical set of media servers comprises a first level, a second level, and a third level, wherein the first type L3 based media servers are configured to interface with L2 nodes in the L2 access networks via an inter working function unit (IWF) and with L3 nodes in the L3 networks via a separately routable internet protocol (IP) address.

17. The method of claim 16, further comprising:
 forwarding the request to a router en route towards a destination address of the request if the media content to be served is not cacheable.

18. The method of claim 16, further comprising:
 forwarding the request to a media controller if the media content to be served is cacheable.

19. The method of claim 16, wherein the hierarchical set of media servers comprises:
 a plurality of third type of media servers deployed in border gateway; and
 a plurality of fourth type of media servers deployed in a peering point.

20. The method of claim 16, wherein the determining is performed at a content deep packet inspection (DPI-C) node, and wherein the DPI-C node is deployed in the content delivery network.

21. The method of claim 16, wherein the determining is performed at a content deep packet inspection (DPI-C) node, and wherein the DPI-C node is deployed in a layer3 core access network serving the layer2 access network.

22. The method of claim 21, wherein the determining is performed at a content deep packet inspection (DPI-C) node, and wherein the DPI-C node is integrated with a layer3 node.

23. The method of claim 22, wherein the L3 node is a gateway server node.

24. The method of claim 16, wherein the determining is performed at a content deep packet inspection (DPI-C) node, and wherein receiving a request to serve media content comprises receiving a GET request at the DPI-C node.

25. A method of serving media, the method comprising:
 receiving a request to serve media content to a user equipment;

determining a destination internet protocol (IP) address of the request;

determining whether the media content requested by the user equipment is cacheable;

assigning a first media server from a hierarchical set of media servers to serve the user equipment if the destination IP address matches a stored list of destination IP addresses and if the media content requested by the user equipment is cacheable, the hierarchical set of media servers comprising a plurality of first type layer3 (L3) based media servers deployed in a plurality of layer2 (L2) access networks and a plurality of second type L3 based media servers deployed in a plurality of L3 networks, the user equipment being coupled to a content delivery network through a layer2 access network of the plurality of L2 access networks, wherein a hierarchy of the hierarchical set of media servers comprises a first level, a second level, and a third level, wherein the first type L3 based media servers are configured to interface with L2 nodes in the L2 access networks via an inter working function unit (IWF) and with L3 nodes in the L3 networks via a separately routable internet protocol (IP) address;

repackaging the received request to serve media content into a TCP/IP message;

forwarding the received request to serve media content to the first media server;

at a first media server deployed in the L2 access network, receiving the request to serve the media content;

determining if the cacheable media content is stored in a cache of the first media server; and serving the cacheable media content from the cache to the user equipment if the media content is stored in the cache of the first media server.

\* \* \* \* \*